(12) United States Patent
Zhou et al.

(10) Patent No.: US 12,250,054 B2
(45) Date of Patent: *Mar. 11, 2025

(54) BEAM FAILURE RECOVERY TECHNIQUES IN A COMMUNICATION PERIOD

(71) Applicant: QUALCOMM Incorporated, San Diego, CA (US)

(72) Inventors: Yan Zhou, San Diego, CA (US); Tao Luo, San Diego, CA (US); Sony Akkarakaran, Poway, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/357,923

(22) Filed: Jul. 24, 2023

(65) Prior Publication Data
US 2023/0370147 A1 Nov. 16, 2023

Related U.S. Application Data

(60) Continuation of application No. 17/950,891, filed on Sep. 22, 2022, now Pat. No. 11,855,736, which is a
(Continued)

(51) Int. Cl.
*H04B 7/06* (2006.01)
*H04B 7/022* (2017.01)
(Continued)

(52) U.S. Cl.
CPC ........... *H04B 7/0695* (2013.01); *H04B 7/088* (2013.01); *H04W 24/08* (2013.01);
(Continued)

(58) Field of Classification Search
CPC ...... H04B 7/0695; H04B 7/088; H04B 7/022; H04W 24/08; H04W 72/0466;
(Continued)

(56) References Cited

U.S. PATENT DOCUMENTS 10,868,772 B2   12/2020   Zhang et al.
11,456,793 B2    9/2022   Zhou et al.
(Continued)

FOREIGN PATENT DOCUMENTS

CN   108702767 A   10/2018
CN   109076365 A   12/2018
(Continued)

OTHER PUBLICATIONS

3GPP TS 38.213: "3rd Generation Partnership Project, Technical Specification Group Radio Access Network, NR, Physical Layer Procedures for Control (Release 15)", 3GPP Standard, Technical Specification, 3rd Generation Partnership Project (3GPP), Mobile Competence Centre, 650, Route Des Lucioles, F-06921 Sophia-Antipolis Cedex, France, vol. RAN WG1, No. V15.0.0 (Dec. 2017), Jan. 3, 2018 (Jan. 3, 2018), pp. 1-56, 20171201, XP051392263.
(Continued)

*Primary Examiner* — Harry H Kim
(74) *Attorney, Agent, or Firm* — Holland & Hart LLP/QUALCOMM Incorporated

(57) ABSTRACT

Methods, systems, and devices for wireless communications are described. A wireless device may identify a resource for wireless communication, the resource being in a first state where the resource is active for wireless communication and is inactive for a communication failure recovery procedure. The wireless device may determine that a communication failure has occurred during a first communication period. In some cases, one or more techniques for confirming the communication failure may be used to verify the failure. The wireless device may transition during a second communication period and based at least in part on the communication failure, the resource to a second state where the resource is inactive for wireless communication and is active for the communication failure recovery procedure. The wireless
(Continued)

device may perform the communication failure recovery procedure using the resource transitioned to the second state.

30 Claims, 18 Drawing Sheets

Related U.S. Application Data division of application No. 16/860,043, filed on Apr. 27, 2020, now Pat. No. 11,456,793.

(60) Provisional application No. 62/852,962, filed on May 24, 2019.

(51) Int. Cl.

| | | |
|---|---|---|
| *H04B 7/08* | (2006.01) | |
| *H04L 1/00* | (2006.01) | |
| *H04L 1/08* | (2006.01) | |
| *H04L 1/18* | (2023.01) | |
| *H04L 1/1812* | (2023.01) | |
| *H04W 16/28* | (2009.01) | |
| *H04W 24/08* | (2009.01) | |
| *H04W 72/044* | (2023.01) | |
| *H04W 76/18* | (2018.01) | |
| *H04W 76/19* | (2018.01) | |
| *H04W 76/27* | (2018.01) | |

(52) U.S. Cl.
CPC ....... *H04W 72/0466* (2013.01); *H04W 76/19* (2018.02); *H04W 76/27* (2018.02)

(58) Field of Classification Search
CPC ..... H04W 76/19; H04W 76/27; H04W 16/28; H04W 72/046; H04W 76/18; H04L 1/0061; H04L 1/08; H04L 1/18; H04L 1/1812

See application file for complete search history.

(56) References Cited

U.S. PATENT DOCUMENTS

| | | | |
|---|---|---|---|
| 11,463,301 | B2 | 10/2022 | Zhou et al. |
| 11,855,736 | B2 | 12/2023 | Zhou et al. |
| 2018/0191422 | A1 | 7/2018 | Xia et al. |
| 2019/0037423 | A1 | 1/2019 | Yu et al. |
| 2019/0053314 | A1 | 2/2019 | Zhou et al. |
| 2019/0082334 | A1 | 3/2019 | Nagaraja et al. |
| 2019/0110281 | A1 | 4/2019 | Zhou et al. |
| 2019/0159100 | A1 | 5/2019 | Liou et al. |
| 2019/0349061 | A1 | 11/2019 | Cirik et al. |
| 2019/0356371 | A1 | 11/2019 | Osawa et al. |
| 2020/0092785 | A1 | 3/2020 | Yang |
| 2020/0137801 | A1 | 4/2020 | Chen et al. |
| 2020/0137821 | A1 | 4/2020 | Cirik et al. |
| 2020/0187079 | A1 | 6/2020 | Nagakubo et al. |
| 2020/0358582 | A1 | 11/2020 | Takeda et al. |
| 2021/0036759 | A1 | 2/2021 | Kim et al. |
| 2021/0058134 | A1 | 2/2021 | Luo et al. |
| 2021/0195675 | A1 | 6/2021 | Park et al. |
| 2021/0204345 | A1 | 7/2021 | Shi et al. |
| 2021/0218457 | A1 | 7/2021 | Xu et al. |
| 2021/0235425 | A1* | 7/2021 | Kim ................. H04W 72/23 |
| 2021/0297138 | A1* | 9/2021 | Matsumura ......... H04W 72/046 |
| 2021/0345425 | A1 | 11/2021 | Liu et al. |
| 2022/0201767 | A1* | 6/2022 | Wei ................. H04W 74/0866 |
| 2023/0023471 | A1 | 1/2023 | Zhou et al. |

FOREIGN PATENT DOCUMENTS

| | | |
|---|---|---|
| EP | 3567776 A1 | 11/2019 |
| WO | WO2017024516 A1 | 2/2017 |
| WO | WO2018171044 A1 | 9/2018 |

OTHER PUBLICATIONS

Apple: "Discussion on SL RLM / RLF Declaration", 3GPP Draft, 3GPP TSG-RAN WG2 Meeting #106, R2-1906773 SL RLM, 3rd Generation Partnership Project (3GPP), Mobile Competence Centre, 650, Route Des Lucioles, F-06921 Sophia-Antipolis Cedex, France, vol. RAN WG2, No. Reno, USA, May 13, 2019-May 17, 2019, May 13, 2019 (May 13, 2019), XP051730228, 4 pages, pp. 2,3.

CATT: "The Validity of CFRA Resources for BFR", 3GPP Draft, 3GPP TSG-RAN WG2 #102, R2-1806998, The Validity of CFRA Resources for BFR—FINAL, 3rd Generation Partnership Project (3GPP), Mobile Competence Centre, 650, Route Des Lucioles, F-06921 Sophia- Antipolis Cedex, vol. RAN WG2, No. Busan, Korea, May 21, 2018-May 25, 2018, May 11, 2018 (May 11, 2018), XP051464494, pp. 1-5, the whole document.

Huawei, et al., "Beamforming for V2X Sidelink for FR1 and FR2", 3GPP Draft, 3GPP TSG RAN WG1 Ad-Hoc Meeting 1901, R1-1900862, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019, Jan. 20, 2019 (Jan. 20, 2019), XP051593708, 5 pages, Section 2.3, The Whole Document, p. 1-p. 2 paragraph 2.3.

International Search Report and Written Opinion—PCT/US2020/030265—ISA/EPO—Nov. 2, 2020.

International Preliminary Report on Patentability—PCT/US2020/026313, the International Bureau of WIPO—Geneva, Switzerland, Jan. 25, 2021.

International Preliminary Report on Patentability—PCT/US2020/030265 The International Bureau of WIPO—Geneva, Switzerland, Dec. 2, 2021.

International Search Report and Written Opinion—PCT/US2020/026313—ISAEPO—Jun. 29, 2020.

NTT Docomo, Inc: "Further Views on Mechanism to Recover from Beam Failure", 3GPP Draft, R1-1713919_Beam_Recovery, 3GPP TSG RAN WG1 #90, 3rd Generation Partnership Project (3GPP), Mobile Competence Centre, 650, Route Des Lucioles, F-06921, Sophia-Antipolis Cedex, France, vol. RAN WG1, No. Prague, Czechia, Aug. 21, 2017-Aug. 25, 2017, Aug. 20, 2017 (Aug. 20, 2017), XP051316711, 6 Pages, Section 4, Figure 3.

Partial International Search Report—PCT/US2020/030265—ISA/EPO—Aug. 4, 2020.

* cited by examiner

BEAM FAILURE RECOVERY TECHNIQUES IN A COMMUNICATION PERIOD

CROSS REFERENCE

The present Application for Patent is a continuation of U.S. patent application Ser. No. 17/950,891 by ZHOU et al., entitled "BEAM FAILURE RECOVERY TECHNIQUES" filed Sep. 22, 2022, which is a Divisional of U.S. patent application Ser. No. 16/860,043 by ZHOU et al., entitled "BEAM FAILURE RECOVERY TECHNIQUES" filed Apr. 27, 2020, which claims the benefit of U.S. Provisional Patent Application No. 62/852,962 by ZHOU et al., entitled "BEAM FAILURE RECOVERY TECHNIQUES," filed May 24, 2019, assigned to the assignee hereof, and expressly incorporated by reference herein.

INTRODUCTION

The following relates to wireless communications, and more specifically to management of communications failures in beamformed wireless transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method of wireless communication at a wireless device is described. The method may include configuring a wireless resource for a beam failure recovery procedure. The wireless resource may be configured to have a first state. The first state of the wireless resource may be active for data communications and may be inactive for the beam failure recovery procedure. The wireless resource may also be configured to have a second state. The second state wireless resource may be inactive for data communications and may be active for the beam failure recovery procedure. The method may include determining that a communication failure has occurred during a first communication period. The method may also include transitioning, during a second communication period and based on the communication failure, the wireless resource from the first state to the second state. Additionally, the method may include performing the beam failure recovery procedure using the wireless resource transitioned to the second state.

An apparatus for wireless communication at a wireless device is described. The apparatus may include a processor and memory coupled with the processor. The processor and memory may be configured to configure a wireless resource for a beam failure recovery procedure. The wireless resource is configured to have a first state where the wireless resource is active for data communications and is inactive for the beam failure recovery procedure. The wireless resource is further configured to have a second state where the wireless resource is inactive for data communications and is active for the beam failure recovery procedure. The processor and memory may be configured to determine that a communication failure has occurred during a first communication period. The processor and memory may also be configured to transition, during a second communication period and based on the communication failure, the wireless resource from the first state to the second state. The processor and memory may be configured to perform the beam failure recovery procedure using the wireless resource transitioned to the second state.

Another apparatus for wireless communication at a wireless device is described. The apparatus may include means for configuring a wireless resource for a beam failure recovery procedure, where the wireless resource is configured to have a first state where the wireless resource is active for data communications and is inactive for the beam failure recovery procedure, and to have a second state where the wireless resource is inactive for data communications and is active for the beam failure recovery procedure, determining that a communication failure has occurred during a first communication period, transitioning, during a second communication period and based on the communication failure, the wireless resource from the first state to the second state, and performing the beam failure recovery procedure using the wireless resource transitioned to the second state.

A non-transitory computer-readable medium storing code for wireless communication at a wireless device is described. The code may include instructions executable by a processor to configure a wireless resource for a beam failure recovery procedure, where the wireless resource is configured to have a first state where the wireless resource is active for data communications and is inactive for the beam failure recovery procedure, and to have a second state where the wireless resource is inactive for data communications and is active for the beam failure recovery procedure, determine that a communication failure has occurred during a first communication period, transition, during a second communication period and based on the communication failure, the wireless resource from the first state to the second state, and perform the beam failure recovery procedure using the wireless resource transitioned to the second state.

In some examples of the method, apparatuses, and non-transitory computer-readable medium described herein, the configuring may include operations, features, means, or instructions for exchanging RRC messages that indicate the wireless resource that may be configured for the beam failure recovery procedure.

In some examples of the method, apparatuses, and non-transitory computer-readable medium described herein, the wireless resource includes a first downlink resource for transmission of one or more reference signals using one or more beams by a first transmission-reception point, and a first uplink resource for transmission of a beam failure request by a UE.

In some examples of the method, apparatuses, and non-transitory computer-readable medium described herein, the first downlink resource may be a common resource for transmission of the one or more reference signals to a set of UEs, and the first uplink resource may be a UE-specific resource configured separately for each of the set of UEs.

In some examples of the method, apparatuses, and non-transitory computer-readable medium described herein, the first uplink resource includes one or more of physical uplink control channel resources, physical random access channel resources, or combinations thereof.

In some examples of the method, apparatuses, and non-transitory computer-readable medium described herein, the first uplink resource includes one or more of UE-specific time resources, frequency resources, spatial resources, code-domain resources, or combinations thereof.

A method of wireless communication at a wireless device is described. The method may include identifying a first wireless resource for an on-demand beam failure recovery procedure and periodic wireless resources that are configured for use in other beam failure recovery procedures. The method may also include determining that a communication failure has occurred during a first communication period, and determining that a second communication period includes the periodic wireless resources. The method may also include selecting one of the first wireless resource or the periodic wireless resources for performing the on-demand beam failure recovery procedure based on the communication failure and the second communication period including the periodic wireless resources. Additionally, the method may include performing the on-demand beam failure recovery procedure using the selected wireless resources.

An apparatus for wireless communication at a wireless device is described. The apparatus may include a processor and memory coupled with the processor. The processor and memory may be configured to identify a first wireless resource for an on-demand beam failure recovery procedure and periodic wireless resources that are configured for use in other beam failure recovery procedures. The processor and memory may be configured to determine that a communication failure has occurred during a first communication period. In addition, the processor and memory may be configured to determine that a second communication period includes the periodic wireless resources. The processor and memory may be further configured to select one of the first wireless resource or the periodic wireless resources for performing the on-demand beam failure recovery procedure based on the communication failure and the second communication period including the periodic wireless resources. The processor and memory may also be configured to perform the on-demand beam failure recovery procedure using the selected wireless resources.

Another apparatus for wireless communication at a wireless device is described. The apparatus may include means for identifying a first wireless resource for an on-demand beam failure recovery procedure and periodic wireless resources that are configured for use in other beam failure recovery procedures, determining that a communication failure has occurred during a first communication period, determining that a second communication period includes the periodic wireless resources, selecting one of the first wireless resource or the periodic wireless resources for performing the on-demand beam failure recovery procedure based on the communication failure and the second communication period including the periodic wireless resources, and performing the on-demand beam failure recovery procedure using the selected wireless resources.

A non-transitory computer-readable medium storing code for wireless communication at a wireless device is described. The code may include instructions executable by a processor to identify a first wireless resource for an on-demand beam failure recovery procedure and periodic wireless resources that are configured for use in other beam failure recovery procedures, determine that a communication failure has occurred during a first communication period, determine that a second communication period includes the periodic wireless resources, select one of the first wireless resource or the periodic wireless resources for performing the on-demand beam failure recovery procedure based on the communication failure and the second communication period including the periodic wireless resources, and perform the on-demand beam failure recovery procedure using the selected wireless resources.

In some examples of the method, apparatuses, and non-transitory computer-readable medium described herein, the selecting may include operations, features, means, or instructions for identifying that the periodic wireless resources may have priority over the first wireless resource in the second communication period, and selecting the periodic wireless resources for performing the on-demand beam failure recovery procedure.

In some examples of the method, apparatuses, and non-transitory computer-readable medium described herein, the priority of the first wireless resource and the periodic wireless resources may be based on a latency target of communications during the first communication period.

In some examples of the method, apparatuses, and non-transitory computer-readable medium described herein, the selecting may include operations, features, means, or instructions for determining that communications during the first communication period may be low latency communications, and selecting the first wireless resource for performing the on-demand beam failure recovery procedure based on the communications during the first communication period being low latency communications.

In some examples of the method, apparatuses, and non-transitory computer-readable medium described herein, the selecting may include operations, features, means, or instructions for selecting the periodic wireless resources for performing the on-demand beam failure recovery procedure based on a timing of the periodic wireless resources being within a time threshold of the first wireless resource.

A method of wireless communication at a wireless device is described. The method may include determining that an uplink communication has an uplink payload that is at or below a threshold payload size. Uplink communications that have a payload size above the threshold payload size may have a cyclic redundancy check (CRC) appended to the uplink payload. Uplink communications that have a payload size at or below the threshold payload size may be transmitted without a CRC appended to the uplink payload. The method may also include configuring uplink communications to include acknowledgment feedback to include the CRC appended to the uplink payload irrespective of the uplink payload size. Additionally, the method may include processing an uplink communication based on the uplink communication including the acknowledgment feedback and the CRC.

An apparatus for wireless communication at a wireless device is described. The apparatus may include a processor and memory coupled with the processor. The processor and memory are configured to determine that an uplink communication has an uplink payload that is at or below a threshold payload size. Uplink communications having a payload size above the threshold payload size are to have a CRC appended to the uplink payload and uplink communications having a payload size at or below the threshold payload size are to be transmitted without a CRC appended to the uplink payload. The processor and memory are configured to configure uplink communications to include acknowledgment feedback to include the CRC appended to the uplink payload irrespective of the uplink payload size. The processor and memory are also configured to process an uplink communication based on the uplink communication including the acknowledgment feedback and the CRC.

Another apparatus for wireless communication at a wireless device is described. The apparatus may include means for determining that an uplink communication has an uplink payload that is at or below a threshold payload size, where uplink communications having a payload size above the threshold payload size are to have a CRC appended to the uplink payload and uplink communications having a payload size at or below the threshold payload size are to be transmitted without a CRC appended to the uplink payload, configuring uplink communications to include acknowledgment feedback to include the CRC appended to the uplink payload irrespective of the uplink payload size, and processing an uplink communication based on the uplink communication including the acknowledgment feedback and the CRC.

A non-transitory computer-readable medium storing code for wireless communication at a wireless device is described. The code may include instructions executable by a processor to determine that an uplink communication has an uplink payload that is at or below a threshold payload size, where uplink communications having a payload size above the threshold payload size are to have a CRC appended to the uplink payload and uplink communications having a payload size at or below the threshold payload size are to be transmitted without a CRC appended to the uplink payload, configure uplink communications to include acknowledgment feedback to include the CRC appended to the uplink payload irrespective of the uplink payload size, and process an uplink communication based on the uplink communication including the acknowledgment feedback and the CRC.

In some examples of the method, apparatuses, and non-transitory computer-readable medium described herein, the configuring may include operations, features, means, or instructions for formatting the acknowledgment feedback for transmission with uplink shared channel data, and where the acknowledgment feedback and the uplink shared channel data share a same CRC.

In some examples of the method, apparatuses, and non-transitory computer-readable medium described herein, the acknowledgment feedback may be transmitted in a medium access control (MAC) control element with the uplink shared channel data.

In some examples of the method, apparatuses, and non-transitory computer-readable medium described herein, the acknowledgment feedback may be a one-bit indication of receipt of motion control data, and may be transmitted with the uplink shared channel data.

In some examples of the method, apparatuses, and non-transitory computer-readable medium described herein, the configuring may include operations, features, means, or instructions for configuring the acknowledgment feedback to exceed the threshold payload size.

In some examples of the method, apparatuses, and non-transitory computer-readable medium described herein, the acknowledgment feedback may be padded with one or more bits to may have a payload size that exceeds the threshold payload size.

In some examples of the method, apparatuses, and non-transitory computer-readable medium described herein, the acknowledgment feedback may be encoded to may have a larger payload size than the threshold payload size.

In some examples of the method, apparatuses, and non-transitory computer-readable medium described herein, the acknowledgment feedback may be repeated one or more times to provide a payload size that exceeds the threshold payload size.

In some examples of the method, apparatuses, and non-transitory computer-readable medium described herein, the configuring may include operations, features, means, or instructions for providing a dynamic indication that the acknowledgment feedback may be to include the CRC irrespective of the uplink payload size.

A method of wireless communication at a wireless device is described. The method may include configuring a wireless resource for a beam failure recovery procedure. The method may also include determining, based on a failure to receive an acknowledgment feedback for communications in a first communication period, an initial failure state for the first communication period. The method may also include confirming, based on a redundant indication of the acknowledgment feedback, a communication failure for the first communication period. Additionally, the method may include performing the beam failure recovery procedure using the wireless resource.

An apparatus for wireless communication at a wireless device is described. The apparatus may include a processor and memory coupled with the processor. The processor and memory may be configured to configure a wireless resource for a beam failure recovery procedure and determine, based on a failure to receive an acknowledgment feedback for communications in a first communication period, an initial failure state for the first communication period. The processor and memory may be configured to confirm, based on a redundant indication of the acknowledgment feedback, a communication failure for the first communication period. The processor and memory may also be configured to perform the beam failure recovery procedure using the wireless resource.

Another apparatus for wireless communication at a wireless device is described. The apparatus may include means for configuring a wireless resource for a beam failure recovery procedure, determining, based on a failure to receive an acknowledgment feedback for communications in a first communication period, an initial failure state for the first communication period, confirming, based on a redundant indication of the acknowledgment feedback, a communication failure for the first communication period, and performing the beam failure recovery procedure using the wireless resource.

A non-transitory computer-readable medium storing code for wireless communication at a wireless device is described. The code may include instructions executable by a processor to configure a wireless resource for a beam failure recovery procedure, determine, based on a failure to receive an acknowledgment feedback for communications in a first communication period, an initial failure state for the first communication period, confirm, based on a redundant indication of the acknowledgment feedback, a communication failure for the first communication period, and perform the beam failure recovery procedure using the wireless resource.

In some examples of the method, apparatuses, and non-transitory computer-readable medium described herein, the method may be performed at a UE, and where the confirming the communication failure may include operations, features, means, or instructions for monitoring a downlink portion of the wireless resource for one or more reference signal transmissions via one or more candidate beams to be selected by the UE, determining that the one or more reference signal transmissions may be present on the downlink portion of the wireless resource, selecting a first candidate beam based on measurements of the one or more reference signal transmissions, and transmitting a beam failure request on an uplink portion of the wireless resource that indicates the first candidate beam.

In some examples of the method, apparatuses, and non-transitory computer-readable medium described herein, the one or more reference signal transmissions may be identified based on a scrambling sequence used to scramble the one or more reference signal transmissions.

Some examples of the method, apparatuses, and non-transitory computer-readable medium described herein may further include operations, features, means, or instructions for determining, for a subsequent communication period, the initial failure state for the subsequent communication period, monitoring the downlink portion of the wireless resource associated with the subsequent communication period for the one or more reference signal transmissions, determining that the one or more reference signal transmissions may be absent on the downlink portion of the wireless resource associated with the subsequent communication period, and discontinuing the beam failure recovery procedure based on the determining the absence of the one or more reference signal transmissions on the downlink portion of the wireless resource associated with the subsequent communication period.

In some examples of the method, apparatuses, and non-transitory computer-readable medium described herein, the method may be performed by a base station, and where the confirming the communication failure may include operations, features, means, or instructions for transmitting, in a downlink transmission to a UE, an indication that the beam failure recovery procedure may be activated, and receiving, from the UE, a response to the indication that the beam failure recovery procedure may be activated.

In some examples of the method, apparatuses, and non-transitory computer-readable medium described herein, the response from the UE indicates an acceptance of the beam failure recovery procedure being activated, and where the base station performs the beam failure recovery procedure based on the acceptance.

In some examples of the method, apparatuses, and non-transitory computer-readable medium described herein, the response from the UE indicates that the UE declines the activation of the beam failure recovery procedure and indicates successful communications during the first communication period, and where the base station discontinues the beam failure recovery procedure based on the response from the UE.

In some examples of the method, apparatuses, and non-transitory computer-readable medium described herein, the method may be performed by a UE, and where the confirming the communication failure may include operations, features, means, or instructions for receiving, in a downlink transmission from a base station, an indication that the beam failure recovery procedure may be activated, and transmitting, to the base station, a response to the indication that the beam failure recovery procedure may be activated.

In some examples of the method, apparatuses, and non-transitory computer-readable medium described herein, the response to the base station indicates an acceptance of the beam failure recovery procedure being activated, and where the UE performs the beam failure recovery procedure based on the acceptance.

In some examples of the method, apparatuses, and non-transitory computer-readable medium described herein, the response to the base station indicates that the UE declines the activation of the beam failure recovery procedure and indicates successful communications during the first communication period, and where the UE discontinues the beam failure recovery procedure based on the response to the base station.

In some examples of the method, apparatuses, and non-transitory computer-readable medium described herein, the method may be performed by a UE, and where the confirming the communication failure may include operations, features, means, or instructions for transmitting, to a base station, a request to activate the beam failure recovery procedure, where the request indicates that a prior downlink transmission from the base station was unsuccessfully received at the UE.

In some examples of the method, apparatuses, and non-transitory computer-readable medium described herein, the method may be performed by a base station, and where the confirming the communication failure may include operations, features, means, or instructions for receiving, from a UE, a request to activate the beam failure recovery procedure, where the request indicates that a prior downlink transmission from the base station was unsuccessfully received at the UE.

In some examples of the method, apparatuses, and non-transitory computer-readable medium described herein, the method may be performed by a UE, and where the confirming the communication failure may include operations, features, means, or instructions for polling a base station that was to receive an uplink communication from the UE during a prior communications period to determine whether the acknowledgment feedback was transmitted by the base station, receiving a response from the base station that indicates whether the acknowledgment feedback was transmitted by the base station, and continuing or discontinuing the beam failure recovery procedure based on the response from the base station.

In some examples of the method, apparatuses, and non-transitory computer-readable medium described herein, the uplink communication from the UE during the prior communications period may be identified based on a sequence number of the uplink communication, an index of a resource allocation of the uplink communication, or any combinations thereof.

In some examples of the method, apparatuses, and non-transitory computer-readable medium described herein, the polling may be transmitted in uplink communications that carries uplink control information or data traffic.

In some examples of the method, apparatuses, and non-transitory computer-readable medium described herein, the polling transmitted using a different beam or a different transmission-reception-point (TRP) than used for an original transmission of the uplink communication.

In some examples of the method, apparatuses, and non-transitory computer-readable medium described herein, the response from the base station indicates that the acknowledgment feedback was previously transmitted, and indicates a time of an initial transmission of the acknowledgment feedback.

In some examples of the method, apparatuses, and non-transitory computer-readable medium described herein, the uplink communication included an activation indication, and where an activation time may be determined based on the time of the initial transmission of the acknowledgment feedback.

In some examples of the method, apparatuses, and non-transitory computer-readable medium described herein, the method may be performed by a base station, and where the confirming the communication failure may include operations, features, means, or instructions for polling a UE that was to receive a downlink communication from the base station during a prior communications period to determine whether the acknowledgment feedback was transmitted by the UE, receiving a response from the UE that indicates whether the acknowledgment feedback was transmitted by the UE, and continuing or discontinuing the beam failure recovery procedure based on the response from the UE.

In some examples of the method, apparatuses, and non-transitory computer-readable medium described herein, the downlink communication from the base station during the prior communications period may be identified based on a sequence number of the downlink communication, an index of a resource allocation of the downlink communication, or any combinations thereof.

In some examples of the method, apparatuses, and non-transitory computer-readable medium described herein, the polling may be transmitted in downlink communications that carries downlink control information or data traffic.

In some examples of the method, apparatuses, and non-transitory computer-readable medium described herein, the polling transmitted using a different beam or a different TRP than used for an original transmission of the downlink communication.

In some examples of the method, apparatuses, and non-transitory computer-readable medium described herein, the response from the UE indicates that the acknowledgment feedback was previously transmitted, and indicates a time of an initial transmission of the acknowledgment feedback.

In some examples of the method, apparatuses, and non-transitory computer-readable medium described herein, the downlink communication included an activation indication, and where an activation time may be determined based on the time of the initial transmission of the acknowledgment feedback.

In some examples of the method, apparatuses, and non-transitory computer-readable medium described herein, the confirming the communication failure may include operations, features, means, or instructions for determining that a packet transmitted during the first communication period may be a retransmission of a prior transmission of the packet, and that prior acknowledgment feedback was previously transmitted for the packet, and transmitting an indication of the prior acknowledgment feedback.

In some examples of the method, apparatuses, and non-transitory computer-readable medium described herein, the prior transmission of the packet included an activation indication, and where an activation time may be determined based on a transmission time of the prior acknowledgment feedback.

A method of wireless communication at a wireless device is described. The method may include identifying a wireless resource for a beam failure recovery procedure. A determination to initiate the beam failure recovery procedure may be based on an acknowledgment feedback for communications in a first communication period. The method may also include determining that the first communication period has an absence of data to be transmitted. The method may also include transmitting an indication that the first communication period has an absence of data to be transmitted. Additionally, the method may include assuming, for purposes of initiating the beam failure recovery procedure, that the acknowledgment feedback associated with the first communication period indicates successful communications.

An apparatus for wireless communication at a wireless device is described. The apparatus may include a processor and memory coupled with the processor. The processor and memory may be configured to identify a wireless resource for a beam failure recovery procedure, where a determination to initiate the beam failure recovery procedure is based on an acknowledgment feedback for communications in a first communication period. The processor and memory may be configured to determine that the first communication period has an absence of data to be transmitted. The processor and memory may also be configured to transmit an indication that the first communication period has an absence of data to be transmitted. The processor and memory may be configured to assume, for purposes of initiating the beam failure recovery procedure, that the acknowledgment feedback associated with the first communication period indicates successful communications.

Another apparatus for wireless communication at a wireless device is described. The apparatus may include means for identifying a wireless resource for a beam failure recovery procedure, where a determination to initiate the beam failure recovery procedure is based on an acknowledgment feedback for communications in a first communication period, determining that the first communication period has an absence of data to be transmitted, transmitting an indication that the first communication period has an absence of data to be transmitted, and assuming, for purposes of initiating the beam failure recovery procedure, that the acknowledgment feedback associated with the first communication period indicates successful communications.

A non-transitory computer-readable medium storing code for wireless communication at a wireless device is described. The code may include instructions executable by a processor to identify a wireless resource for a beam failure recovery procedure, where a determination to initiate the beam failure recovery procedure is based on an acknowledgment feedback for communications in a first communication period, determine that the first communication period has an absence of data to be transmitted, transmit an indication that the first communication period has an absence of data to be transmitted, and assume, for purposes of initiating the beam failure recovery procedure, that the acknowledgment feedback associated with the first communication period indicates successful communications.

In some examples of the method, apparatuses, and non-transitory computer-readable medium described herein, the indication that the first communication period may have the absence of data to be transmitted may be a physical or bit sequence.

In some examples of the method, apparatuses, and non-transitory computer-readable medium described herein, the indication that the first communication period may have the absence of data to be transmitted may be a lack of any transmission in the first communication period.

In some examples of the method, apparatuses, and non-transitory computer-readable medium described herein, the indication that the first communication period may have the absence of data to be transmitted may be provided before, during, or after the first communication period.

A method of wireless communication at a first wireless device is described. The method may include establishing a wireless connection via a first beam pair link with a second wireless device. The method may also include receiving an indication from the second wireless device that a first transmission in a first communications period is transmitted according to a first beam sweep pattern that uses one or more beams. The method may also include receiving the first transmission from the second wireless device in the first communications period according to the first beam sweep pattern. Additionally, the method may include transmitting a responsive transmission to the second wireless device based on the first transmission. The responsive transmission may be transmitted in the first communications period using a second beam sweep pattern that corresponds to the first beam sweep pattern.

An apparatus for wireless communication at a first wireless device is described. The apparatus may include a processor and memory coupled with the processor. The processor memory may be configured to establish a wireless connection via a first beam pair link with a second wireless device. The processor and memory may be configured to receive an indication from the second wireless device that a first transmission in a first communications period is transmitted according to a first beam sweep pattern that uses one or more beams. The processor and memory may be further configured to receive the first transmission from the second wireless device in the first communications period according to the first beam sweep pattern, and transmit a responsive transmission to the second wireless device based on the first transmission. The responsive transmission is transmitted in the first communications period using a second beam sweep pattern that corresponds to the first beam sweep pattern.

Another apparatus for wireless communication at a first wireless device is described. The apparatus may include means for establishing a wireless connection via a first beam pair link with a second wireless device, receiving an indication from the second wireless device that a first transmission in a first communications period is transmitted according to a first beam sweep pattern that uses one or more beams, receiving the first transmission from the second wireless device in the first communications period according to the first beam sweep pattern, and transmitting a responsive transmission to the second wireless device based on the first transmission, where the responsive transmission is transmitted in the first communications period using a second beam sweep pattern that corresponds to the first beam sweep pattern.

A non-transitory computer-readable medium storing code for wireless communication at a first wireless device is described. The code may include instructions executable by a processor to establish a wireless connection via a first beam pair link with a second wireless device, receive an indication from the second wireless device that a first transmission in a first communications period is transmitted according to a first beam sweep pattern that uses one or more beams, receive the first transmission from the second wireless device in the first communications period according to the first beam sweep pattern, and transmit a responsive transmission to the second wireless device based on the first transmission, where the responsive transmission is transmitted in the first communications period using a second beam sweep pattern that corresponds to the first beam sweep pattern.

In some examples of the method, apparatuses, and non-transitory computer-readable medium described herein, the first transmission may be a downlink transmission that includes downlink shared channel information, downlink control channel information, or combinations thereof, and the responsive transmission may be an uplink transmission that includes uplink shared channel information, uplink control channel information, or combinations thereof.

In some examples of the method, apparatuses, and non-transitory computer-readable medium described herein, the first beam sweep pattern includes a set of downlink beams, and the second beam sweep pattern includes a set of uplink beams having reciprocal beams to the set of downlink beams.

A method of wireless communication at a first wireless device is described. The method may include establishing a wireless connection via a first beam pair link with a second wireless device. The method may also include initiating, based on a communications failure with the second wireless device during a first communications period, a beam failure recovery procedure during a second communications period. The method may also include communicating with the second wireless device using a second beam pair link during the second communications period. The method may also include establishing, based on the beam failure recovery procedure, an updated first beam pair link. Additionally, The method may include resuming communications, subsequent to the second communications period, using the updated first beam pair link.

An apparatus for wireless communication at a first wireless device is described. The apparatus may include a processor and memory coupled with the processor. The processor and memory may be configured to establish a wireless connection via a first beam pair link with a second wireless device. The processor and memory may be configured to initiate, based on a communications failure with the second wireless device during a first communications period, a beam failure recovery procedure during a second communications period. The processor and memory may be configured to communicate with the second wireless device using a second beam pair link during the second communications period. The processor memory may be configured to establish, based on the beam failure recovery procedure, an updated first beam pair link. The processor and memory may also be configured to resume communications, subsequent to the second communications period, using the updated first beam pair link.

Another apparatus for wireless communication at a first wireless device is described. The apparatus may include means for establishing a wireless connection via a first beam pair link with a second wireless device, initiating, based on a communications failure with the second wireless device during a first communications period, a beam failure recovery procedure during a second communications period, communicating with the second wireless device using a second beam pair link during the second communications period, establishing, based on the beam failure recovery procedure, an updated first beam pair link, and resuming communications, subsequent to the second communications period, using the updated first beam pair link.

A non-transitory computer-readable medium storing code for wireless communication at a first wireless device is described. The code may include instructions executable by a processor to establish a wireless connection via a first beam pair link with a second wireless device, initiate, based on a communications failure with the second wireless device during a first communications period, a beam failure recovery procedure during a second communications period, communicate with the second wireless device using a second beam pair link during the second communications period, establish, based on the beam failure recovery procedure, an updated first beam pair link, and resume communications, subsequent to the second communications period, using the updated first beam pair link.

In some examples of the method, apparatuses, and non-transitory computer-readable medium described herein, the second beam pair link uses a different TRP than the first beam pair link, and where the different TRP and the second beam pair link may be preconfigured prior to the first communications period.

Some examples of the method, apparatuses, and non-transitory computer-readable medium described herein may further include operations, features, means, or instructions for transmitting redundant communications to the second wireless device using the first beam pair link during the second communications period.

Some examples of the method, apparatuses, and non-transitory computer-readable medium described herein may further include operations, features, means, or instructions for releasing resources associated with the second beam pair link responsive to establishing the updated first beam pair link.

DETAILED DESCRIPTION

Figure 1:
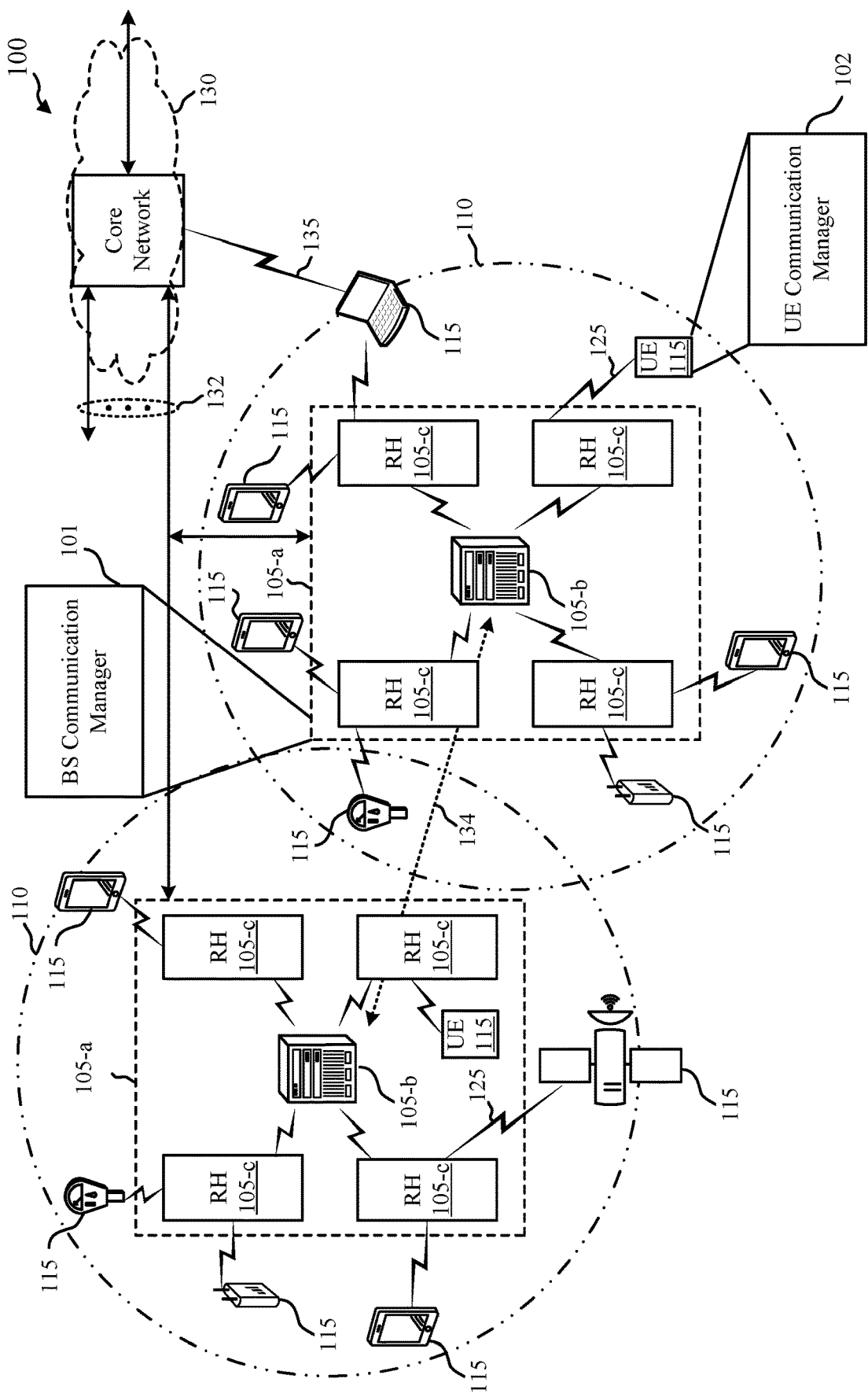
FIG. 1 illustrates an example of a system for wireless communications that supports beam failure recovery techniques in accordance with one or more aspects of the present disclosure.

Wireless communications systems may operate in millimeter wave (mmW) frequency ranges (e.g., 28 gigahertz (GHz), 40 GHz, 60 GHz, etc.). Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed. Moreover, a receiving device may use beamforming techniques to configure antenna(s) and/or antenna array(s) such that transmissions are received in a directional manner. In some cases, a device may select an active beam for communicating with a network by selecting the strongest beam from among a number of candidate beams.

In some aspects, wireless communications systems, such as those operating in the mmW frequency ranges, may experience a loss of communications due to a beam failure event and/or a radio link failure event. For example, due to UE mobility, blocking, and the like, the current transmit/receive beam pair link (BPL) for the UE and/or the base station may become unavailable or otherwise unusable. When this occurs, a communication failure recovery procedure may be implemented in order to identify and activate a new beam to use for communications. Some techniques may include resources for the communication failure recovery procedure preconfigured for the UE and/or base station and being available. For example, a certain set of resources may be configured according to a periodic schedule (e.g., for every slot, every other slot, etc.). In some cases, on-demand resources may be activated during a communication failure, but are otherwise available for use during normal wireless communications. For example, a wireless device, which may be an example of a UE and/or a base station, may identify the resources that are configured in a first state. In some aspects, the resources configured in the first state may be active or otherwise available to use for wireless communications between the base station and UE, between base stations, and/or between UEs. However, the resources configured in the first state may be inactive to use for a communication failure recovery procedure. The wireless device (e.g., the base station and/or UE) may determine that a communication failure has occurred during a first communication period, for example, a beam failure, a radio link failure, and the like. Accordingly, the wireless device may transition the resources to a second state where the resources are inactive for wireless communications, but are active for the communication failure recovery procedure. The wireless device may use the resources that have been transitioned to the second state to perform a communication failure recovery procedure.

In some cases, a base station may determine that on-demand resources are to be used for at least some communication failures (e.g., communication failures for certain UEs, communication failures for UEs that have low latency or high priority services enabled, etc.), and may pre-configure one or more UEs with on-demand failure recovery resources (which may be referred to herein as beam failure recovery (BFR) resources) that may be activated by the UE and base station in the event of a communications failure. Such on-demand BFR resources may be activated upon determination of a communications failure and may be used to establish an updated BPL to be used for subsequent communications. In some cases, one or more UEs may be configured with both on-demand BFR resources and periodic BFR resources. In such cases, a priority rule may be utilized to select which of the on-demand BFR resources or the periodic BFR resources are to be used for establishing the updated BPL.

In some cases, activation of the on-demand BFR resources for a BFR procedure may be based on one or both of the UE or base station not receiving an expected communication or receiving a feedback indication that indicates a particular communication was not successfully received. For example, a base station may transmit a downlink communication to a UE based on a downlink resource allocation. In cases where the UE receives the downlink resource allocation and does not successfully decode the downlink communication, the UE may transmit a negative acknowledgment (NACK) to the base station to indicate that the downlink communication failed. Further, in cases where the UE does not successfully receive the downlink resource allocation, the UE may not monitor for the downlink communication and may not transmit any feedback, which the base station may then consider to be a communications failure. Further, in some cases the UE may successfully receive the downlink communication and transmit an acknowledgement (ACK) of successful receipt to the base station, but the base station may not receive the ACK feedback or there may be a decoding error that results in the base station decoding an ACK when the UE transmitted a NACK. Similar situations may occur when the UE transmits uplink transmissions to the base station.

Various aspects of the present disclosure further provide techniques for enhancing the robustness of beam failure recovery activations, to reduce cases where one wireless device (e.g., a UE or base station) may assume a communications failure has occurred and the other wireless device does not think a communications failure has occurred. In some cases, reliability of acknowledgment feedback transmission may be enhanced by providing that such acknowledgment feedback is transmitted with a CRC regardless of a payload size of the acknowledgment feedback, which may reduce instances of a receiving device incorrectly decoding an ACK as a NACK. In some cases, reliability of BFR resource activations may be enhanced through one or more redundant indications that BFR resources are to be activated. Additionally or alternatively, in some cases a no-traffic indication may be provided by a transmitting device, which a receiving device may use to determine that a lack of transmission is intentional and not assume that there has been a communications failure. Various of the techniques provided herein, or combinations thereof, may allow for more reliable and efficient communications due to reduced numbers of occasions where one wireless device of a BPL activates BFR resources to initiate the BFR procedure.

Further, in some cases, communications reliability may be enhanced through transmissions using multiple beams. In such cases, a base station may, for example, transmit a downlink transmission using a beam sweeping pattern (e.g., all or a portion of a downlink transmission transmitted using multiple different beams), which may enhance the likelihood of successful receipt at the UE. Further, in some cases the UE may transmit a responsive uplink communication using uplink beams that are quasi-co-located (QCLed) with the beams of the beam sweeping pattern used for the downlink transmission. In some cases, such techniques may be used based on one or more measurements that indicate an established BPL may be becoming unreliable, and beam sweeping using multiple beams that are relatively close to the established BPL may enhance the likelihood of successful communications.

Additionally, in some cases, in order to reduce communications gaps in the event that a communications failure occurs on a first BPL with a first TRP, a UE may use a different TRP and/or BPL for communications while a BFR procedure is being performed for the first BPL/TRP. In some case, upon activation of the BFR resources, the UE and second TRP may transmit communications in order to maintain connectivity for the UE. Once the BFR procedure is complete and an updated BPL is established between the UE and the first TRP, the resources associated with the second BPL/TRP may be released. In some cases, the UE and second TRP/BPL may be preconfigured for such communications in the event of a communications failure of the first BPL/TRP. In some cases, the second TRP/BPL may be pre-configured based on signal quality measurements of the first TRP/BPL being below a threshold value, or based on periodic time intervals when communications failures historically occur (e.g., due to periodic equipment movements in an industrial Internet of Things (IIoT) deployment).

Aspects of the disclosure are initially described in the context of a wireless communications system. Aspects of the disclosure are further illustrated by and described with reference to apparatus diagrams, system diagrams, and flowcharts that relate to beam failure recovery techniques.

FIG. 1 illustrates an example of a wireless communications system 100 that supports beam failure recovery techniques in accordance with one or more aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105-a, may include subcomponents such as an access network entity 105-b, which may be an example of an access node controller (ANC). Each access network entity 105-b may communicate with UEs 115 through a number of other access network transmission entities, which may be referred to as a radio head 105-c, a smart radio head, or a TRP. In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, such as in the range of 300 megahertz (MHz) to 300 GHz. The region from 300 MHz to 3 GHz is sometimes known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a CRC), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of Ts=1/30,720,000 seconds. Time intervals of a communications resource may be organized according to radio frames each having a duration of 10 milliseconds (ms), where the frame period may be expressed as Tf=307,200 Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

One or more of the base stations 105, when configured as a wireless device, may include a base station (BS) communication manager 101, which may identify a resource for wireless communication, the resource being in a first state where the resource is active for wireless communication and is inactive for a communication failure recovery procedure. The BS communication manager 101 may determine that a communication failure has occurred during a first communication period. The BS communication manager 101 may transition, during a second communication period and based at least in part on the communication failure, the resource to a second state where the resource is inactive for wireless communication and is active for the communication recovery procedure. The BS communication manager 101 may perform the communication failure recovery procedure using the resource transitioned to the second state. In some cases, the resource may be preconfigured (e.g., via RRC signaling) as an on-demand BFR resource. In some cases, determination of the communications failure may be based on one or more enhanced feedback communications or redundant indications of a failure.

UEs 115, when configured as a wireless device, may include a UE communication manager 102, which may identify a resource for wireless communication, the resource being in a first state where the resource is active for wireless communication and is inactive for a communication failure recovery procedure. The UE communication manager 102 may determine that a communication failure has occurred during a first communication period. The UE communication manager 102 may transition, during a second communication period and based at least in part on the communication failure, the resource to a second state where the resource is inactive for wireless communication and is active for the communication recovery procedure. The UE communication manager 102 may perform the communication failure recovery procedure using the resource transitioned to the second state. In some cases, determination of the communications failure may be based on one or more enhanced feedback communications or redundant indications of a failure.

Figure 2A:
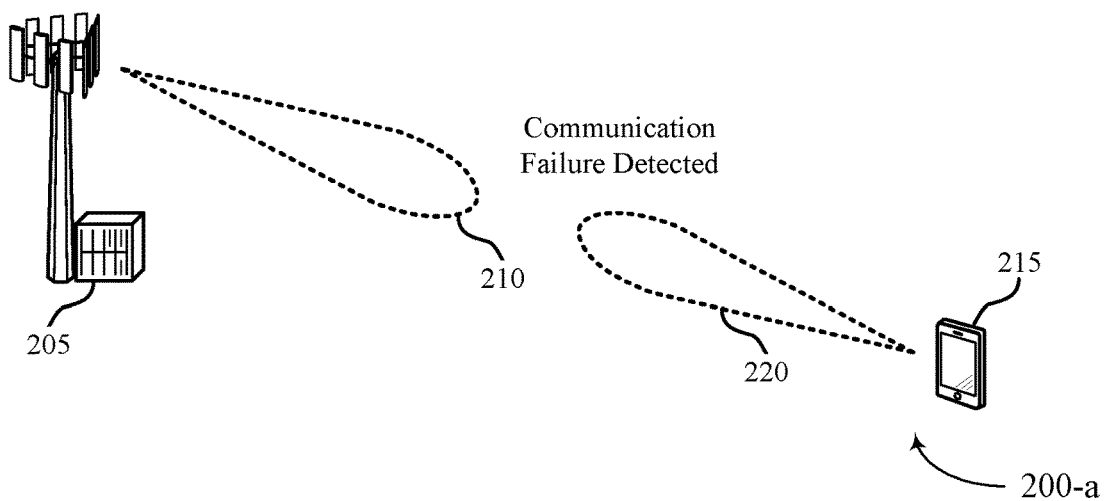
FIGS. 2A-2C illustrate examples of a wireless communications system that supports beam failure recovery techniques in accordance with one or more aspects of the present disclosure.
Figure 2B:
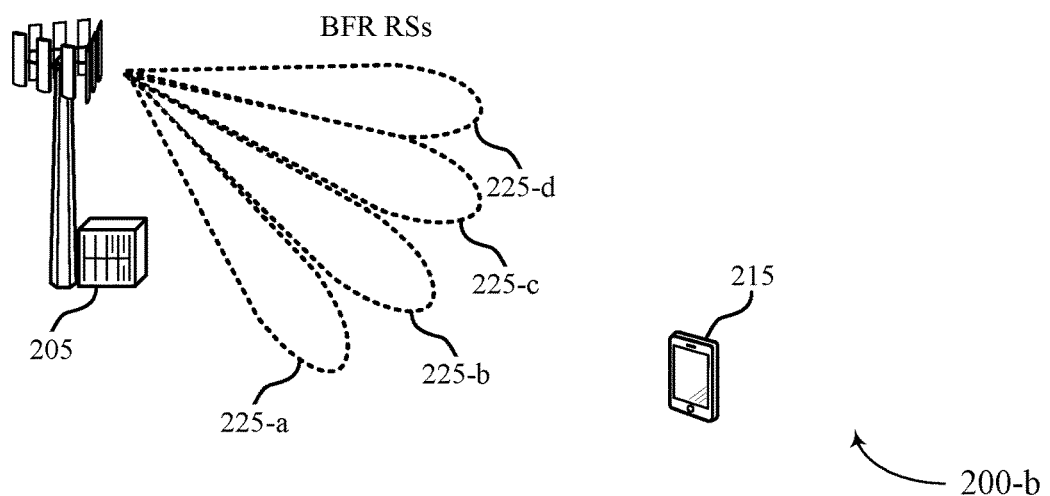
Figure 2C:
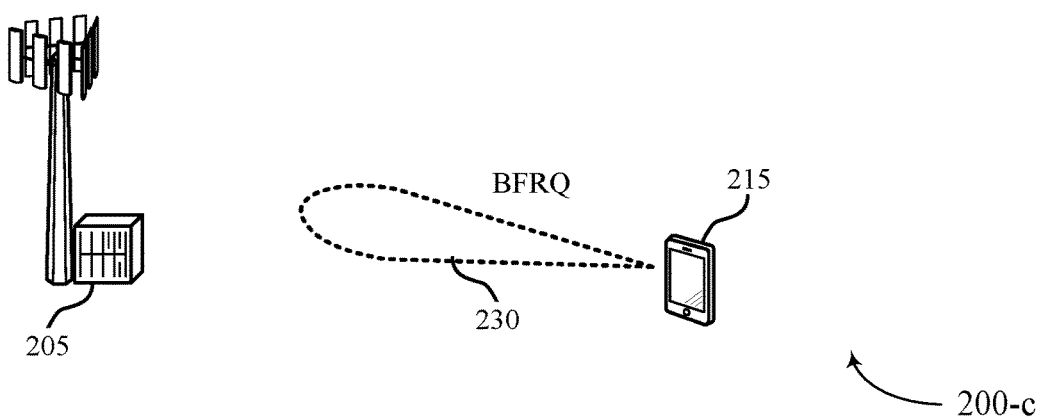

FIG. 2A-2C illustrates an example of a wireless communications system 200 that supports beam failure recovery techniques in accordance with one or more aspects of the present disclosure. In some examples, wireless communications system 200 may implement aspects of wireless communications system 100. Aspects of wireless communications system 200 may be implemented by a base station 205 and/or a UE 215, which may be examples of the corresponding devices described herein.

Base station 205 may be communicating with UE 215 using a first BPL that may include a first beam 210 used by the base station 205 and a second beam 220 used by the UE 215. In some aspects, beam 210 and/or 220 may be considered an active beam or BPL. That is, beam 210 may be an active transmit beam and/or an active receive beam used by base station 205 to perform wireless communications with UE 215. Similarly, beam 220 may be an active transmit beam and/or an active receive beam used by UE 215 perform wireless communications with base station 205.

In some aspects, techniques may include periodic BFR resources that are preconfigured for base station 205 and UE 215, and on-demand BFR resources that are preconfigured and activated in the event of a communications failure. In some cases, to reduce overhead, on-demand BFR resources may be configured. In cases where periodic BFR resources are configured, for example, since both sides may not know when a communication failure will happen, the periods of beam failure indication (BFI) reporting and/or contention free random access (CFRA) random access channel (RACH) resource may be relatively long, so as to reduce overhead associated with such periodic resources. For example, BFI reporting periodicity may be at least 2 ms, the RACH resource periodicity may be at least 10 ms, there may be 4 slots between a RACH transmission slot and the response window start slot, and the like. In some aspects, the average BFR completion duration may be large, e.g., at least (BFI report periodicity)/2+(RACH resource period)/2+4 slots=6.5 ms. This may assume that the beam failure discovery (BFD) reference signal period is at most 2 ms, a maximum count of BFI's of one, a latency for BFI report to next candidate beam reference signal being negligible, the response window duration is one slot, and that there is no error from the preamble transmission to the response reception. Latency may be further increased where retransmission is involved. However, this approach, may have a relatively large latency that may not be desirable for high priority or low latency communications.

Thus, in some cases on-demand BFR resources may be configured that are activated in the event of a communications failure. For example, on-demand BFR resources may be pre-configured (e.g., via RRC signaling), and used for a BFR procedure in the event of a communications failure, and otherwise used for uplink and downlink communications in the event of no communications failure. A communication period/cycle may be considered to have failed if a packet being communicated in at least one direction (e.g., uplink and/or downlink) is not successfully received and decoded. In some examples, this may include any retransmissions of the failed packet. In some aspects, a communication failure of a communication period/cycle may indicate that a beam failure has occurred (e.g., which may include a loss of all active control beams within a cell) and/or a radio link failure (e.g., which may include the whole cell failing, such as a complete loss of communications between the cell and the UE 215). In some aspects, the communication period/cycle may refer to any time frame in which communications are performed between base station 205 and UE 215. For example, based on periodic traffic, base station 205 and/or UE 215 may be in sync with regards to expected communications (e.g., for an initial transmission and/or a retransmission) such that a communication failure within a communication period/cycle is known or can otherwise be detected by each device.

In some aspects, configured on-demand BFR resources may include a resource (e.g., time resource(s), frequency resource(s), spatial resource(s), code resource(s), and the like, alone or in any combination) that are configured for base station 205 and UE 215. For example, base station 205 may transmit a signal (e.g., an RRC signal, a MAC control element, and the like) to UE 215 that configures the resource. In some cases, the resource may be configured in a first state where the resource is active for wireless communications between base station 205 and UE 215, but is inactive for a communication failure recovery procedure. That is, the resource may be available for ongoing communications between base station 205 and UE 215 over beams 210 and 220, respectively, but may be dynamically activated (e.g., transitioned to a second state) upon detecting or otherwise determining that a communication failure has occurred during a first communication period/cycle. In the second state, the resource may be inactive for wireless communications, but active for the communication failure recovery procedure. Accordingly, base station 205 and UE 215 may transition the resource to the second state in response to a communication failure, and use the resource during a communication failure recovery procedure to identify a new candidate beam to use for future communications. That is, the new beam identified in the communication period/cycle in which the communication failure recovery procedure occurs may be applied to the following communication period/cycle.

Accordingly and with reference to FIG. 2A, base station 205 and UE 215 may identify a resource for wireless communications, with the resource being in the first state. The wireless communications may include base station 205 communicating with UE 215 with a first BPL that includes beam 210 (e.g., a currently active transmit and/or receive beam of base station 205) and beam 220 (e.g., a currently active transmit and/or receive beam of UE 215). In some cases, base station 205 and/or UE 215 may determine that a communication failure has occurred during a first communication period. As discussed, the communication failure may refer to a beam failure (e.g., a loss of control beams of base station 205), a radio link failure (e.g., a complete loss of communications between base station 205 and UE 215), and the like. The first communication period (or cycle) may refer to any time period in which an expected communication of information (uplink, downlink, or both) occurs between base station 205 and UE 215. In one non-limiting example, this may include an initial transmission and/or retransmission not being transmitted from UE 215 or not being received by base station 205. For example, UE 215 may not transmit, or base station 205 may not receive, a downlink acknowledgment transmission and/or an uplink packet transmission.

Accordingly, in some examples base station 205 and UE 215 may both detect or otherwise determine that the communication failure has occurred. In response, base station 205 and UE 215 may both transition the on-demand BFR resource to a second state where the resource is inactive for wireless communications, but is active for the communication failure recovery procedure. That is, upon detecting the communication failure, base station 205 and UE 215 may identify the preconfigured BFR resources associated with the BFR procedure (but available to use for wireless communications while in the first state) and transition those resources to the second state where they are available or otherwise active to use for the BFR procedure. Base station 205 and UE 215 may perform the BFR procedure using the resource transitioned to the second state.

For example and with reference to FIG. 2B, this may include base station 205 using the BFR resource transitioned to the second state to transmit one or more BFR candidate beam reference signals (RSs) 225. In some aspects, this may include base station 205 transmitting the BFR candidate beam RSs 225 in a sweeping manner (e.g., in a plurality of directions). For example, base station 205 may transmit BFR candidate beam reference signal (RS) 225-*a* in a first direction, BFR candidate beam RS 225-*b* in a second direction, BFR candidate beam RS 225-*c* in a third direction, and BFR candidate beam RS 225-*d* in a fourth direction In one non-limiting example, this may include base station 205 using a set of candidate beams maintained for UE 215, e.g., the top four, six, etc., candidate beams associated with UE 215. It is to be understood to more or fewer BFR candidate beam RSs 225 may be transmitted.

In some aspects, UE 215 may, based on determining that the communication failure has occurred, monitor the BFR resource transitioned to the second state in order to receive one or more of the BFR candidate beam RSs 225. For example, UE 215 may use one or more receive beams to measure a quality (e.g., a received signal strength) of the BFR candidate beam RSs 225 to identify a preferred candidate beam from the BFR candidate beam RSs 225. For example, UE 215 may identify the best candidate beam and/or top N candidate beams from the BFR candidate beam RSs 225, where N is a positive integer of two or more.

With reference to FIG. 2C, base station 205 may transmit a BFR request signal (BFRQ) to base station 205 that carries or otherwise conveys an indication identifying a preferred candidate beam (e.g., the best candidate beam or top N candidate beams) from the BFR candidate beam RSs 225. In some aspects, the BFRQ may be transmitted using a beam 230 which may, in some examples, correspond to the preferred candidate beam.

Accordingly, base station 205 may receive the BFRQ and identify the preferred candidate beam indicated by UE 215. Base station 205 may use this beam as its new active BPL in wireless communications with UE 215. That is, base station 205 may receive the BFRQ and identify the best candidate beam (or top N candidate beams) that UE 215 received from base station 205. Base station 205 may adopt or otherwise select the preferred candidate beam identified in the BFRQ and select this as the new active beam to use in an updated BPL for communicating with UE 215. Similarly, UE 215 may select the preferred candidate beam (e.g., beam 230) to use for communications with base station 205. Upon successful completion of the BFR procedure, base station 205 and UE 215 may transition the preconfigured BFR resource back to the first state where the BFR resource is active for wireless communications between base station 205 and UE 215. That is, upon base station 205 receiving the BFRQ and identifying the updated BPL, base station 205 and UE 215 may know that the BFR resource is no longer needed for a communication failure recovery procedure, and may therefore transition the BFR resource back to the first state where it is available for wireless communications between base station 205 and UE 215, but inactive for a communication failure recovery procedure.

In some aspects, the one or more BFR candidate beam RSs 225 may be common to all UEs (since it is beam-swept) while the uplink resource (e.g., for the BFRQ using beam 230) may be separately configured on a per-UE basis or an implicitly derived configuration based on a UE's downlink and/or uplink assignment. In some cases, the uplink resource for BFRQ can be a per-UE resources (e.g., indicated in RRC or in a MAC-CE), including physical uplink control channel (PUCCH) resources, physical random access channel (PRACH) resources, or combinations thereof. Such per-UE resources may be separated, for example, in time, frequency, spatial, or code domains, or combinations thereof.

In some cases, the base station 205 and UE 215 may configure both on-demand BFR resources and periodic BFR resources. For example, periodic BFR resources may be configured in which the base station 205 may transmit candidate beam RSs 225 irrespective of whether a communications failure has occurred, and in which the UE 215 may have associated uplink resources (e.g., time resource(s), frequency resource(s), spatial resource(s), code resource(s), and the like, alone or in any combination) for transmission of BFRQ. In some cases, it may happen that the UE 215, base station 205, or both determine that a communications failure has occurred that would trigger activation on the on-demand BFR resources in a time period (e.g., in a communication period or cycle) that also has periodic BFR resources configured. In such cases, a priority rule may be established that indicates which BFR resource to use for the BFR procedure. For example, the priority rule may indicate that the periodic BFR resources are to be used in such a case. In other cases, the priority rule may indicate to use the periodic BFR resources for communications having predetermined latency targets when a failure is determined within a window in advance of the periodic BFR resources (e.g., eMBB communications may use the periodic BFR resources if a failure is detected within a certain number of communications periods of the periodic BFR resource), and to use the on-demand BFR resources for lower latency or higher priority transmissions (e.g., on-demand BFR resources are used for ultra-reliable low latency communications (URLLC)). In such cases, a priority rule may be utilized to select which of the on-demand BFR resources or the periodic BFR resources are to be used for establishing the updated BPL. In some cases, the priority rule may be preconfigured, statically configured, or semi-statically configured.

In some cases, activation of the on-demand BFR resources for a BFR procedure may be based on one or both of the UE 215 or base station 205 not receiving an expected communication or receiving a feedback indication that indicates a particular communication was not successfully received. For example, base station 205 may transmit a downlink communication to UE 215 based on a downlink resource allocation. In cases where the UE 215 receives the downlink resource allocation and does not successfully decode the downlink communication, the UE 215 may transmit a NACK to the base station 205 to indicate that the downlink communication failed. Further, in cases where the UE 215 does not successfully receive the downlink resource allocation, the UE 215 may not monitor for the downlink communication and may not transmit any feedback, which the base station 205 may then consider to be a communications failure. Further, in some cases the UE 215 may successfully receive the downlink communication and transmit an ACK to the base station 205, but the base station 205 may not receive the ACK feedback or there may be a decoding error that results in the base station 205 decoding an ACK when the UE 215 transmitted a NACK. Similar situations may occur when the UE 215 transmits uplink transmissions to the base station 205.

In some cases, the robustness of beam failure recovery activations may be enhanced in accordance with techniques discussed herein to reduce cases where one wireless device (e.g., a UE 215 or base station 205) may assume a communications failure has occurred and the other wireless device does not think a communications failure has occurred. In some cases, reliability of acknowledgment feedback transmission may be enhanced by providing that such acknowledgment feedback is transmitted with a CRC regardless of a payload size of the acknowledgment feedback, which may reduce instances of a receiving device incorrectly decoding an ACK as a NACK. In some cases, reliability of BFR resource activations may be enhanced through one or more redundant indications that BFR resources are to be activated. Additionally or alternatively, in some cases a no-traffic indication may be provided by a transmitting device, which a receiving device may use to determine that a lack of transmission is intentional and not assume that there has been a communications failure. Various of the techniques provided herein, or combinations thereof, may allow for more reliable and efficient communications due to reduced numbers of occasions where one wireless device of a BPL activates BFR resources to initiate the BFR procedure. For example, one or more integrated circuits (e.g., transceivers, processors, etc.) of the wireless device (e.g., a UE 215 or base station 205) may implement the beam failure recovery techniques discussed herein to reduce overall power consumption for the wireless device.

Further, in some cases, communications reliability may be enhanced through transmissions using multiple beams. In such cases, the base station 205 may, for example, transmit a downlink transmission using a beam sweeping pattern (e.g., all or a portion of a downlink transmission transmitted using multiple different beams), which may enhance the likelihood of successful receipt at the UE 215. Further, in some cases the UE 215 may transmit a responsive uplink communication using uplink beams that are QCLed with the beams of the beam sweeping pattern used for the downlink transmission. In some cases, such techniques may be used based on one or more measurements that indicate an established BPL may be becoming unreliable, and beam sweeping using multiple beams that are relatively close to the established BPL may enhance the likelihood of successful communications. Additionally, in some cases, in order to reduce communications gaps in the event that a communications failure occurs on a first BPL with a first TRP, the UE 215 may use a different TRP and/or BPL for communications while a BFR procedure is being performed for the first BPL/TRP. Once the BFR procedure is complete and an updated BPL is established between the UE 215 and the first TRP, the resources associated with the second BPL/TRP may be released. In some cases, both the first TRP and the second TRP may be associated with the same base station 205. In some cases, the UE 215 may transmit to two or more different TRPs during the BFR procedure, which may include the first TRP, to enhance the likelihood of successful communications.

Figure 3:
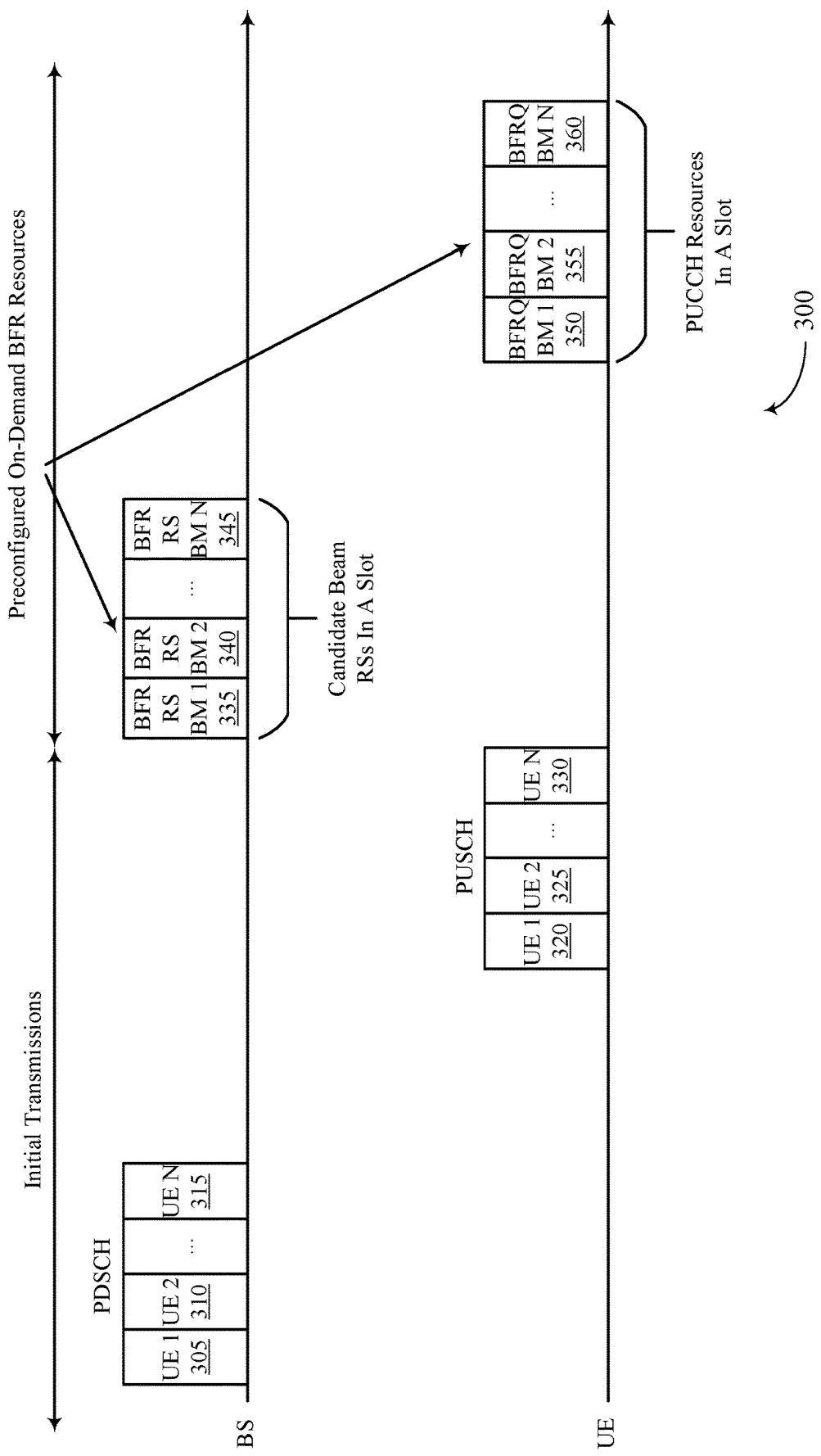
FIG. 3 illustrates an example of a beam failure recovery configuration that supports beam failure recovery techniques in accordance with one or more aspects of the present disclosure.

FIG. 3 illustrates an example of a BFR configuration 300 that supports beam failure recovery techniques in accordance with one or more aspects of the present disclosure. In some examples, BFR configuration 300 may implement aspects of wireless communications system 100 or 200. Aspects of BFR configuration 300 may be implemented by a base station and/or a UE, which may be examples of the corresponding devices described herein. In some aspects, the base station and/or UE may be examples of a wireless device implementing aspects of the described techniques.

In some aspects, the base station may be performing wireless communications with one or more UEs, with N UEs being shown by way of example and N corresponding to a positive integer of one or more. In the example illustrated in BFR configuration 300, this may include the base station performing a downlink transmission 305 to UE 1, a downlink transmission 310 to UE 2, and continuing with downlink transmissions until downlink transmission 315 to UE N. Although BFR configuration 300 illustrates such downlink transmissions as being data transmissions (e.g., PDSCH), it is to be understood that the downlink transmissions may be any combination of control, system, and/or data being communicated to the respective UE.

In some aspects, the wireless communications may include one or more uplink transmissions from N UEs to the base station. For example, this may include a first uplink transmission 320 from UE 1, a second uplink transmission 325 from UE 2, and continuing with uplink transmissions until uplink transmission 330 from UE N. Again, although BFR configuration 300 illustrates such uplink transmissions as being data transmissions (e.g., PUSCH), it is to be understood that the uplink transmissions may be any combination of control, system, and/or data being communicated to the base station.

Although not illustrated in BFR configuration 300, it is to be understood that the uplink and/or downlink transmissions may include one or more of initial transmissions and/or retransmissions of information between the base station and respective UEs.

The uplink and/or downlink transmissions (e.g., the initial transmissions) may occur during a first communication period (or communication cycle). A communication period may refer to any time period in which communications are expected to occur, including uplink transmissions and/or downlink transmissions.

In some aspects, one or more of the wireless communications between the base station the UE may occur over a resource that is configured or otherwise operating in a first state. The resource may refer to any combination of time resource(s), a frequency resource(s), spatial resource(s), a code resource(s), and the like. The resource configured in the first state may mean that the resource is available to use for wireless communications between a base station and a UE. For example one or more of the downlink transmissions 305, 310, and/or 315 may be performed using some or all the resource in the first state. Similarly, one or more of the uplink transmissions 320, 325, and/or 330 may be performed using some or all of the resources in the first state. Thus, the resource in the first state may be available for use by the base station and/or UE for performing wireless communications (e.g., PUCCH/PUSCH/PDCCH/PDSCH communications). In some aspects, the resources in the first state may be inactive or otherwise unavailable for a BFR procedure. That is, the resources may be allocated or otherwise identified for use in a BFR procedure, but are inactive for such communication failure recovery procedure until a communication failure occurs.

In some aspects, the resources may be preconfigured before a communication failure occurs. For example, the base station may transmit a signal to a UE configuring the resource in the first state. Examples of the signal may include, but are not limited to, an RRC signal, a MAC control element, an initial configuration signal, and the like. Accordingly, the base station and UEs may identify the resource for wireless communication, with the resource being in the first state. However, the base station and/or the UE may determine that a communication failure has occurred during the first communication period (e.g., during one or more of the initial transmissions/retransmissions). The communication failure may refer to a beam failure and/or a radio link failure.

Accordingly, the base station and the UE may transition the resource from the first state to a second state in response to the communication failure. In the second state, the resource may be inactive for wireless communications, but may be active for a BFR procedure. That is, the resource in the first state used for wireless communications between the base station and UE may be dynamically transitioned or otherwise repurposed to use for the BFR procedure upon detecting a communication failure between the base station and UE. In some aspects, this may minimize waste by allowing for fewer or no periodic BFR resources being configured and available for use in periodic BFR procedures.

In some aspects, the base station and the UE may perform the communication failure recovery procedure using the resource that has been transitioned to the second state, e.g., using the resource that is activated for the BFR procedure in response to detecting the communication failure. In some aspects, this may include the base station transmitting (and the UE receiving) one or more BFR candidate beams RSs using the resource transitioned to the second state. For example, the base station may transmit the one or more BFR candidate beam RSs in a sweeping manner across at least a portion of its coverage area using different transmit beams. For example, the base station may transmit a first BFR candidate beam RS 335 on beam 1, a second BFR candidate beam RS 340 on beam 2, and continuing until and Nth BFR candidate beam RS 345 on beam N, with N being a positive integer of one or more. In some aspects, each beam used to transmit the BFR candidate beam RS may be unique (e.g., may have a unique identifier assigned) and/or may be transmitted in a different direction (e.g., in a sweeping manner). In some aspects, each BFR candidate beam RS may be transmitted in one symbol (e.g., the CSI-RS), and may have a corresponding uplink resource with an identical base station beam for transmit and receive. For example, each uplink resource may be one symbol PUCCH (e.g., format 0 or 2).

In some aspects, based on detecting or otherwise determining that a communication failure has occurred, the UE may monitor for the BFR candidate beam RSs to determine or otherwise identify a preferred candidate beam to use for future communications with the base station. For example, the UE may identify the best candidate beam from the BFR candidate beam RSs and/or may identify the top N candidate beams from the BFR candidate beams RSs, with N being a positive integer of 2 or more.

In some aspects, the UE may transmit a BFRQ to the base station using one or more of the resources transitioned to the second state. In the example illustrated in BFR configuration 300, this may include one or more PUCCH resources in a slot. In some aspects, the BFRQ may carry or otherwise convey an indication identifying a preferred candidate beam (e.g., the best candidate beam and/or the top N candidate beams).

As discussed, in some examples each beam used to transmit a BFR candidate beam RS may have a corresponding uplink resource used to transmit the BFRQ to the base station. For example, a first BFRQ 350 may correspond to the first BFR candidate beam RS 335 using beam 1, the second BFRQ 355 may correspond to the second BFR candidate beam RS 340 using beam 2, and the Nth BFRQ 360 may correspond to the Nth BFR candidate beam RS 345 using beam N. Accordingly, in some aspects the UE may select an uplink resource from the resource transitioned to the second state based on its preferred candidate beam. That is, the UE may transmit the first BFRQ 350 to the base station using beam 1 when the first BFR candidate beam RS 335 is the preferred candidate beam. Accordingly, the base station may know or otherwise identify the preferred candidate beam from the BFRQ received from the UE based on which beam the BFRQ is transmitted on.

Moreover, in some examples the base station may receive multiple BFRQs from different UEs. In this context, the different UEs may be differentiated using unique initial cyclic shifts, frequency allocations, and the like, that are associated with each UE. Accordingly, the base station may receive the BFRQ, identify the preferred candidate beam of the UE, and select this beam to use in an updated BPL for continuing communications with the UE.

As discussed, aspects of the described techniques may include the UE and the base station determining that the communication failure has occurred. Examples of the communication failure may include, but are not limited to, the UE assuming that the on-demand BFR is configured (e.g., the communication failure has occurred, and therefore the resource is transitioned to the second state) if at least one of a downlink ACK and/or an uplink packet is never sent (e.g., transmitted by the UE) in the previous cycle (e.g., during the first communication period). Another example of the communication failure may include, but is not limited to, the base station assuming that the BFR is configured (e.g., the communication failure has occurred, and therefore the resource is transitioned to the second state) if at least one of the downlink ACK and/or the uplink packet is never received by the base station in the previous cycle (e.g., during the first communication period).

In some situations, there may be misalignment between the UE and the base station, e.g., one wireless device may detect the communication failure, but the other wireless device may not. That is, Table 1 below illustrates the example alignment scenarios (in terms of whether each wireless device determines or otherwise identifies the communication failure):

TABLE 1

| | | At the BS Side | |
| --- | --- | --- | --- |
| | | Both DL ACK/UL packet are received in first communication period/cycle | At least one of DL ACK/UL packet are not received in first communication period/cycle |
| At the UE side | Both DL ACK/UL packet are transmitted in the first communication period/cycle | UE & BS assume no BFR configured (e.g., communication failure is not detected) | UE assumes no BFR configured BS assumes BFR configured |
| | At least one of DL ACK/UL packet are not transmitted in the first communication period/cycle | Possible NACK-to-ACK error | UE & BS assume BFR configured (e.g., communication failure is detected) |

As illustrated in Table 1, when both the downlink ACK and uplink (UL) packet are transmitted by the UE and received by the base station, both devices may determine that there has not been a communication failure (e.g., BFR not configured, such that the resource remains in the first state). In the situation where at least one of the DL ACK and UL packet are not transmitted by the UE and received by the base station, both devices may determine that the communication failure has occurred (e.g., the BFR is configured, such that the resources are transitioned to the second state).

The possible NACK-to-ACK alignment may include, if PUSCH was sent but ACK was not sent/received, especially with the ACK configured for PUCCH format 0 or format 2 for small packet transmission (e.g., Reed-Muller, no CRC). Such small packet transmissions may provide that no CRC is used if packets have a threshold number of bits or less (e.g., ≤11 bits). Transmissions without a CRC may result in more frequent NACK-to-ACK errors relative to transmissions that include a CRC. In this situation, the UE may be transmitting on the BFR resource that it thinks has been reserved for it (e.g., the resource transitioned to the second state), but in fact this resource may not have been activated by the base station. Various aspects of the present disclosure provide for enhanced robustness to misaligned on-demand BFR Activation.

In some cases, errors in ACK/NACK decoding may be reduced through techniques in which CRC is applied to feedback transmissions (e.g., ACK/NACK feedback) irrespective of a payload size of the uplink communications used to transmit the feedback. In some cases, a UE may determine that uplink ACK/NACK feedback is less than or equal to the threshold value that indicates no CRC, and the UE may transmit the ACK/NACK feedback using an uplink transmission that shares a CRC with another uplink transmission, such as a PUSCH transmission. In some cases, the UE may format the ACK/NACK feedback into a MAC-CE that is transmitted with the uplink shared channel transmission, and thus a CRC is computed for the entire uplink transmission including the feedback information. In some cases, a MAC-CE may be defined for carrying such feedback data, and the base station may recognize the MAC-CE in the uplink transmission and decode the feedback accordingly. In some cases, the UE may be deployed in an IIoT or factory automation setting, and the downlink transmission being acknowledged may be a motion control command in which the ACK/NACK feedback is a single bit that indicates the downlink command has been received. In such cases, a single bit may be defined for transmission with an uplink shared channel transmission (e.g., in a special MAC-CE) that provides such feedback and shares a CRC with the uplink shared channel transmission and thus has a higher likelihood of being successfully and correctly decoded.

In other cases, the UE and base station may configure feedback transmissions to have their own CRC, even in cases where the payload size is at or less than the payload size threshold. In some cases, the UE may add one or more padding bits (e.g., leading or trailing 1's or 0's) to the feedback payload to that the padded payload exceeds the threshold for CRC attachment (e.g., >11 bits). In other cases, the feedback payload may be encoded according to an encoding technique that provides an encoded output that exceeds the threshold for CRC attachment (e.g., bit patterns that are less than the threshold value may be mapped to corresponding bit patterns that exceed the payload threshold size for attaching CRC). In other cases, the feedback payload may be repeated one or more times so the repeated payload exceeds the threshold for CRC attachment. In still further cases, one or more combinations of padding, encoding, or repeating may be used so the payload exceeds the threshold for CRC attachment. In some cases, the base station and UE may dynamically indicate to the other side that a particular CRC attachment option is applied to uplink transmissions with a small payload (e.g., ≤11 bits).

In some aspects of the disclosure, robustness of activating BFR may be enhanced by providing a confirmation of BFR activation or a redundant indication that BFR is activated. In some cases, such confirmation may be based on the base station transmitting candidate beam RSs in the event that the base station has determined a communications failure, and the UE transmitting BFRQ after detecting the candidate beam RSs. In such cases, the UE will not send BFRQ if it does not detect any intended candidate beam RSs, (e.g. CSI-RS identified by special scrambling sequence). In such cases, if the UE incorrectly determines that the BFR procedure is activated, it will not receive a candidate beam RS, and then determine that the BFR procedure was not activated and use the existing BPL for communications in the next communications cycle.

In other cases, the base station may transmit an explicit indication of whether the BFR procedure is activated in current cycle. For example, in an initial downlink transmission of the current cycle, the base station may indicate BFR activation and a reason (e.g., one or more bits that indicate uplink traffic not received, or NACK received). The UE, upon receiving the explicit indication, may accept the activation in an initial uplink transmission, and the BFR procedure may continue. For example, the base station may indicate a reason for BFR activation is that an acknowledgment was not received in last cycle, even though the UE transmitted an acknowledgment in the last cycle, and thus the base station incorrectly determines that BFR is to be configured because the UE did not receive a downlink transmission. In such cases, the UE may decline the activation with corresponding reason (e.g., it the base station reason indicates downlink ACK was not received in last cycle, the UE may declines with a reason that downlink transmissions were sent successfully in last cycle). If activation is declined, both sides will assume BFR is not activated in current cycle, and use the existing BPL.

In further cases, the UE may indicate communication results of a previous cycle. For example, in an initial uplink transmission, the UE may indicates previous communication results and potentially request on-demand BFR activation. The UE, in such cases may provide an indication of a reason (e.g., downlink ACK was not sent in the last cycle, but the base station may incorrectly receive both DL ACK and UL traffic in last cycle). Based on the initial uplink transmission that indicates the NACK of the last cycle, the base station may activate the BFR procedure and both the UE and base station may perform the BFR procedure.

In still further cases, the UE, base station, or both may transmit a 'no traffic' indication in a transmission occasion in the event that no communications are present for transmission. In such cases, an explicit indication of no traffic may be provided and thus the receiving device may recognize that no traffic is present and will not incorrectly determine that a transmission has not been received due to a communications failure. In some cases, the no traffic indication may be a low rate physical or bit sequence that indicates an absence of data to be transmitted. In other cases, the no traffic indicator may be implicitly determined when there is an absence of a transmission at all. The no traffic indicator may be sent during, before, or after the corresponding transmission occasion (e.g., in a desired uplink/downlink initial transmission occasion). When a no traffic indication is transmitted, the sending and receiving device may assume ACK is received/sent for the corresponding "no traffic" transmission, when determining BFR activation.

In other cases, the base station or UE may poll the other device in the absence of feedback of successful reception of a transmission. In such cases, after sending a packet but not detecting a corresponding ACK/NACK, the base station or UE may poll the other device to see if an ACK/NACK has been sent for the corresponding packet. In some case, the packet may be identified by a dedicated sequence number (e.g., a PDCP sequence number) or corresponding time/frequency resource allocation (e.g., in indication of a frame/slot index used for the transmission). The packet may carry traffic or control information (e.g., a MAC-CE). In some cases, the polling may be transmitted using a different BPL or TRP. The report in response to the polling can indicate whether and when the earliest ACK/NACK indication was sent and the result. In some cases, if the transmitted packet contains control information (e.g., a MAC-CE) and the polled report indicates ACK was sent, the corresponding MAC-CE activation time may be based on the timing at which the earliest ACK was sent.

In some cases, a base station or UE may determine that a received transmission is a retransmission of a prior transmission. Further, in cases where an ACK was transmitted responsive to the prior transmission, the receiving device may indicate in a responsive communication that the ACK/NACK feedback was transmitted, and may provide a corresponding transmission index. In some cases, where the prior transmission included a MAC-CE and the response indicates ACK was sent, the MAC-CE activation time may be based on the timing at which the earliest ACK was sent.

In some other cases, reliability of communications may be enhanced through multiple transmissions on two or more beams. In such cases, a base station may transmit a downlink packet with a certain beam sweep pattern. The base station may, for example, provide an indication that a downlink transmission will use the beam sweep pattern, and then transmit all or a portion of the downlink transmission using each of the two or more beams indicated in the beam sweep pattern. In such cases, the UE may transmit a responsive uplink transmission using the same beam sweep pattern (e.g., using transmit beams that are QCLed with the two or more beams used in the downlink transmission). Further, the uplink transmission using the beam sweep pattern may not be separately explicitly indicated for the uplink transmission. The downlink transmission in such cases may include PDCCH or PDSCH transmissions, or both, and the uplink transmission may include PUCCH or PUSCH transmissions, or both.

Figure 4:
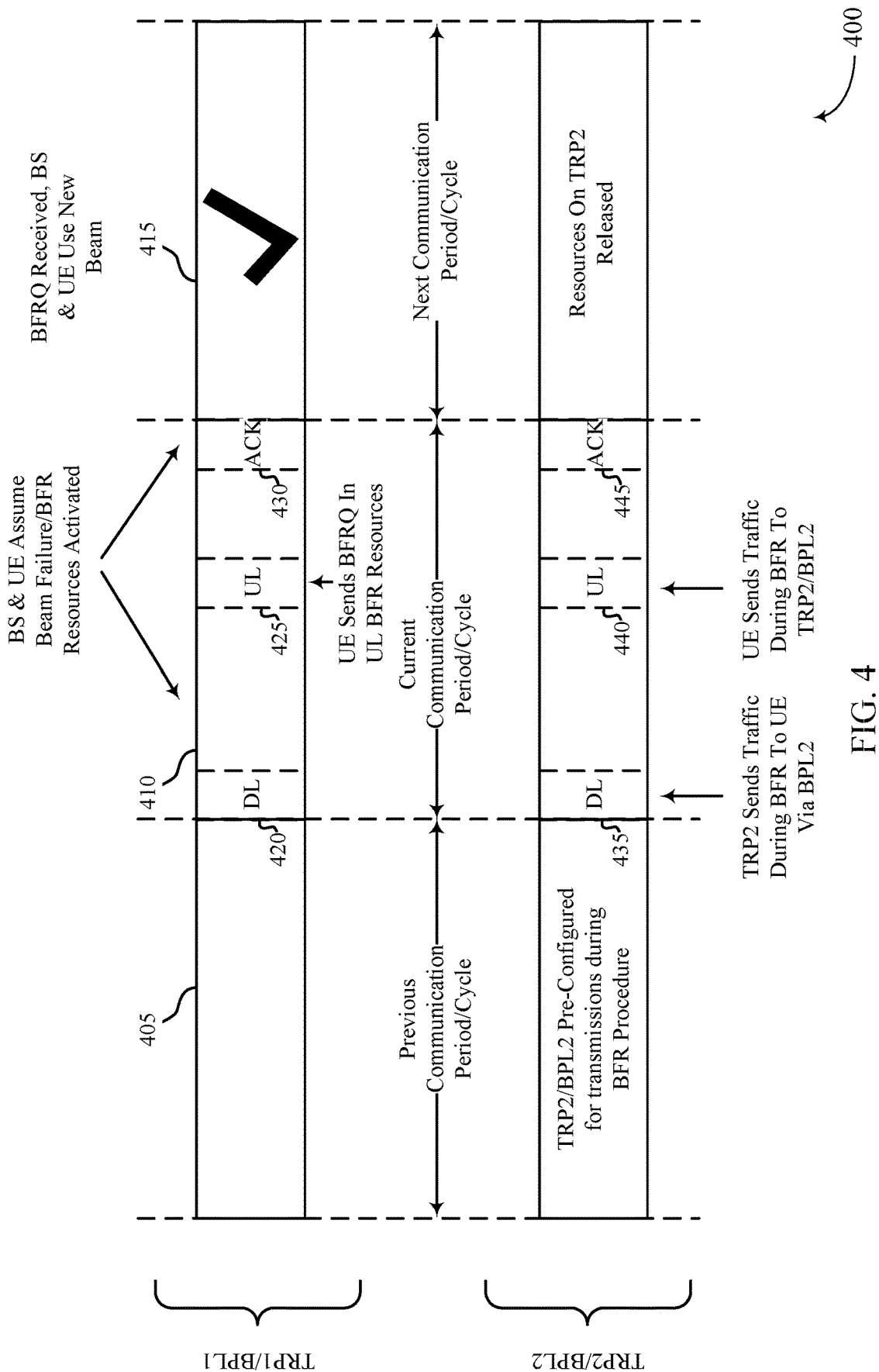
FIG. 4 illustrates an example of a beam failure recovery configuration that supports beam failure recovery techniques in accordance with one or more aspects of the present disclosure.

FIG. 4 illustrates an example of a BFR configuration 400 that supports beam failure recovery techniques in accordance with one or more aspects of the present disclosure. In some examples, BFR configuration 400 may implement aspects of wireless communications systems 100, 200, and/or BFR configuration 300. Aspects of BFR configuration 400 may be implemented by a first TRP, second TRP, and/or UE, which may be examples of corresponding devices described herein. BFR configuration 400 may include a previous communication period/cycle 405, a current communication period/cycle 410, and a next communication period/cycle 415. BFR configuration 400 illustrates the example situation where the communication failure recovery procedure is successful, and optionally includes a TRP acknowledging receipt of the BFRQ. In this example, communications may be performed using a first TRP/BPL that undergoes the BFR procedure, and communications may be performed using a second TRP/BPL while the BFR procedure is being performed at the first TRP/BPL.

For example, the base station and first TRP may be performing wireless communications via first BPL during the previous communication period/cycle 405. In some cases, in the previous cycle, the second TRP and second BPL may be preconfigured for use in the event of a BFR procedure of the first BPL. In some aspects, the wireless communications may be interrupted due to a communication failure detected or otherwise determined by the first TRP and UE. Accordingly, the first TRP and the UE may transition the resource from the first state to the second state such that the resource is active for a communication failure recovery procedure. The communication failure recovery procedure may be implemented or otherwise performed during the current communication period/cycle 410.

That is, the communication failure recovery procedure may include the first TRP transmitting one or more BFR candidate beam RSs in a downlink transmission 420 using the resources transitioned to the second state. The UE may monitor for the BFR candidate beam RSs to identify a preferred candidate beam (e.g., the best candidate beam or the top N candidate beams, with N being a positive integer value of 2 or more). The UE may transmit the BFRQ in an uplink transmission 425 using the resource transitioned to the second state. In some aspects, the BFRQ may carry or convey an indication identifying a best candidate beam of the UE.

The first TRP may receive the BFRQ from the UE and identify the best candidate beam. In some examples, the first TRP may optionally respond to the BFRQ by transmitting an ACK 430 to the UE that confirms receipt of the BFRQ. In some aspects, the ACK 430 may carry or convey an indication confirming the identity of the best candidate beam, may explicitly identify the best candidate beam from the BFRQ and/or may be communicated using a beam corresponding to the best candidate beam. In some aspects, the ACK 430 may be transmitted using the resource transitioned to the second state. Accordingly, the first TRP and the UE may select the best candidate beam as the new beam to use for wireless communications during the next communication period/cycle 415.

In this example, during the BFR procedure in the current communication period/cycle 410, the UE and the second TRP may exchange communications. In this example, the second TRP may transmit downlink transmission 435 (e.g., a PUCCH or PUSCH transmission). The UE may transmit a responsive uplink transmission 440 to the second TRP using the second BPL, which may in this example be acknowledged by ACK transmission 445 of the second TRP. Following the BFR procedure, the UE and second TRP may release resources of the second BPL and the second TRP. In some cases, the first TRP and the second TRP may be associated with a same base station. In some cases, during the BFR procedure, the UE and first TRP may also convey traffic on the prior first BPL to provide diversity.

Figure 5:
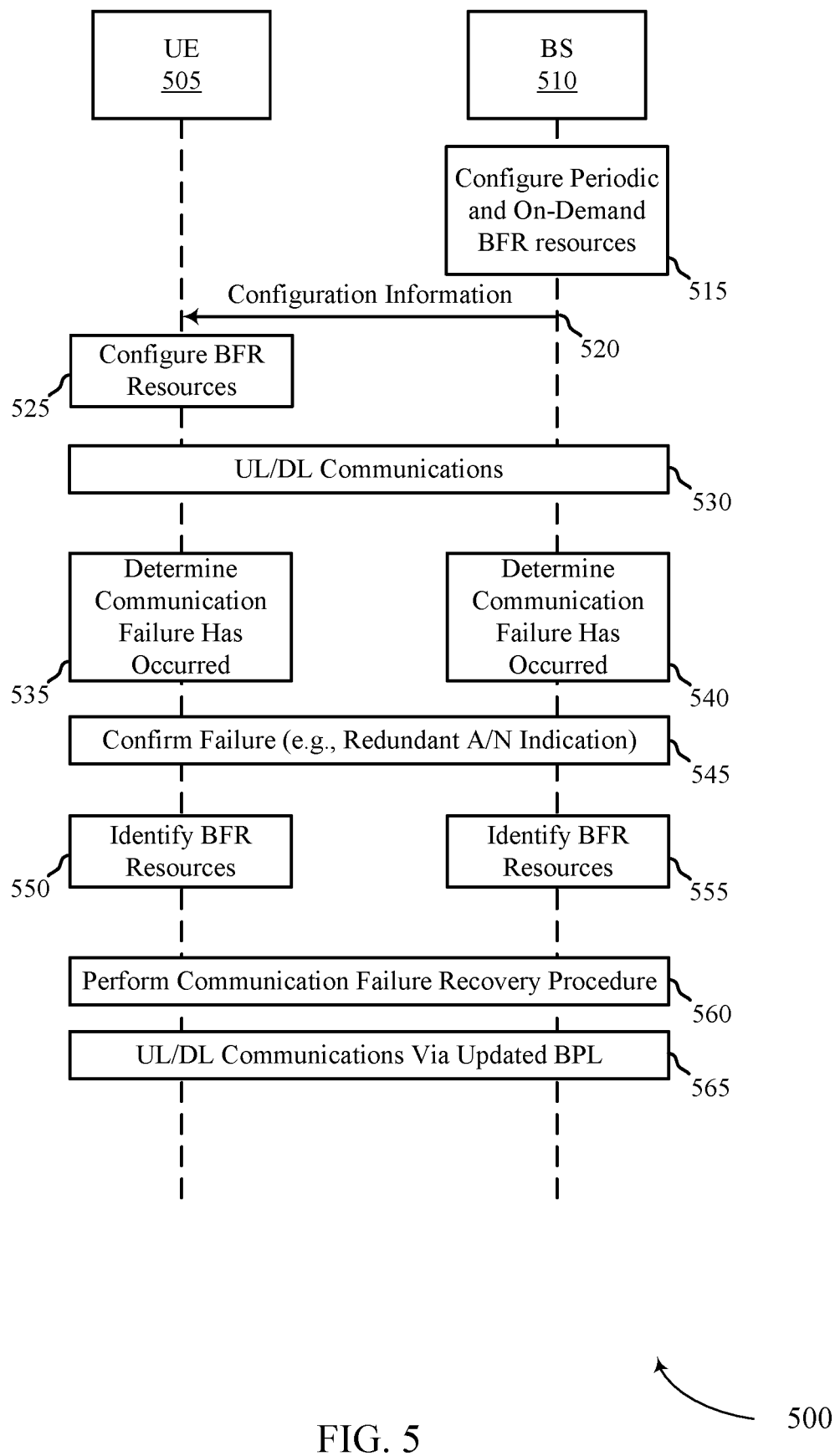
FIG. 5 illustrates an example of a process flow that supports beam failure recovery techniques in accordance with one or more aspects of the present disclosure.

FIG. 5 illustrates an example of a process flow 500 that supports beam failure recovery techniques in accordance with one or more aspects of the present disclosure. In some examples, process flow 500 may implement aspects of wireless communications systems 100, 200, and/or BFR configurations 300 or 400. Aspects of process flow 500 may be implemented by UE 505 and/or base station 510, which may be examples of corresponding devices described herein. In some aspects, UE 505, base station 510, and/or TRP may be considered a wireless device in the context of the present disclosure.

At 515, the base station 510 may configure periodic and on-demand BFR resources. In some cases, both periodic and on-demand BFR resources may be configured and a priority rule use in cases where both periodic and on-demand BFR occur in a same communications period. At 520, the base station 510 may transmit configuration information to the UE 505. In some cases, the configuration information may be transmitted in RRC signaling that indicates common downlink reference signal resources and UE-specific uplink resources for BFRQ.

At 525, the UE 505 may configure the BFR resources. In some case, the UE 505 may configure both periodic and on-demand BFR resources. In some cases, the on-demand BFR resources may be in a first state where the resource is active for wireless communication and is inactive for a communication failure recovery procedure. At 530, the UE 505 and base station 510 may transmit uplink and downlink communications. Such communications may be via a first BPL, for example.

At 535, UE 505 may determine that a communication failure has occurred during a first communication period. In some aspects, this may include determining that an initial transmission and/or retransmission is not transmitted to base station 510 during the first communication period. In some aspects, the initial transmission and/or retransmission may include a downlink ACK transmission and/or an uplink packet transmission.

At 540, base station 510 may determine that a communication failure has occurred during a first communication period. In some aspects, this may include determining that an initial transmission and/or retransmission is not received from UE 505 during the first communication period. In some aspects, the initial transmission and/or retransmission may include a downlink ACK transmission and/or an uplink packet transmission.

At 545, the UE 505 and base station 510 may confirm the failure. In some cases, the failure may be confirmed through a redundant initiation of an ACK/NACK transmission. In some cases, the confirmation may be based on reference signal transmissions that are transmitted by the base station as part of a BFR procedure. In some cases, an explicit indication of a failure may be provided, and confirmed.

At 550, UE 505 may identify BFR resources for the BFR procedure. In some cases, the BFR resources may be determined based on a priority rule for on-demand BFR and periodic BFR. At 555, the base station may identify BFR resources for the BFR procedure. In some cases, the BFR resources may be determined based on a priority rule for on-demand BFR and periodic BFR.

At 560, the UE 505 and base station 510 may perform the BFR procedure to identify an updated BPL for continuing communications. In some aspects, this may include base station 510 transmitting (and UE 505 receiving) one or more BFR candidate beam RSs using the resource transitioned to the second state. In some aspects, this may include UE 505 transmitting (and base station 510 receiving) a beam failure recovery request signal (e.g., BFRQ) identifying a preferred candidate beam associated with at least one of the one or more BFR candidate beam RSs. In some aspects, UE 505 and base station 510 may perform wireless communications during a third communication period using the best candidate beam identified in the beam failure recovery request signal. In some aspects, this may include base station 510 determining that the beam failure recovery request signal was not received from UE 505 during the second communication period. Accordingly, base station 510 may perform wireless communications with UE 505 during a third communication period using the same beam as was used during the first communication period. At 565, the UE 505 and base station 510 may communicate using the updated BPL.

Figure 6:
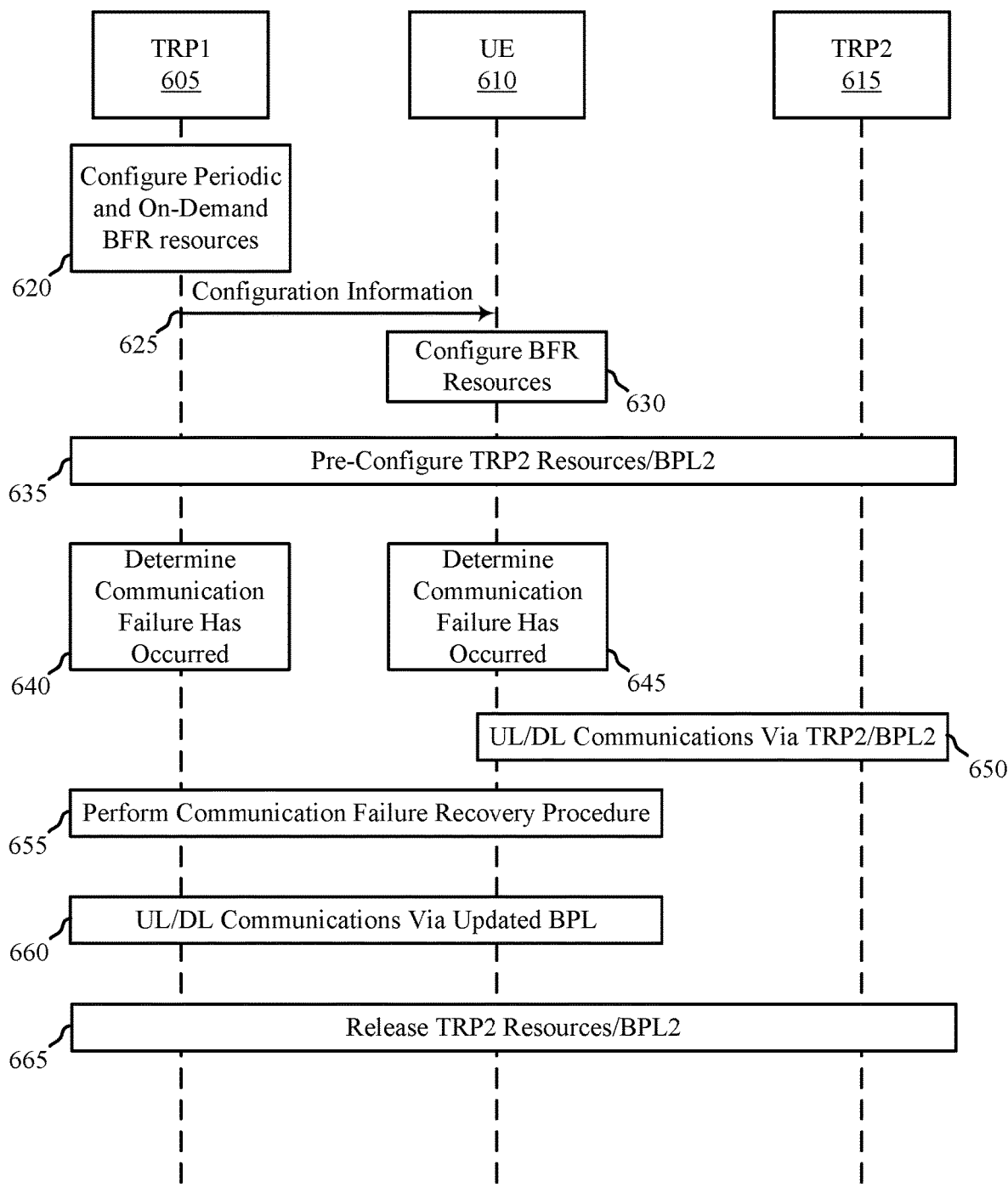
FIG. 6 illustrates an example of a process flow that supports beam failure recovery techniques in accordance with one or more aspects of the present disclosure.

FIG. 6 illustrates an example of a process flow 600 that supports beam failure recovery techniques in accordance with one or more aspects of the present disclosure. In some examples, process flow 600 may implement aspects of wireless communications systems 100, 200, and/or BFR configurations 300 or 400. Aspects of process flow 600 may be implemented by UE 610, a first TRP 605, and a second TRP 615, which may be examples of corresponding devices described herein. In some aspects, UE and/or TRPs may be considered a wireless device in the context of the present disclosure.

At 620, the first TRP 605 may configure periodic and on-demand BFR resources. In some cases, both periodic and on-demand BFR resources may be configured and a priority rule use in cases where both periodic and on-demand BFR occur in a same communications period. At 625, the first TRP 605 may transmit configuration information to the UE 610. In some cases, the configuration information may be transmitted in RRC signaling that indicates common downlink reference signal resources and UE-specific uplink resources for BFRQ.

At 630, the UE 610 may configure the BFR resources. In some case, the UE 610 may configure both periodic and on-demand BFR resources. In some cases, the on-demand BFR resources may be in a first state where the resource is active for wireless communication and is inactive for a communication failure recovery procedure.

At 635, the first TRP 605, the UE 610, and the second TRP 615 may pre-configure a second BPL at the second TRP 615. In some cases, the configuration of the second BPL may be a pre-configuration of a secondary BPL for use in the event of a communications failure. In some cases, the configuration of the second BPL may be a periodic configuration. In some cases, the configuration of the second BPL may be triggered by a measurement report associated with the first BPL, or triggered based on periodic historical communications failures (e.g., based on equipment movement in an IIoT deployment).

At 640, the first TRP 605 may determine that a communication failure has occurred during a first communication period. In some aspects, this may include determining that an initial transmission and/or retransmission is not transmitted to UE 610 during the first communication period. In some aspects, the initial transmission and/or retransmission may include a downlink ACK transmission and/or an uplink packet transmission.

At 645, the UE 610 may determine that a communication failure has occurred during a first communication period. In some aspects, this may include determining that an initial transmission and/or retransmission is not received from first TRP 605 during the first communication period. In some aspects, the initial transmission and/or retransmission may include a downlink ACK transmission and/or an uplink packet transmission. In some cases, a confirmation of the communication failure may be performed in accordance with various techniques discussed herein.

At 650, the UE 610 and the second TRP 615 may communicate using the second BPL that was preconfigured. In such cases, the UE 610 may be provided with uninterrupted communications, or a relatively small interruption in communications.

At 655, the first TRP 605 and UE 610 may perform the BFR procedure to identify an updated first BPL for continuing communications. In some aspects, this may include first TRP 605 transmitting (and UE 610 receiving) one or more BFR candidate beam RSs using the resource transitioned to the second state. In some aspects, this may include UE 610 transmitting (and first TRP 605 receiving) a beam failure recovery request signal (e.g., BFRQ) identifying a preferred candidate beam associated with at least one of the one or more BFR candidate beam RSs. At 660, the UE 610 and first TRP 605 may communicate using the updated BPL. At 665, the first TRP 605, UE 610, and second TRP 615 may release the resources of the second TRP associated with the second BPL.

Figure 7:
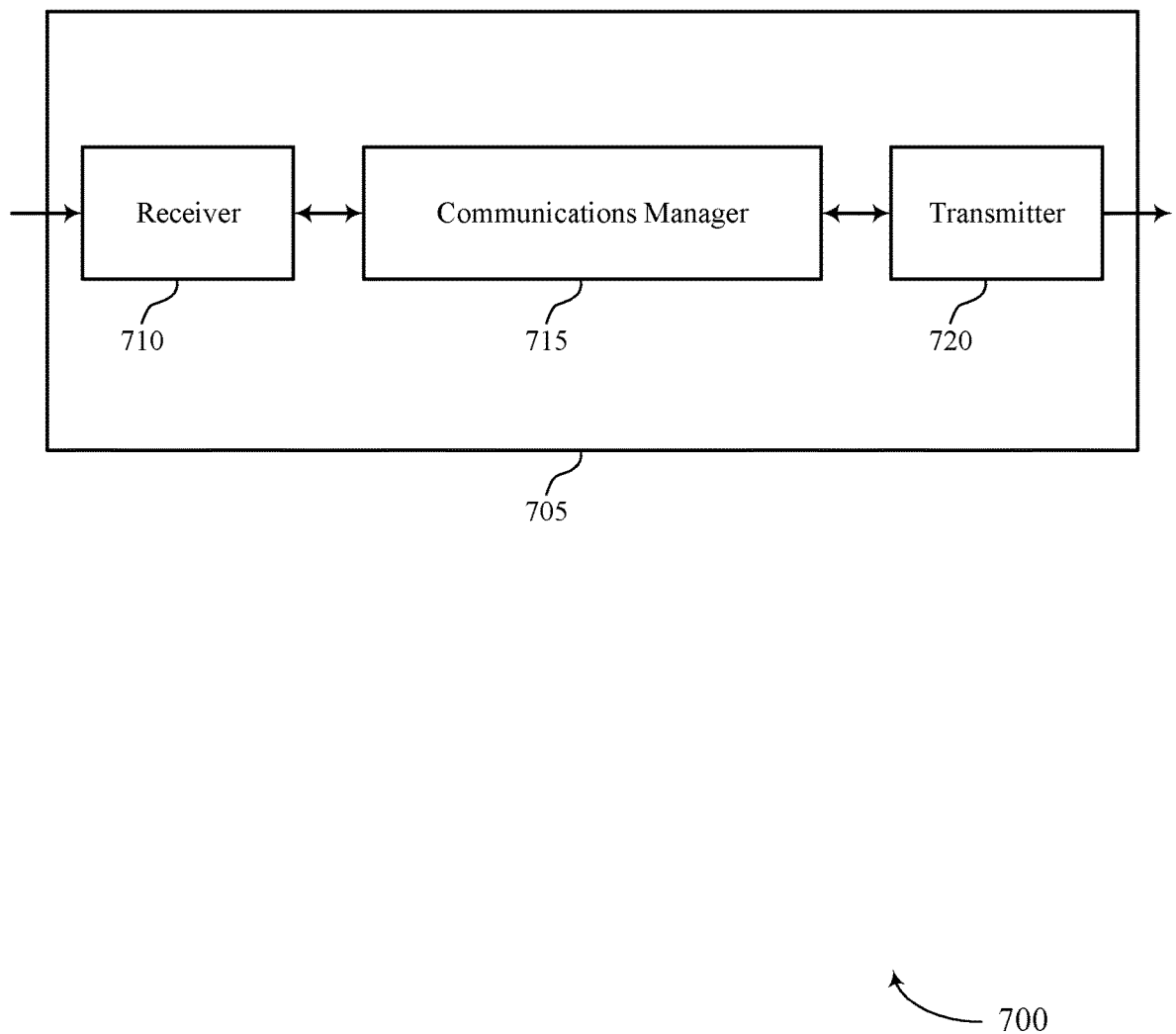
FIGS. 7 and 8 show block diagrams of devices that support beam failure recovery techniques in accordance with one or more aspects of the present disclosure.

FIG. 7 shows a block diagram 700 of a device 705 that supports beam failure recovery techniques in accordance with one or more aspects of the present disclosure. The device 705 may be an example of aspects of a UE 115 or base station 105 as described herein. The device 705 may include a receiver 710, a communications manager 715, and a transmitter 720. The device 705 may also include a processor. Each of these components may be in communication with one another (e.g., via one or more buses).

Receiver 710 may receive information such as packets, user data, or control information associated with various information channels (e.g., control channels, data channels, and information related to beam failure recovery techniques, etc.). Information may be passed on to other components of the device 705. The receiver 710 may be an example of aspects of the transceiver 1020 or 1120 as described with reference to FIGS. 10 and 11. The receiver 710 may utilize a single antenna or a set of antennas.

The communications manager 715 may configure a wireless resource for a beam failure recovery procedure, where the wireless resource is configured to have a first state where the wireless resource is active for data communications and is inactive for the beam failure recovery procedure, and to have a second state where the wireless resource is inactive for data communications and is active for the beam failure recovery procedure, determine that a communication failure has occurred during a first communication period, transition, during a second communication period and based on the communication failure, the wireless resource from the first state to the second state, and perform the beam failure recovery procedure using the wireless resource transitioned to the second state.

The communications manager 715 may also identify a first wireless resource for an on-demand beam failure recovery procedure and periodic wireless resources that are configured for use in other beam failure recovery procedures, determine that a second communication period includes the periodic wireless resources, determine that a communication failure has occurred during a first communication period, select one of the first wireless resource or the periodic wireless resources for performing the on-demand beam failure recovery procedure based on the communication failure and the second communication period including the periodic wireless resources, and perform the on-demand beam failure recovery procedure using the selected wireless resources.

The communications manager 715 may also determine that an uplink communication has an uplink payload that is at or below a threshold payload size, where uplink communications having a payload size above the threshold payload size are to have a CRC appended to the uplink payload and uplink communications having a payload size at or below the threshold payload size are to be transmitted without a CRC appended to the uplink payload, configure uplink communications to include acknowledgment feedback to include the CRC appended to the uplink payload irrespective of the uplink payload size, and process an uplink communication based on the uplink communication including the acknowledgment feedback and the CRC.

The communications manager 715 may also configure a wireless resource for a beam failure recovery procedure, determine, based on a failure to receive an acknowledgment feedback for communications in a first communication period, an initial failure state for the first communication period, confirm, based on a redundant indication of the acknowledgment feedback, a communication failure for the first communication period, and perform the beam failure recovery procedure using the wireless resource.

The communications manager 715 may also identify a wireless resource for a beam failure recovery procedure, where a determination to initiate the beam failure recovery procedure is based on an acknowledgment feedback for communications in a first communication period, determine that the first communication period has an absence of data to be transmitted, transmit an indication that the first communication period has an absence of data to be transmitted, and assume, for purposes of initiating the beam failure recovery procedure, that the acknowledgment feedback associated with the first communication period indicates successful communications.

The communications manager 715 may also establish a wireless connection via a first beam pair link with a second wireless device, receive an indication from the second wireless device that a first transmission in a first communications period is transmitted according to a first beam sweep pattern that uses one or more beams, receive the first transmission from the second wireless device in the first communications period according to the first beam sweep pattern, and transmit a responsive transmission to the second wireless device based on the first transmission, where the responsive transmission is transmitted in the first communications period using a second beam sweep pattern that corresponds to the first beam sweep pattern.

The communications manager 715 may also establish a wireless connection via a first beam pair link with a second wireless device, initiate, based on a communications failure with the second wireless device during a first communications period, a beam failure recovery procedure during a second communications period, establish, based on the beam failure recovery procedure, an updated first beam pair link, resume communications, subsequent to the second communications period, using the updated first beam pair link, and communicate with the second wireless device using a second beam pair link during the second communications period. The communications manager 715 may be an example of aspects of the communications manager 1010 or 1110 as described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 720 may transmit signals generated by other components of the device 705. In some examples, the transmitter 720 may be collocated with a receiver 710 in a transceiver module. For example, the transmitter 720 may be an example of aspects of the transceiver 1020 or 1120 as described with reference to FIGS. 10 and 11. The transmitter 720 may utilize a single antenna or a set of antennas.

Figure 8:
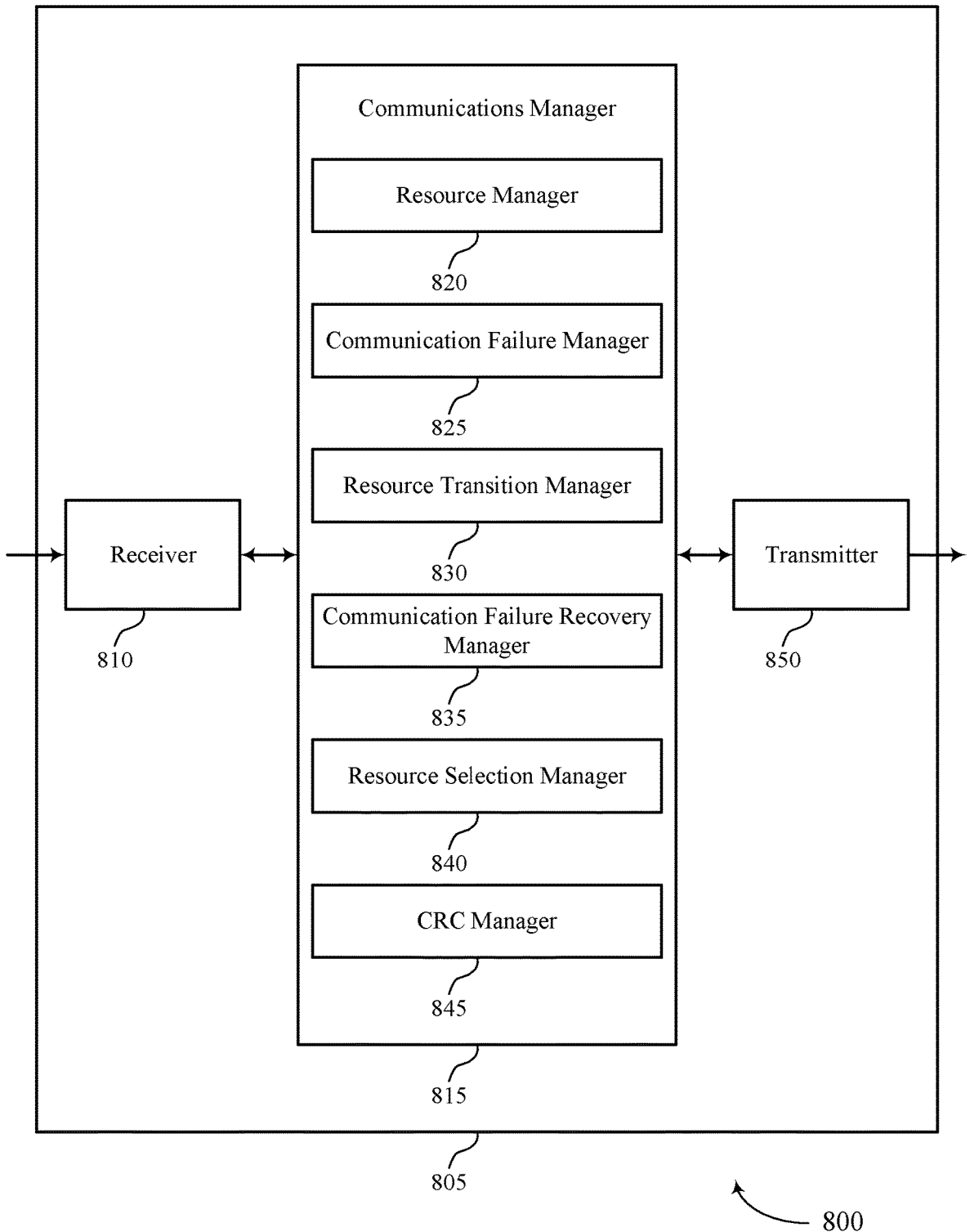

FIG. 8 shows a block diagram 800 of a device 805 that supports beam failure recovery techniques in accordance with one or more aspects of the present disclosure. The device 805 may be an example of aspects of a device 705, a UE 115, or a base station 105 as described herein. The device 805 may include a receiver 810, a communications manager 815, and a transmitter 850. The device 805 may also include a processor. Each of these components may be in communication with one another (e.g., via one or more buses).

Receiver 810 may receive information such as packets, user data, or control information associated with various information channels (e.g., control channels, data channels, and information related to beam failure recovery techniques, etc.). Information may be passed on to other components of the device 805. The receiver 810 may be an example of aspects of the transceiver 1020 or 1120 as described with reference to FIGS. 10 and 11. The receiver 810 may utilize a single antenna or a set of antennas.

The communications manager 815 may be an example of aspects of the communications manager 715 as described herein. The communications manager 815 may include a resource manager 820, a communication failure manager 825, a resource transition manager 830, a communication failure recovery manager 835, a resource selection manager 840, and a CRC manager 845. The communications manager 815 may be an example of aspects of the communications manager 1010 or 1110 as described herein.

In some cases, the resource manager 820 may configure a wireless resource for a beam failure recovery procedure, where the wireless resource is configured to have a first state where the wireless resource is active for data communications and is inactive for the beam failure recovery procedure, and to have a second state where the wireless resource is inactive for data communications and is active for the beam failure recovery procedure. The communication failure manager 825 may determine that a communication failure has occurred during a first communication period. The resource transition manager 830 may transition, during a second communication period and based on the communication failure, the wireless resource from the first state to the second state. The communication failure recovery manager 835 may perform the beam failure recovery procedure using the wireless resource transitioned to the second state.

In some cases, the resource manager 820 may identify a first wireless resource for an on-demand beam failure recovery procedure and periodic wireless resources that are configured for use in other beam failure recovery procedures and determine that a second communication period includes the periodic wireless resources. The communication failure manager 825 may determine that a communication failure has occurred during a first communication period. The resource selection manager 840 may select one of the first wireless resource or the periodic wireless resources for performing the on-demand beam failure recovery procedure based on the communication failure and the second communication period including the periodic wireless resources. The communication failure recovery manager 835 may perform the on-demand beam failure recovery procedure using the selected wireless resources.

In some cases, the resource manager 820 may determine that an uplink communication has an uplink payload that is at or below a threshold payload size, where uplink communications having a payload size above the threshold payload size are to have a CRC appended to the uplink payload and uplink communications having a payload size at or below the threshold payload size are to be transmitted without a CRC appended to the uplink payload. The CRC manager 845 may configure uplink communications to include acknowledgment feedback to include the CRC appended to the uplink payload irrespective of the uplink payload size and process an uplink communication based on the uplink communication including the acknowledgment feedback and the CRC.

In some cases, the resource manager 820 may configure a wireless resource for a beam failure recovery procedure. The communication failure manager 825 may determine, based on a failure to receive an acknowledgment feedback for communications in a first communication period, an initial failure state for the first communication period and confirm, based on a redundant indication of the acknowledgment feedback, a communication failure for the first communication period. The communication failure recovery manager 835 may perform the beam failure recovery procedure using the wireless resource.

In some cases, the resource manager 820 may identify a wireless resource for a beam failure recovery procedure, where a determination to initiate the beam failure recovery procedure is based on an acknowledgment feedback for communications in a first communication period. The resource selection manager 840 may determine that the first communication period has an absence of data to be transmitted and transmit an indication that the first communication period has an absence of data to be transmitted. The communication failure manager 825 may assume, for purposes of initiating the beam failure recovery procedure, that the acknowledgment feedback associated with the first communication period indicates successful communications.

In some cases, the resource manager 820 may establish a wireless connection via a first beam pair link with a second wireless device. The resource selection manager 840 may receive an indication from the second wireless device that a first transmission in a first communications period is transmitted according to a first beam sweep pattern that uses one or more beams, receive the first transmission from the second wireless device in the first communications period according to the first beam sweep pattern, and transmit a responsive transmission to the second wireless device based on the first transmission, where the responsive transmission is transmitted in the first communications period using a second beam sweep pattern that corresponds to the first beam sweep pattern.

In some cases, the resource manager 820 may establish a wireless connection via a first beam pair link with a second wireless device. The communication failure recovery manager 835 may initiate, based on a communications failure with the second wireless device during a first communications period, a beam failure recovery procedure during a second communications period, establish, based on the beam failure recovery procedure, an updated first beam pair link, and resume communications, subsequent to the second communications period, using the updated first beam pair link. The resource selection manager 840 may communicate with the second wireless device using a second beam pair link during the second communications period.

Transmitter 850 may transmit signals generated by other components of the device 805. In some examples, the transmitter 850 may be collocated with a receiver 810 in a transceiver module. For example, the transmitter 850 may be an example of aspects of the transceiver 1020 or 1120 as described with reference to FIGS. 10 and 11. The transmitter 850 may utilize a single antenna or a set of antennas.

Figure 9:
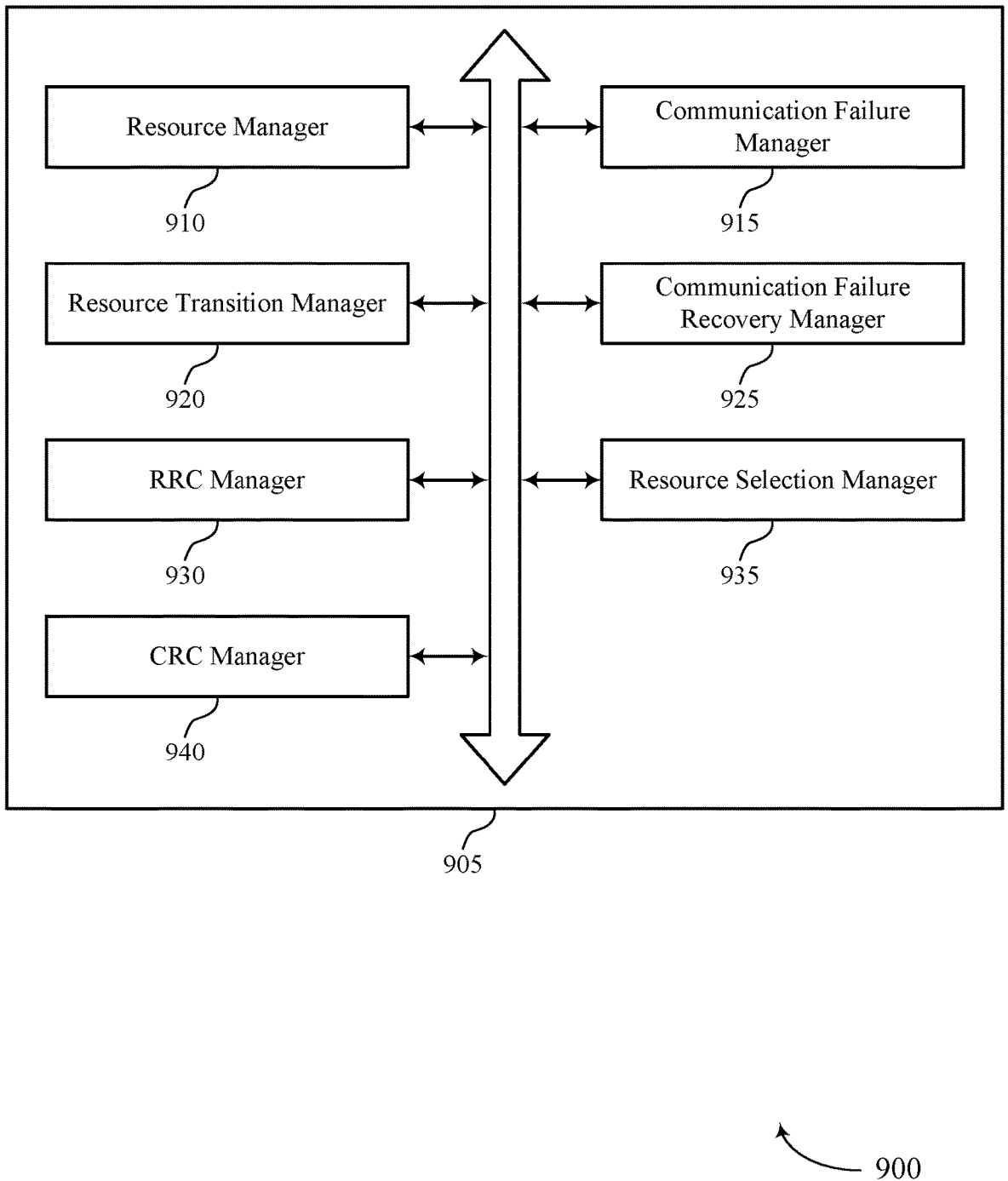
FIG. 9 shows a block diagram of a communications manager that supports beam failure recovery techniques in accordance with one or more aspects of the present disclosure.

FIG. 9 shows a block diagram 900 of a communications manager 905 that supports beam failure recovery techniques in accordance with one or more aspects of the present disclosure. The communications manager 905 may be an example of aspects of a communications manager 715, a communications manager 815, or a communications manager 1010 described herein. The communications manager 905 may include a resource manager 910, a communication failure manager 915, a resource transition manager 920, a communication failure recovery manager 925, a RRC manager 930, a resource selection manager 935, and a CRC manager 940. Each of these modules may communicate, directly or indirectly, with one another (e.g., via one or more buses).

The resource manager 910 may configure a wireless resource for a beam failure recovery procedure, where the wireless resource is configured to have a first state where the wireless resource is active for data communications and is inactive for the beam failure recovery procedure, and to have a second state where the wireless resource is inactive for data communications and is active for the beam failure recovery procedure.

In some examples, the resource manager 910 may identify a first wireless resource for an on-demand beam failure recovery procedure and periodic wireless resources that are configured for use in other beam failure recovery procedures. In some examples, the resource manager 910 may determine that a second communication period includes the periodic wireless resources. In some examples, the resource manager 910 may identify that the periodic wireless resources have priority over the first wireless resource in the second communication period.

In some examples, the resource manager 910 may determine that an uplink communication has an uplink payload that is at or below a threshold payload size, where uplink communications having a payload size above the threshold payload size are to have a CRC appended to the uplink payload and uplink communications having a payload size at or below the threshold payload size are to be transmitted without a CRC appended to the uplink payload.

In some examples, the resource manager 910 may configure a wireless resource for a beam failure recovery procedure. In some examples, the resource manager 910 may identify a wireless resource for a beam failure recovery procedure, where a determination to initiate the beam failure recovery procedure is based on an acknowledgment feedback for communications in a first communication period. In some examples, the resource manager 910 may establish a wireless connection via a first beam pair link with a second wireless device.

In some cases, the wireless resource includes a first downlink resource for transmission of one or more reference signals using one or more beams by a first transmission-reception point, and a first uplink resource for transmission of a beam failure request by a UE. In some cases, the first downlink resource is a common resource for transmission of the one or more reference signals to a set of UEs, and the first uplink resource is a UE-specific resource configured separately for each of the set of UEs. In some cases, the first uplink resource includes one or more of physical uplink control channel resources, physical random access channel resources, or combinations thereof. In some cases, the first uplink resource includes one or more of UE-specific time resources, frequency resources, spatial resources, code-domain resources, or combinations thereof.

The communication failure manager 915 may determine that a communication failure has occurred during a first communication period. In some examples, the communication failure manager 915 may determine, based on a failure to receive an acknowledgment feedback for communications in a first communication period, an initial failure state for the first communication period. In some examples, the communication failure manager 915 may confirm, based on a redundant indication of the acknowledgment feedback, a communication failure for the first communication period.

In some examples, the communication failure manager 915 may assume, for purposes of initiating the beam failure recovery procedure, that the acknowledgment feedback associated with the first communication period indicates successful communications.

In some examples, the communication failure manager 915 may monitor a downlink portion of the wireless resource for one or more reference signal transmissions via one or more candidate beams to be selected by the UE. In some examples, the communication failure manager 915 may determine that the one or more reference signal transmissions are present on the downlink portion of the wireless resource. In some examples, the communication failure manager 915 may select a first candidate beam based on measurements of the one or more reference signal transmissions.

In some examples, the communication failure manager 915 may transmit a beam failure request on an uplink portion of the wireless resource that indicates the first candidate beam. In some examples, the communication failure manager 915 may determine, for a subsequent communication period, the initial failure state for the subsequent communication period.

In some examples, the communication failure manager 915 may monitor the downlink portion of the wireless resource associated with the subsequent communication period for the one or more reference signal transmissions. In some examples, the communication failure manager 915 may determine that the one or more reference signal transmissions are absent on the downlink portion of the wireless resource associated with the subsequent communication period. In some examples, the communication failure manager 915 may discontinue the beam failure recovery procedure based on the determining the absence of the one or more reference signal transmissions on the downlink portion of the wireless resource associated with the subsequent communication period.

In some examples, the communication failure manager 915 may transmit, in a downlink transmission to a UE, an indication that the beam failure recovery procedure is activated. In some examples, the communication failure manager 915 may receive, from the UE, a response to the indication that the beam failure recovery procedure is activated.

In some examples, the communication failure manager 915 may receive, in a downlink transmission from a base station, an indication that the beam failure recovery procedure is activated. In some examples, the communication failure manager 915 may transmit, to the base station, a response to the indication that the beam failure recovery procedure is activated. In some examples, the communication failure manager 915 may transmit, to a base station, a request to activate the beam failure recovery procedure, where the request indicates that a prior downlink transmission from the base station was unsuccessfully received at the UE. In some examples, the communication failure manager 915 may receive, from a UE, a request to activate the beam failure recovery procedure, where the request indicates that a prior downlink transmission from the base station was unsuccessfully received at the UE.

In some examples, the communication failure manager 915 may poll a base station that was to receive an uplink communication from the UE during a prior communications period to determine whether the acknowledgment feedback was transmitted by the base station.

In some examples, the communication failure manager 915 may receive a response from the base station that indicates whether the acknowledgment feedback was transmitted by the base station. In some examples, the communication failure manager 915 may continue or discontinue the beam failure recovery procedure based on the response from the base station.

In some examples, the communication failure manager 915 may poll a UE that was to receive a downlink communication from the base station during a prior communications period to determine whether the acknowledgment feedback was transmitted by the UE. In some examples, the communication failure manager 915 may receive a response from the UE that indicates whether the acknowledgment feedback was transmitted by the UE. In some examples, the communication failure manager 915 may continue or discontinue the beam failure recovery procedure based on the response from the UE.

In some examples, the communication failure manager 915 may determine that a packet transmitted during the first communication period is a retransmission of a prior transmission of the packet, and that prior acknowledgment feedback was previously transmitted for the packet. In some examples, the communication failure manager 915 may transmit an indication of the prior acknowledgment feedback. In some cases, the one or more reference signal transmissions are identified based on a scrambling sequence used to scramble the one or more reference signal transmissions.

In some cases, the response from the UE indicates an acceptance of the beam failure recovery procedure being activated, and where the base station performs the beam failure recovery procedure based on the acceptance.

In some cases, the response from the UE indicates that the UE declines the activation of the beam failure recovery procedure and indicates successful communications during the first communication period, and where the base station discontinues the beam failure recovery procedure based on the response from the UE. In some cases, the response to the base station indicates an acceptance of the beam failure recovery procedure being activated, and where the UE performs the beam failure recovery procedure based on the acceptance. In some cases, the response to the base station indicates that the UE declines the activation of the beam failure recovery procedure and indicates successful communications during the first communication period, and where the UE discontinues the beam failure recovery procedure based on the response to the base station. In some cases, the uplink communication from the UE during the prior communications period is identified based on a sequence number of the uplink communication, an index of a resource allocation of the uplink communication, or any combinations thereof.

In some cases, the polling is transmitted in uplink communications that carries uplink control information or data traffic. In some cases, the polling transmitted using a different beam or a different TRP than used for an original transmission of the uplink communication.

In some cases, the response from the base station indicates that the acknowledgment feedback was previously transmitted, and indicates a time of an initial transmission of the acknowledgment feedback. In some cases, the uplink communication included an activation indication, and where an activation time is determined based on the time of the initial transmission of the acknowledgment feedback.

In some cases, the downlink communication from the base station during the prior communications period is identified based on a sequence number of the downlink communication, an index of a resource allocation of the downlink communication, or any combinations thereof. In some cases, the polling is transmitted in downlink communications that carries downlink control information or data traffic.

In some cases, the polling transmitted using a different beam or a different TRP than used for an original transmission of the downlink communication. In some cases, the response from the UE indicates that the acknowledgment feedback was previously transmitted, and indicates a time of an initial transmission of the acknowledgment feedback. In some cases, the downlink communication included an activation indication, and where an activation time is determined based on the time of the initial transmission of the acknowledgment feedback. In some cases, the prior transmission of the packet included an activation indication, and where an activation time is determined based on a transmission time of the prior acknowledgment feedback.

The resource transition manager 920 may transition, during a second communication period and based on the communication failure, the wireless resource from the first state to the second state.

The communication failure recovery manager 925 may perform the beam failure recovery procedure using the wireless resource transitioned to the second state. In some examples, the communication failure recovery manager 925 may perform the on-demand beam failure recovery procedure using the selected wireless resources. In some examples, the communication failure recovery manager 925 may initiate, based on a communications failure with the second wireless device during a first communications period, a beam failure recovery procedure during a second communications period.

In some examples, the communication failure recovery manager 925 may establish, based on the beam failure recovery procedure, an updated first beam pair link. In some examples, the communication failure recovery manager 925 may resume communications, subsequent to the second communications period, using the updated first beam pair link.

The resource selection manager 935 may select one of the first wireless resource or the periodic wireless resources for performing the on-demand beam failure recovery procedure based on the communication failure and the second communication period including the periodic wireless resources.

In some examples, the resource selection manager 935 may determine that the first communication period has an absence of data to be transmitted. In some examples, the resource selection manager 935 may transmit an indication that the first communication period has an absence of data to be transmitted.

In some examples, the resource selection manager 935 may receive an indication from the second wireless device that a first transmission in a first communications period is transmitted according to a first beam sweep pattern that uses one or more beams. In some examples, the resource selection manager 935 may receive the first transmission from the second wireless device in the first communications period according to the first beam sweep pattern. In some examples, the resource selection manager 935 may transmit a responsive transmission to the second wireless device based on the first transmission, where the responsive transmission is transmitted in the first communications period using a second beam sweep pattern that corresponds to the first beam sweep pattern.

In some examples, the resource selection manager 935 may communicate with the second wireless device using a second beam pair link during the second communications period.

In some examples, the resource selection manager 935 may select the periodic wireless resources for performing the on-demand beam failure recovery procedure.

In some examples, the resource selection manager 935 may determine that communications during the first communication period are low latency communications. In some examples, the resource selection manager 935 may select the first wireless resource for performing the on-demand beam failure recovery procedure based on the communications during the first communication period being low latency communications. In some examples, the resource selection manager 935 may select the periodic wireless resources for performing the on-demand beam failure recovery procedure based on a timing of the periodic wireless resources being within a time threshold of the first wireless resource.

In some examples, the resource selection manager 935 may transmit redundant communications to the second wireless device using the first beam pair link during the second communications period.

In some examples, the resource selection manager 935 may release resources associated with the second beam pair link responsive to establishing the updated first beam pair link.

In some cases, the priority of the first wireless resource and the periodic wireless resources is based on a latency target of communications during the first communication period.

In some cases, the indication that the first communication period has the absence of data to be transmitted is a physical or bit sequence. In some cases, the indication that the first communication period has the absence of data to be transmitted is a lack of any transmission in the first communication period. In some cases, the indication that the first communication period has the absence of data to be transmitted is provided before, during, or after the first communication period. In some cases, the first transmission is a downlink transmission that includes downlink shared channel information, downlink control channel information, or combinations thereof.

In some cases, the responsive transmission is an uplink transmission that includes uplink shared channel information, uplink control channel information, or combinations thereof. In some cases, the first beam sweep pattern includes a set of downlink beams, and the second beam sweep pattern includes a set of uplink beams having reciprocal beams to the set of downlink beams. In some cases, the second beam pair link uses a different TRP than the first beam pair link, and where the different TRP and the second beam pair link are preconfigured prior to the first communications period.

The CRC manager 940 may configure uplink communications to include acknowledgment feedback to include the CRC appended to the uplink payload irrespective of the uplink payload size. In some examples, the CRC manager 940 may process an uplink communication based on the uplink communication including the acknowledgment feedback and the CRC. In some examples, the CRC manager 940 may format the acknowledgment feedback for transmission with uplink shared channel data, and where the acknowledgment feedback and the uplink shared channel data share a same CRC.

In some examples, the CRC manager 940 may configure the acknowledgment feedback to exceed the threshold payload size. In some examples, the CRC manager 940 may provide a dynamic indication that the acknowledgment feedback is to include the CRC irrespective of the uplink payload size.

In some cases, the acknowledgment feedback is transmitted in a MAC control element with the uplink shared channel data. In some cases, the acknowledgment feedback is a one-bit indication of receipt of motion control data, and is transmitted with the uplink shared channel data. In some cases, the acknowledgment feedback is padded with one or more bits to have a payload size that exceeds the threshold payload size. In some cases, the acknowledgment feedback is encoded to have a larger payload size than the threshold payload size. In some cases, the acknowledgment feedback is repeated one or more times to provide a payload size that exceeds the threshold payload size.

The RRC manager 930 may exchange RRC messages that indicate the wireless resource that is configured for the beam failure recovery procedure.

Figure 10:
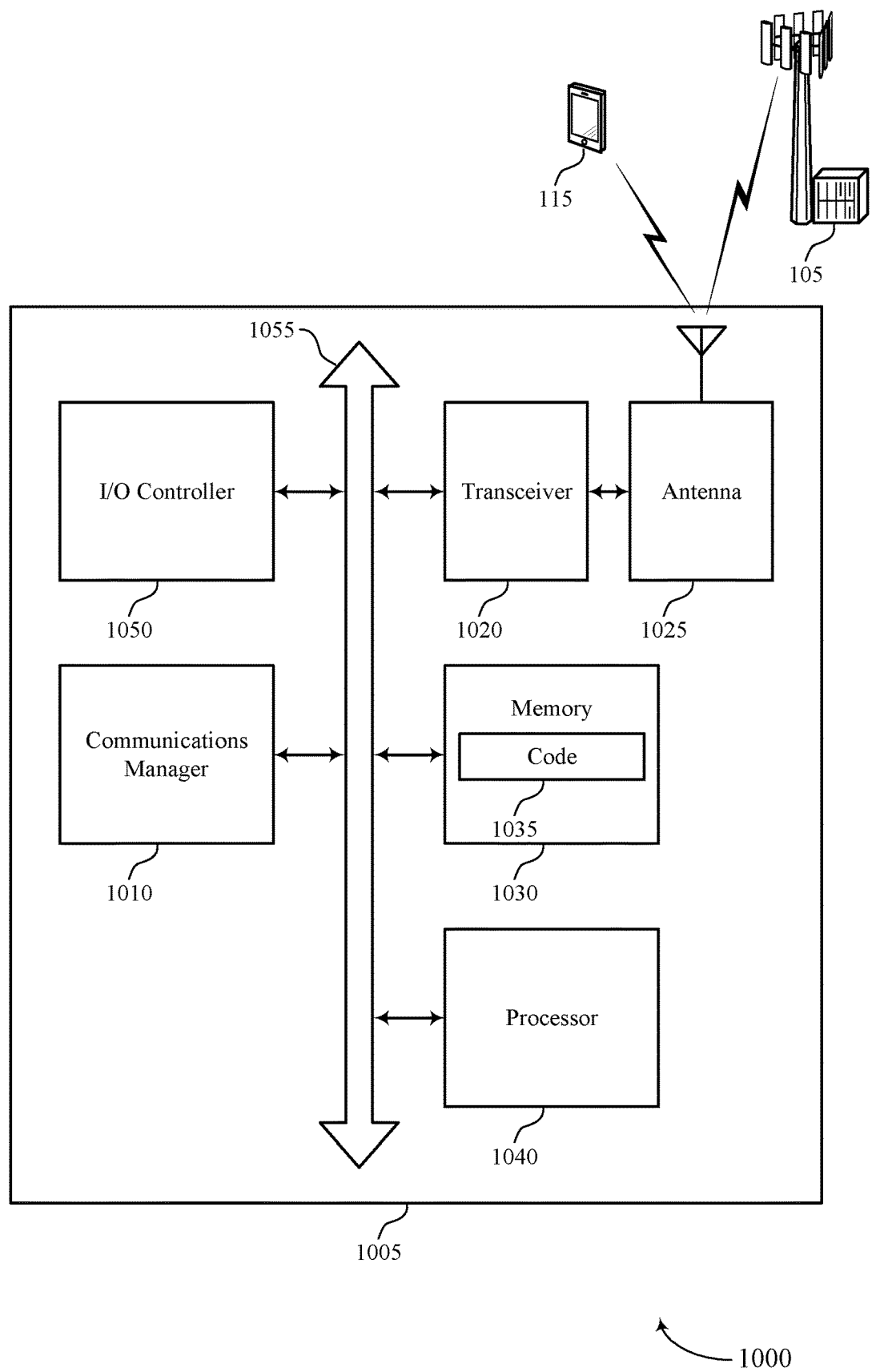
FIG. 10 shows a diagram of a system including a user equipment that supports beam failure recovery techniques in accordance with one or more aspects of the present disclosure.

FIG. 10 shows a diagram of a system 1000 including a device 1005 that supports beam failure recovery techniques in accordance with one or more aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, a transceiver 1020, an antenna 1025, memory 1030, a processor 1040, and an I/O controller 1050. These components may be in electronic communication via one or more buses (e.g., bus 1055).

The communications manager 1010 may configure a wireless resource for a beam failure recovery procedure, where the wireless resource is configured to have a first state where the wireless resource is active for data communications and is inactive for the beam failure recovery procedure, and to have a second state where the wireless resource is inactive for data communications and is active for the beam failure recovery procedure, determine that a communication failure has occurred during a first communication period, transition, during a second communication period and based on the communication failure, the wireless resource from the first state to the second state, and perform the beam failure recovery procedure using the wireless resource transitioned to the second state.

The communications manager 1010 may also identify a first wireless resource for an on-demand beam failure recovery procedure and periodic wireless resources that are configured for use in other beam failure recovery procedures, determine that a second communication period includes the periodic wireless resources, determine that a communication failure has occurred during a first communication period, select one of the first wireless resource or the periodic wireless resources for performing the on-demand beam failure recovery procedure based on the communication failure and the second communication period including the periodic wireless resources, and perform the on-demand beam failure recovery procedure using the selected wireless resources.

The communications manager 1010 may also determine that an uplink communication has an uplink payload that is at or below a threshold payload size, where uplink communications having a payload size above the threshold payload size are to have a CRC appended to the uplink payload and uplink communications having a payload size at or below the threshold payload size are to be transmitted without a CRC appended to the uplink payload, configure uplink communications to include acknowledgment feedback to include the CRC appended to the uplink payload irrespective of the uplink payload size, and process an uplink communication based on the uplink communication including the acknowledgment feedback and the CRC.

The communications manager 1010 may also configure a wireless resource for a beam failure recovery procedure, determine, based on a failure to receive an acknowledgment feedback for communications in a first communication period, an initial failure state for the first communication period, confirm, based on a redundant indication of the acknowledgment feedback, a communication failure for the first communication period, and perform the beam failure recovery procedure using the wireless resource.

The communications manager 1010 may also identify a wireless resource for a beam failure recovery procedure, where a determination to initiate the beam failure recovery procedure is based on an acknowledgment feedback for communications in a first communication period, determine that the first communication period has an absence of data to be transmitted, transmit an indication that the first communication period has an absence of data to be transmitted, and assume, for purposes of initiating the beam failure recovery procedure, that the acknowledgment feedback associated with the first communication period indicates successful communications.

The communications manager 1010 may also establish a wireless connection via a first beam pair link with a second wireless device, receive an indication from the second wireless device that a first transmission in a first communications period is transmitted according to a first beam sweep pattern that uses one or more beams, receive the first transmission from the second wireless device in the first communications period according to the first beam sweep pattern, and transmit a responsive transmission to the second wireless device based on the first transmission, where the responsive transmission is transmitted in the first communications period using a second beam sweep pattern that corresponds to the first beam sweep pattern.

The communications manager 1010 may also establish a wireless connection via a first beam pair link with a second wireless device, initiate, based on a communications failure with the second wireless device during a first communications period, a beam failure recovery procedure during a second communications period, establish, based on the beam failure recovery procedure, an updated first beam pair link, resume communications, subsequent to the second communications period, using the updated first beam pair link, and communicate with the second wireless device using a second beam pair link during the second communications period.

Transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM, ROM, or a combination thereof. The memory 1030 may store computer-readable code 1035 including instructions that, when executed by a processor (e.g., the processor 1040) cause the device to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting beam failure recovery techniques).

The I/O controller 1050 may manage input and output signals for the device 1005. The I/O controller 1050 may also manage peripherals not integrated into the device 1005. In some cases, the I/O controller 1050 may represent a physical connection or port to an external peripheral. In some cases, the I/O controller 1050 may utilize an operating system such as iOS®, ANDROID®, MS-DOS®, MS-WINDOWS®, OS/2®, UNIX®, LINUX®, or another known operating system. In other cases, the I/O controller 1050 may represent or interact with a modem, a keyboard, a mouse, a touchscreen, or a similar device. In some cases, the I/O controller 1050 may be implemented as part of a processor. In some cases, a user may interact with the device 1005 via the I/O controller 1050 or via hardware components controlled by the I/O controller 1050.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
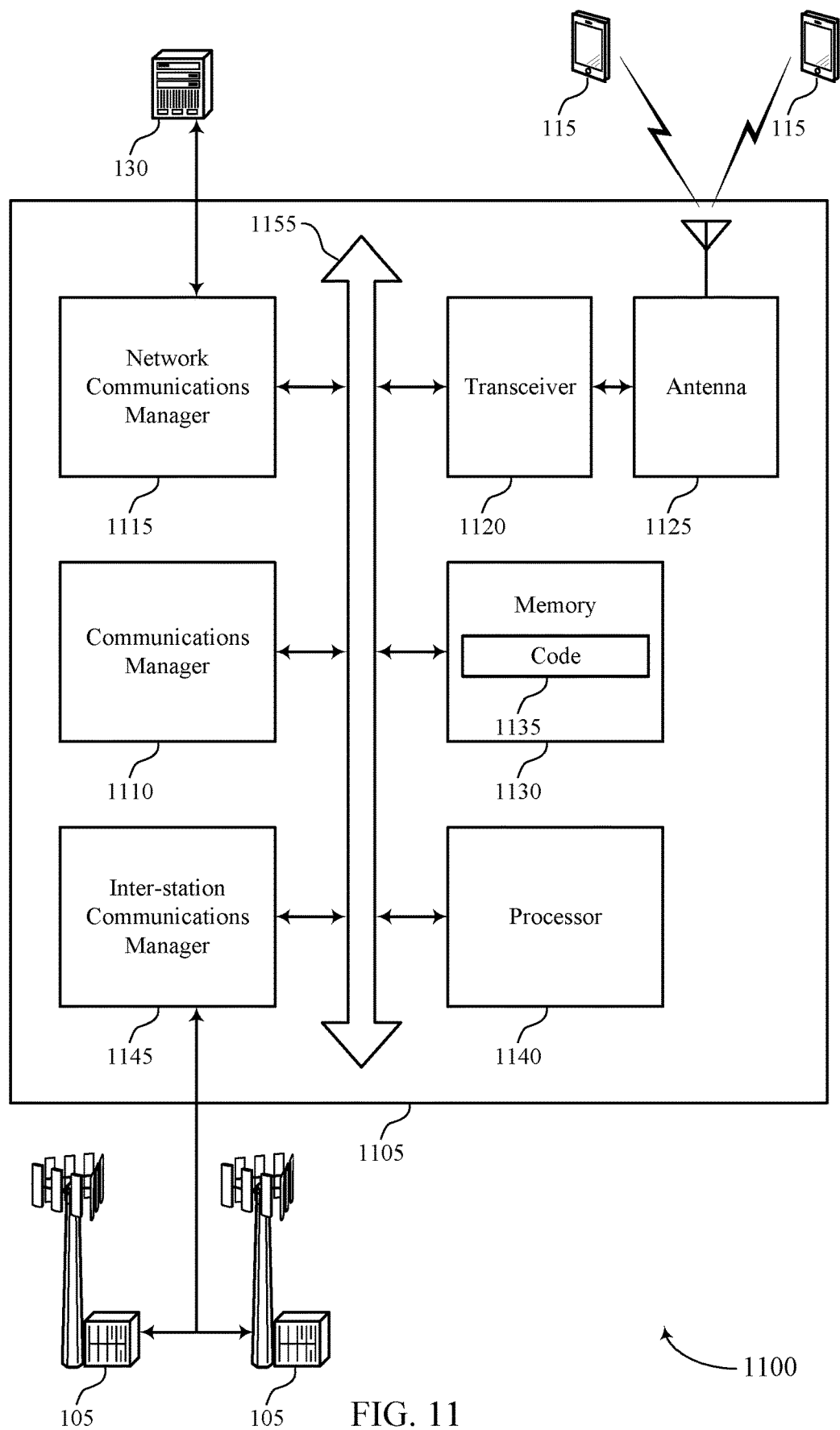
FIG. 11 shows a diagram of a system including a base station that supports beam failure recovery techniques in accordance with one or more aspects of the present disclosure.

FIG. 11 shows a diagram of a system 1100 including a device 1105 that supports beam failure recovery techniques in accordance with one or more aspects of the present disclosure. The device 1105 may be an example of or include the components of device 705, device 805, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1155).

The communications manager 1110 may configure a wireless resource for a beam failure recovery procedure, where the wireless resource is configured to have a first state where the wireless resource is active for data communications and is inactive for the beam failure recovery procedure, and to have a second state where the wireless resource is inactive for data communications and is active for the beam failure recovery procedure, determine that a communication failure has occurred during a first communication period, transition, during a second communication period and based on the communication failure, the wireless resource from the first state to the second state, and perform the beam failure recovery procedure using the wireless resource transitioned to the second state.

The communications manager 1110 may also identify a first wireless resource for an on-demand beam failure recovery procedure and periodic wireless resources that are configured for use in other beam failure recovery procedures, determine that a second communication period includes the periodic wireless resources, determine that a communication failure has occurred during a first communication period, select one of the first wireless resource or the periodic wireless resources for performing the on-demand beam failure recovery procedure based on the communication failure and the second communication period including the periodic wireless resources, and perform the on-demand beam failure recovery procedure using the selected wireless resources.

The communications manager 1110 may also determine that an uplink communication has an uplink payload that is at or below a threshold payload size, where uplink communications having a payload size above the threshold payload size are to have a CRC appended to the uplink payload and uplink communications having a payload size at or below the threshold payload size are to be transmitted without a CRC appended to the uplink payload, configure uplink communications to include acknowledgment feedback to include the CRC appended to the uplink payload irrespective of the uplink payload size, and process an uplink communication based on the uplink communication including the acknowledgment feedback and the CRC.

The communications manager 1110 may also configure a wireless resource for a beam failure recovery procedure, determine, based on a failure to receive an acknowledgment feedback for communications in a first communication period, an initial failure state for the first communication period, confirm, based on a redundant indication of the acknowledgment feedback, a communication failure for the first communication period, and perform the beam failure recovery procedure using the wireless resource.

The communications manager 1110 may also identify a wireless resource for a beam failure recovery procedure, where a determination to initiate the beam failure recovery procedure is based on an acknowledgment feedback for communications in a first communication period, determine that the first communication period has an absence of data to be transmitted, transmit an indication that the first communication period has an absence of data to be transmitted, and assume, for purposes of initiating the beam failure recovery procedure, that the acknowledgment feedback associated with the first communication period indicates successful communications.

The communications manager 1110 may also establish a wireless connection via a first beam pair link with a second wireless device, receive an indication from the second wireless device that a first transmission in a first communications period is transmitted according to a first beam sweep pattern that uses one or more beams, receive the first transmission from the second wireless device in the first communications period according to the first beam sweep pattern, and transmit a responsive transmission to the second wireless device based on the first transmission, where the responsive transmission is transmitted in the first communications period using a second beam sweep pattern that corresponds to the first beam sweep pattern.

The communications manager 1110 may also establish a wireless connection via a first beam pair link with a second wireless device, initiate, based on a communications failure with the second wireless device during a first communications period, a beam failure recovery procedure during a second communications period, establish, based on the beam failure recovery procedure, an updated first beam pair link, resume communications, subsequent to the second communications period, using the updated first beam pair link, and communicate with the second wireless device using a second beam pair link during the second communications period.

Network communications manager 1115 may manage communications with the core network (e.g., via one or more wired backhaul links). For example, the network communications manager 1115 may manage the transfer of data communications for client devices, such as one or more UEs 115.

Transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting beam failure recovery techniques).

Inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
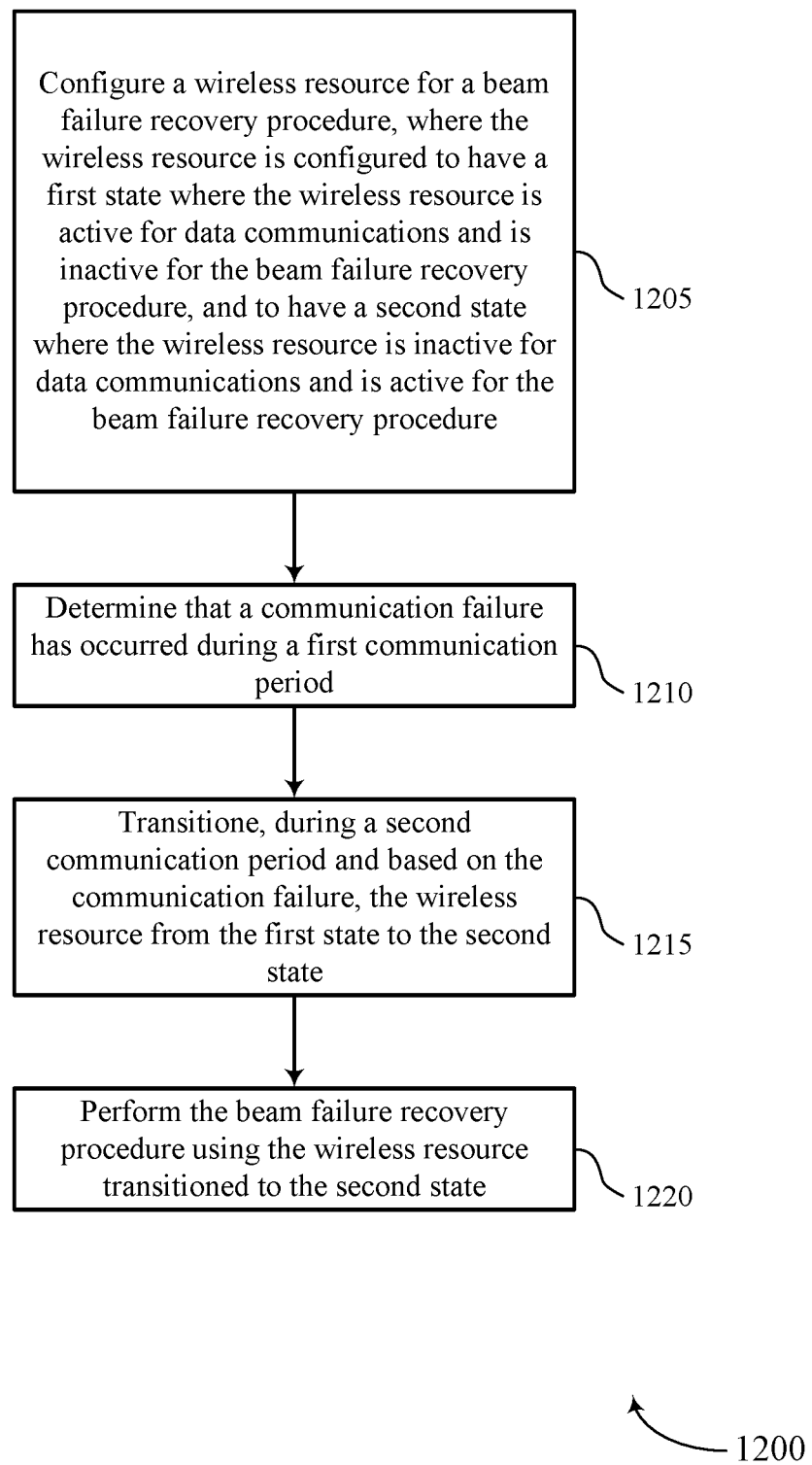
FIGS. 12 through 18 show flowcharts illustrating methods that support beam failure recovery techniques in accordance with one or more aspects of the present disclosure.

FIG. 12 shows a flowchart illustrating a method 1200 that supports beam failure recovery techniques in accordance with one or more aspects of the present disclosure. The operations of method 1200 may be implemented by a UE 115 or base station 105 or its components as described herein. For example, the operations of method 1200 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1205, the UE or base station may configure a wireless resource for a beam failure recovery procedure, where the wireless resource is configured to have a first state where the wireless resource is active for data communications and is inactive for the beam failure recovery procedure, and to have a second state where the wireless resource is inactive for data communications and is active for the beam failure recovery procedure. The operations of 1205 may be performed according to the methods described herein. In some examples, aspects of the operations of 1205 may be performed by a resource manager as described with reference to FIGS. 7 through 11.

At 1210, the UE or base station may determine that a communication failure has occurred during a first communication period. The operations of 1210 may be performed according to the methods described herein. In some examples, aspects of the operations of 1210 may be performed by a communication failure manager as described with reference to FIGS. 7 through 11.

At 1215, the UE or base station may transition, during a second communication period and based on the communication failure, the wireless resource from the first state to the second state. The operations of 1215 may be performed according to the methods described herein. In some examples, aspects of the operations of 1215 may be performed by a resource transition manager as described with reference to FIGS. 7 through 11.

At 1220, the UE or base station may perform the beam failure recovery procedure using the wireless resource transitioned to the second state. The operations of 1220 may be performed according to the methods described herein. In some examples, aspects of the operations of 1220 may be performed by a communication failure recovery manager as described with reference to FIGS. 7 through 11.

Figure 13:
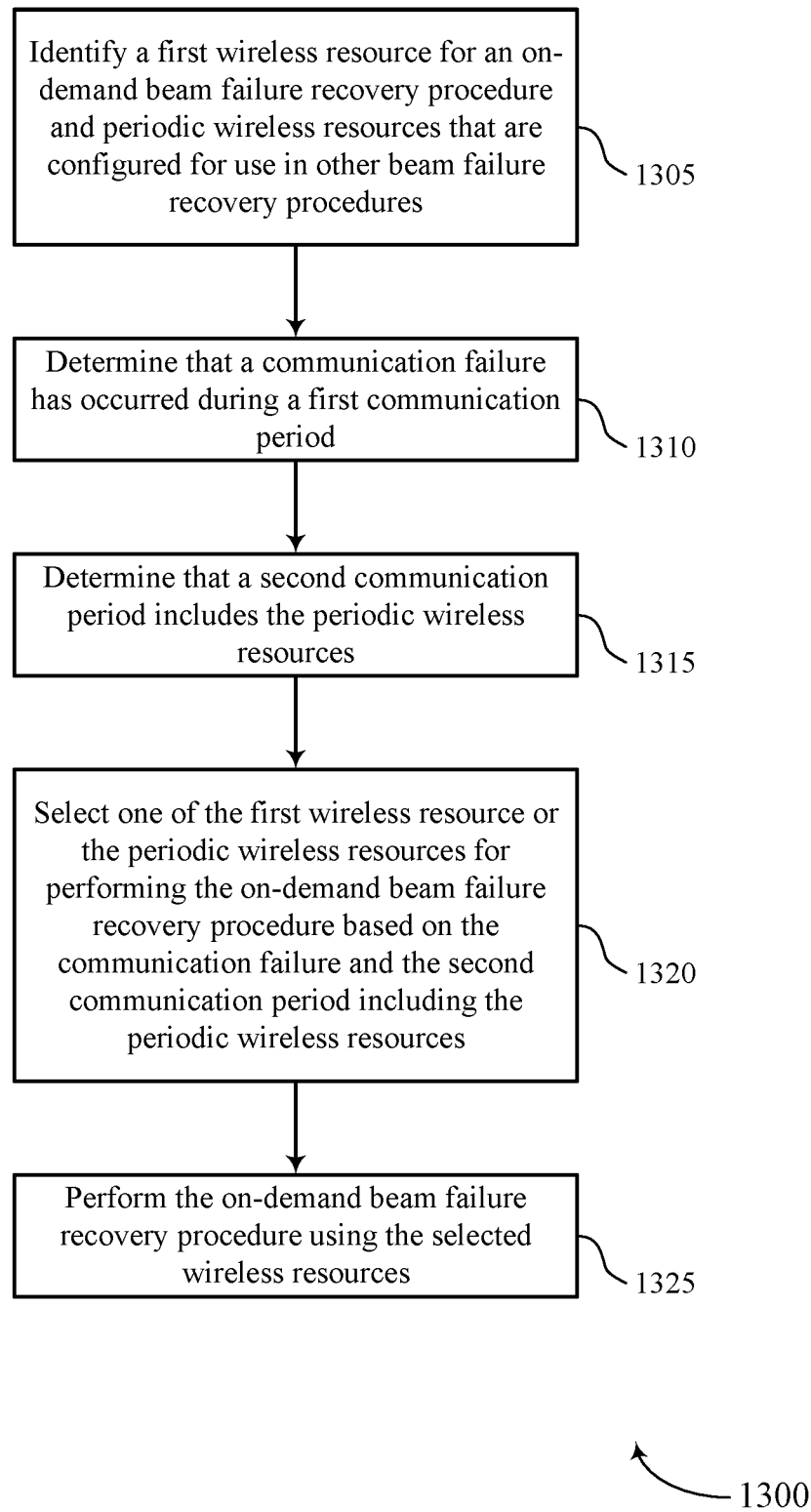

FIG. 13 shows a flowchart illustrating a method 1300 that supports beam failure recovery techniques in accordance with one or more aspects of the present disclosure. The operations of method 1300 may be implemented by a UE 115 or base station 105 or its components as described herein. For example, the operations of method 1300 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1305, the UE or base station may identify a first wireless resource for an on-demand beam failure recovery procedure and periodic wireless resources that are configured for use in other beam failure recovery procedures. The operations of 1305 may be performed according to the methods described herein. In some examples, aspects of the operations of 1305 may be performed by a resource manager as described with reference to FIGS. 7 through 11.

At 1310, the UE or base station may determine that a communication failure has occurred during a first communication period. The operations of 1310 may be performed according to the methods described herein. In some examples, aspects of the operations of 1310 may be performed by a communication failure manager as described with reference to FIGS. 7 through 11.

At 1315, the UE or base station may determine that a second communication period includes the periodic wireless resources. The operations of 1315 may be performed according to the methods described herein. In some examples, aspects of the operations of 1315 may be performed by a resource manager as described with reference to FIGS. 7 through 11.

At 1320, the UE or base station may select one of the first wireless resource or the periodic wireless resources for performing the on-demand beam failure recovery procedure based on the communication failure and the second communication period including the periodic wireless resources. The operations of 1320 may be performed according to the methods described herein. In some examples, aspects of the operations of 1320 may be performed by a resource selection manager as described with reference to FIGS. 7 through 11.

At 1325, the UE or base station may perform the on-demand beam failure recovery procedure using the selected wireless resources. The operations of 1325 may be performed according to the methods described herein. In some examples, aspects of the operations of 1325 may be performed by a communication failure recovery manager as described with reference to FIGS. 7 through 11.

Figure 14:
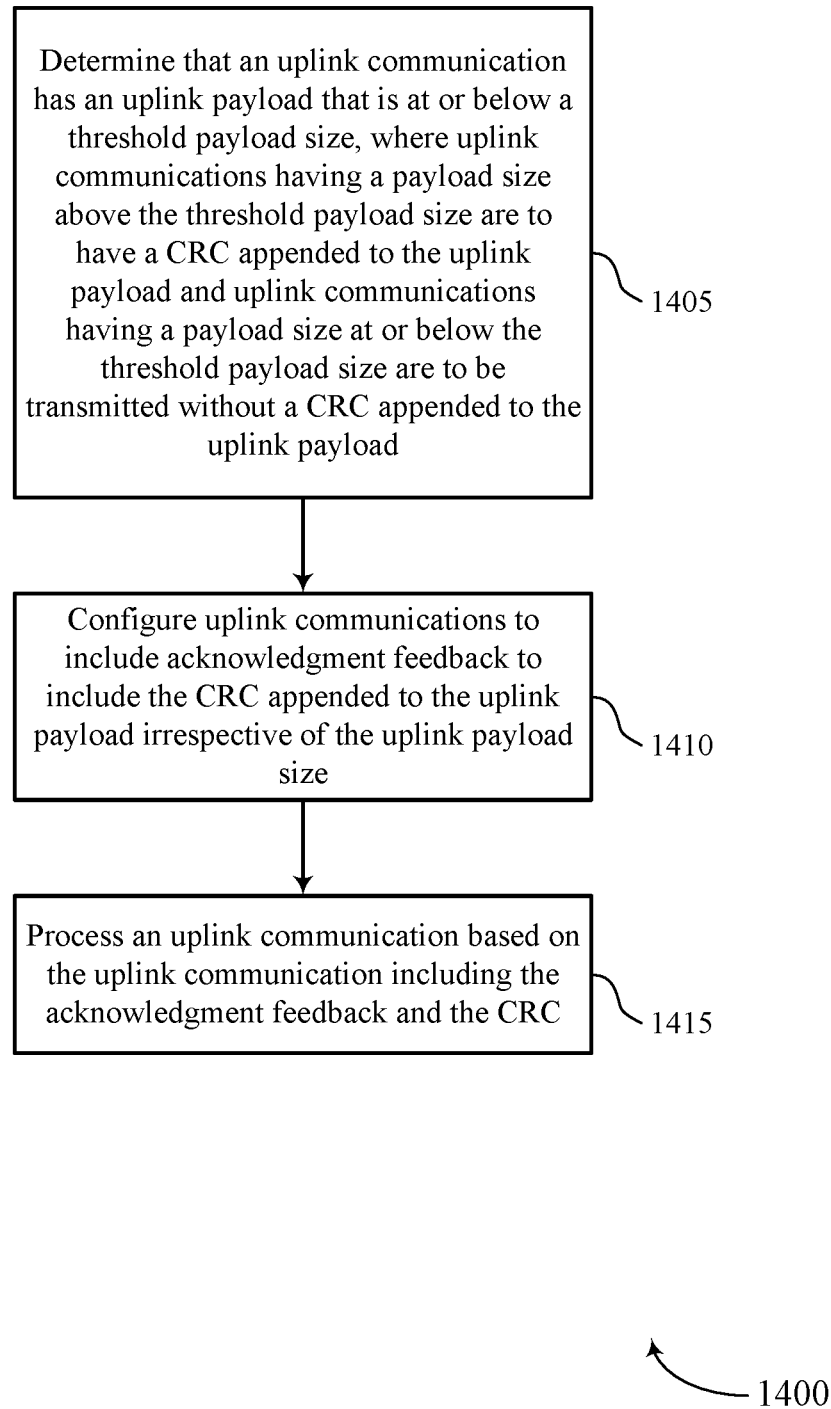

FIG. 14 shows a flowchart illustrating a method 1400 that supports beam failure recovery techniques in accordance with one or more aspects of the present disclosure. The operations of method 1400 may be implemented by a UE 115 or base station 105 or its components as described herein. For example, the operations of method 1400 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1405, the UE or base station may determine that an uplink communication has an uplink payload that is at or below a threshold payload size, where uplink communications having a payload size above the threshold payload size are to have a CRC appended to the uplink payload and uplink communications having a payload size at or below the threshold payload size are to be transmitted without a CRC appended to the uplink payload. The operations of 1405 may be performed according to the methods described herein. In some examples, aspects of the operations of 1405 may be performed by a resource manager as described with reference to FIGS. 7 through 11.

At 1410, the UE or base station may configure uplink communications to include acknowledgment feedback to include the CRC appended to the uplink payload irrespective of the uplink payload size. The operations of 1410 may be performed according to the methods described herein. In some examples, aspects of the operations of 1410 may be performed by a CRC manager as described with reference to FIGS. 7 through 11.

At 1415, the UE or base station may process an uplink communication based on the uplink communication including the acknowledgment feedback and the CRC. The operations of 1415 may be performed according to the methods described herein. In some examples, aspects of the operations of 1415 may be performed by a CRC manager as described with reference to FIGS. 7 through 11.

Figure 15:
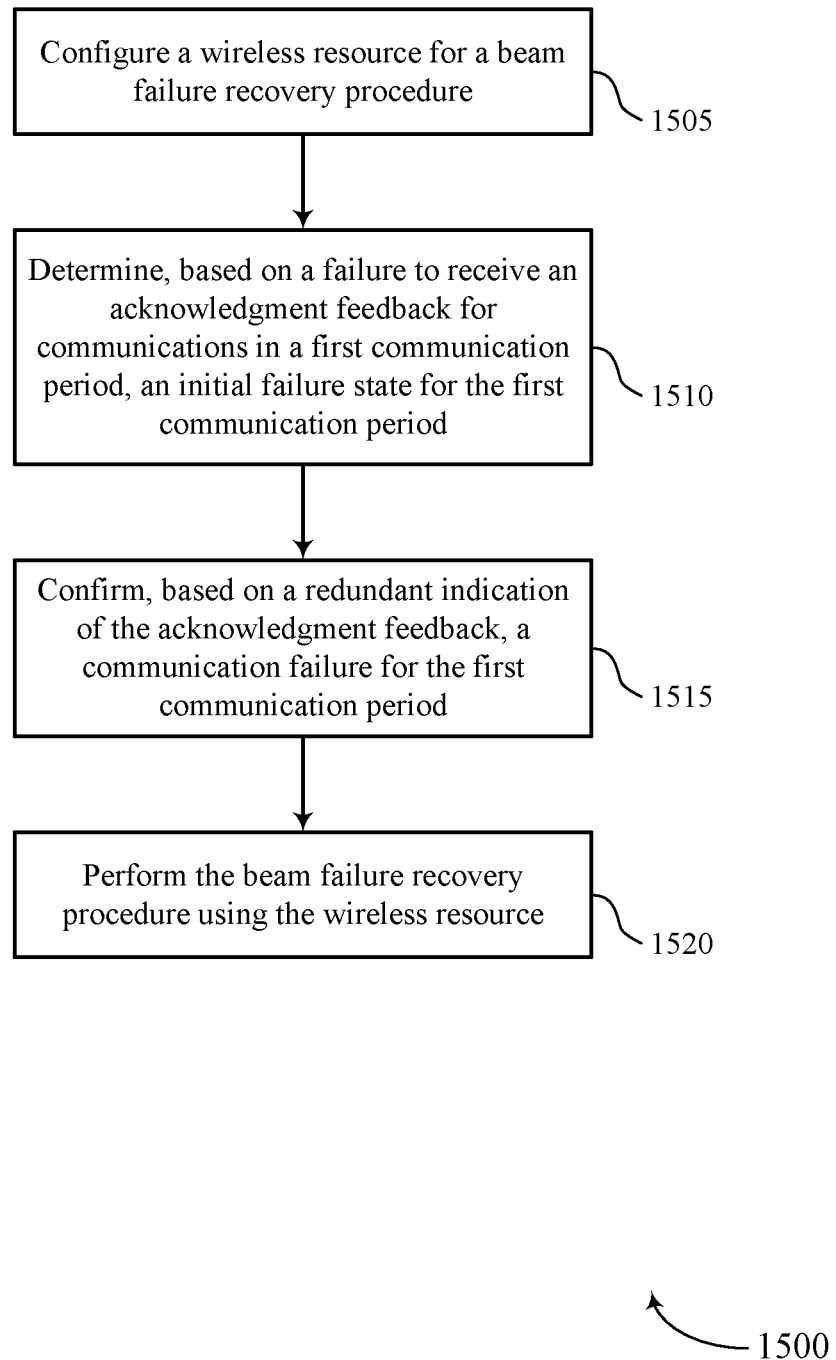

FIG. 15 shows a flowchart illustrating a method 1500 that supports beam failure recovery techniques in accordance with one or more aspects of the present disclosure. The operations of method 1500 may be implemented by a UE 115 or base station 105 or its components as described herein. For example, the operations of method 1500 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1505, the UE or base station may configure a wireless resource for a beam failure recovery procedure. The operations of 1505 may be performed according to the methods described herein. In some examples, aspects of the operations of 1505 may be performed by a resource manager as described with reference to FIGS. 7 through 11.

At 1510, the UE or base station may determine, based on a failure to receive an acknowledgment feedback for communications in a first communication period, an initial failure state for the first communication period. The operations of 1510 may be performed according to the methods described herein. In some examples, aspects of the operations of 1510 may be performed by a communication failure manager as described with reference to FIGS. 7 through 11.

At 1515, the UE or base station may confirm, based on a redundant indication of the acknowledgment feedback, a communication failure for the first communication period. The operations of 1515 may be performed according to the methods described herein. In some examples, aspects of the operations of 1515 may be performed by a communication failure manager as described with reference to FIGS. 7 through 11.

At 1520, the UE or base station may perform the beam failure recovery procedure using the wireless resource. The operations of 1520 may be performed according to the methods described herein. In some examples, aspects of the operations of 1520 may be performed by a communication failure recovery manager as described with reference to FIGS. 7 through 11.

Figure 16:
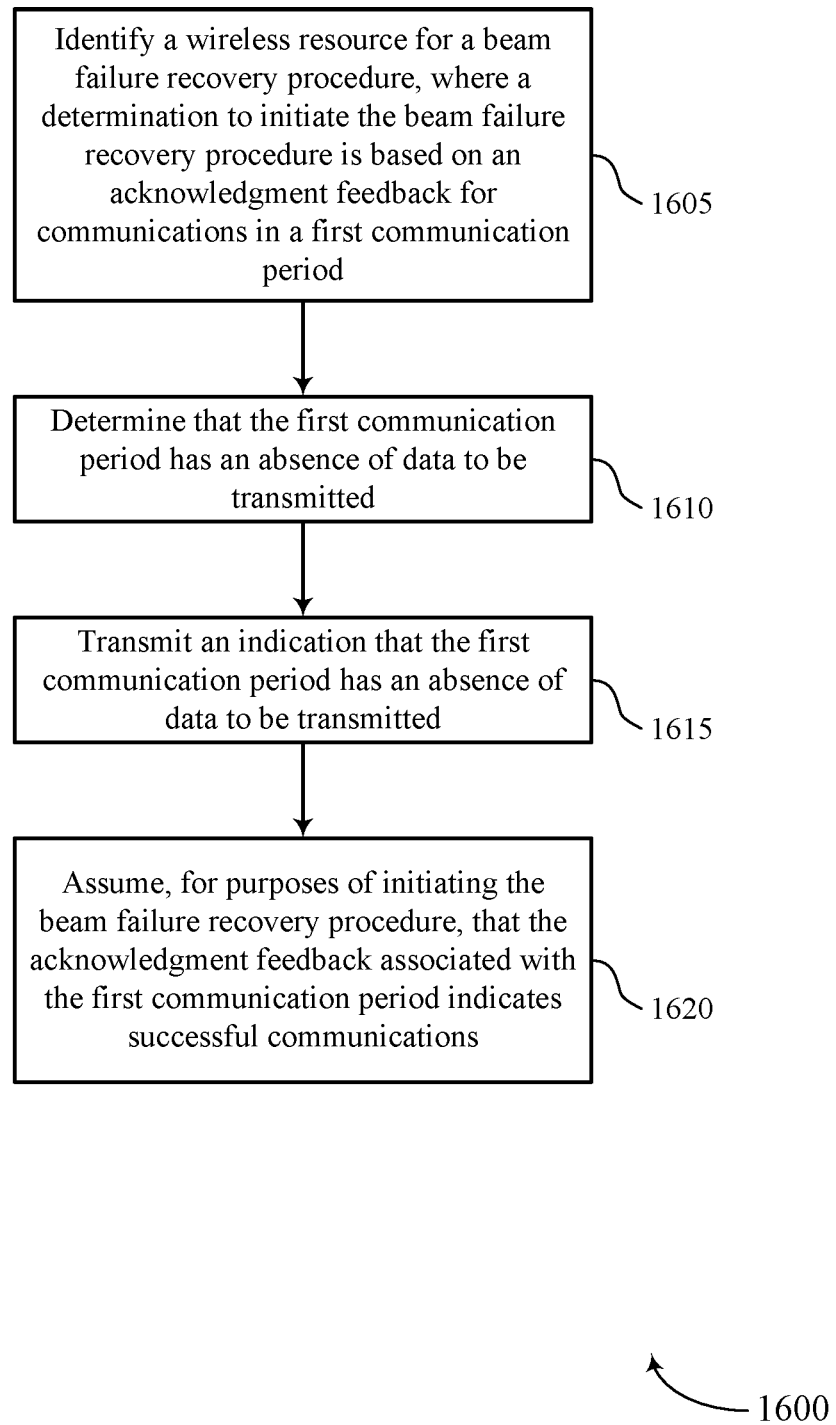

FIG. 16 shows a flowchart illustrating a method 1600 that supports beam failure recovery techniques in accordance with one or more aspects of the present disclosure. The operations of method 1600 may be implemented by a UE 115 or base station 105 or its components as described herein. For example, the operations of method 1600 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1605, the UE or base station may identify a wireless resource for a beam failure recovery procedure, where a determination to initiate the beam failure recovery procedure is based on an acknowledgment feedback for communications in a first communication period. The operations of 1605 may be performed according to the methods described herein. In some examples, aspects of the operations of 1605 may be performed by a resource manager as described with reference to FIGS. 7 through 11.

At 1610, the UE or base station may determine that the first communication period has an absence of data to be transmitted. The operations of 1610 may be performed according to the methods described herein. In some examples, aspects of the operations of 1610 may be performed by a resource selection manager as described with reference to FIGS. 7 through 11.

At 1615, the UE or base station may transmit an indication that the first communication period has an absence of data to be transmitted. The operations of 1615 may be performed according to the methods described herein. In some examples, aspects of the operations of 1615 may be performed by a resource selection manager as described with reference to FIGS. 7 through 11.

At 1620, the UE or base station may assume, for purposes of initiating the beam failure recovery procedure, that the acknowledgment feedback associated with the first communication period indicates successful communications. The operations of 1620 may be performed according to the methods described herein. In some examples, aspects of the operations of 1620 may be performed by a communication failure manager as described with reference to FIGS. 7 through 11.

Figure 17:
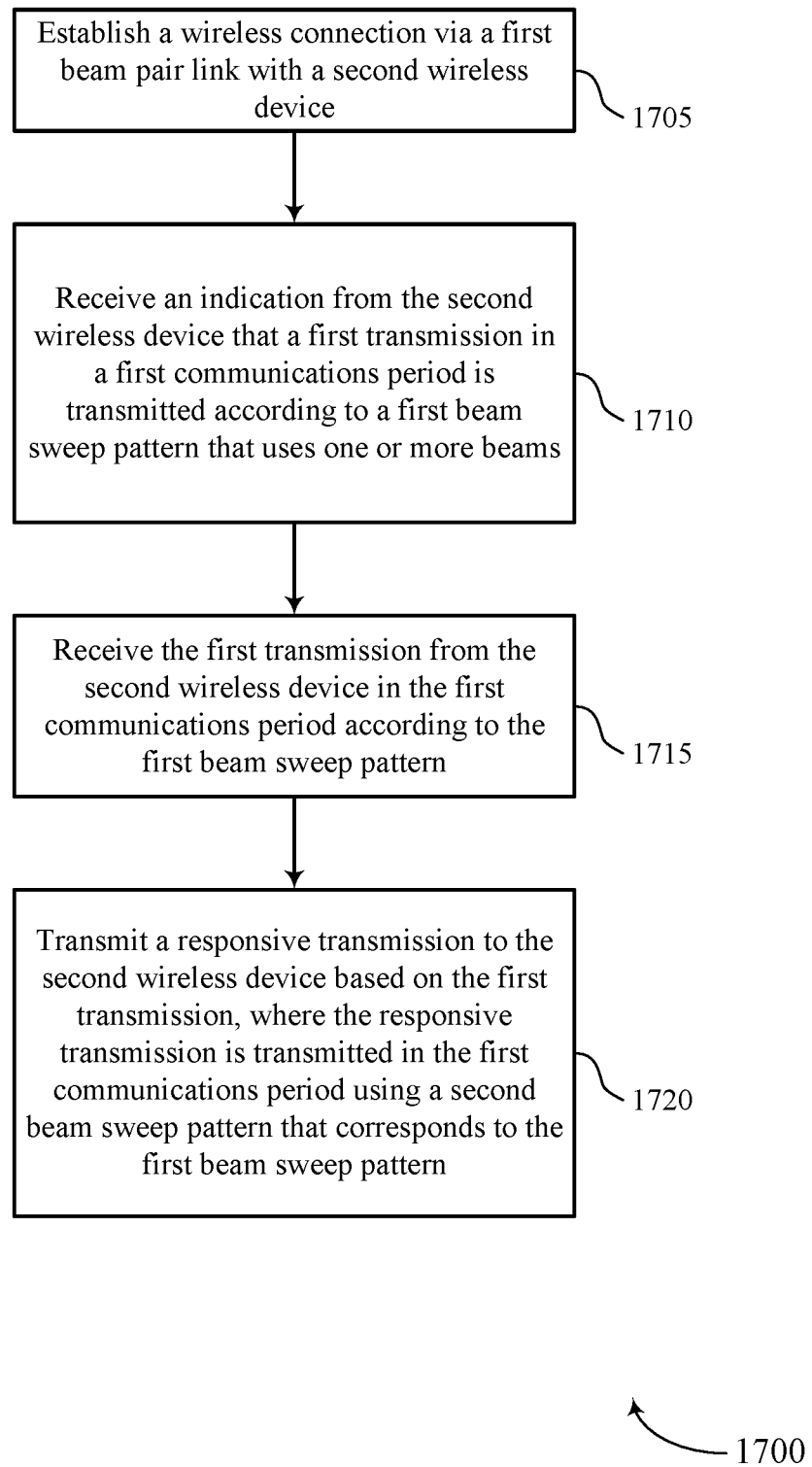

FIG. 17 shows a flowchart illustrating a method 1700 that supports beam failure recovery techniques in accordance with one or more aspects of the present disclosure. The operations of method 1700 may be implemented by a UE 115 or base station 105 or its components as described herein. For example, the operations of method 1700 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1705, the UE or base station may establish a wireless connection via a first beam pair link with a second wireless device. The operations of 1705 may be performed according to the methods described herein. In some examples, aspects of the operations of 1705 may be performed by a resource manager as described with reference to FIGS. 7 through 11.

At 1710, the UE or base station may receive an indication from the second wireless device that a first transmission in a first communications period is transmitted according to a first beam sweep pattern that uses one or more beams. The operations of 1710 may be performed according to the methods described herein. In some examples, aspects of the operations of 1710 may be performed by a resource selection manager as described with reference to FIGS. 7 through 11.

At 1715, the UE or base station may receive the first transmission from the second wireless device in the first communications period according to the first beam sweep pattern. The operations of 1715 may be performed according to the methods described herein. In some examples, aspects of the operations of 1715 may be performed by a resource selection manager as described with reference to FIGS. 7 through 11.

At 1720, the UE or base station may transmit a responsive transmission to the second wireless device based on the first transmission, where the responsive transmission is transmitted in the first communications period using a second beam sweep pattern that corresponds to the first beam sweep pattern. The operations of 1720 may be performed according to the methods described herein. In some examples, aspects of the operations of 1720 may be performed by a resource selection manager as described with reference to FIGS. 7 through 11.

Figure 18:
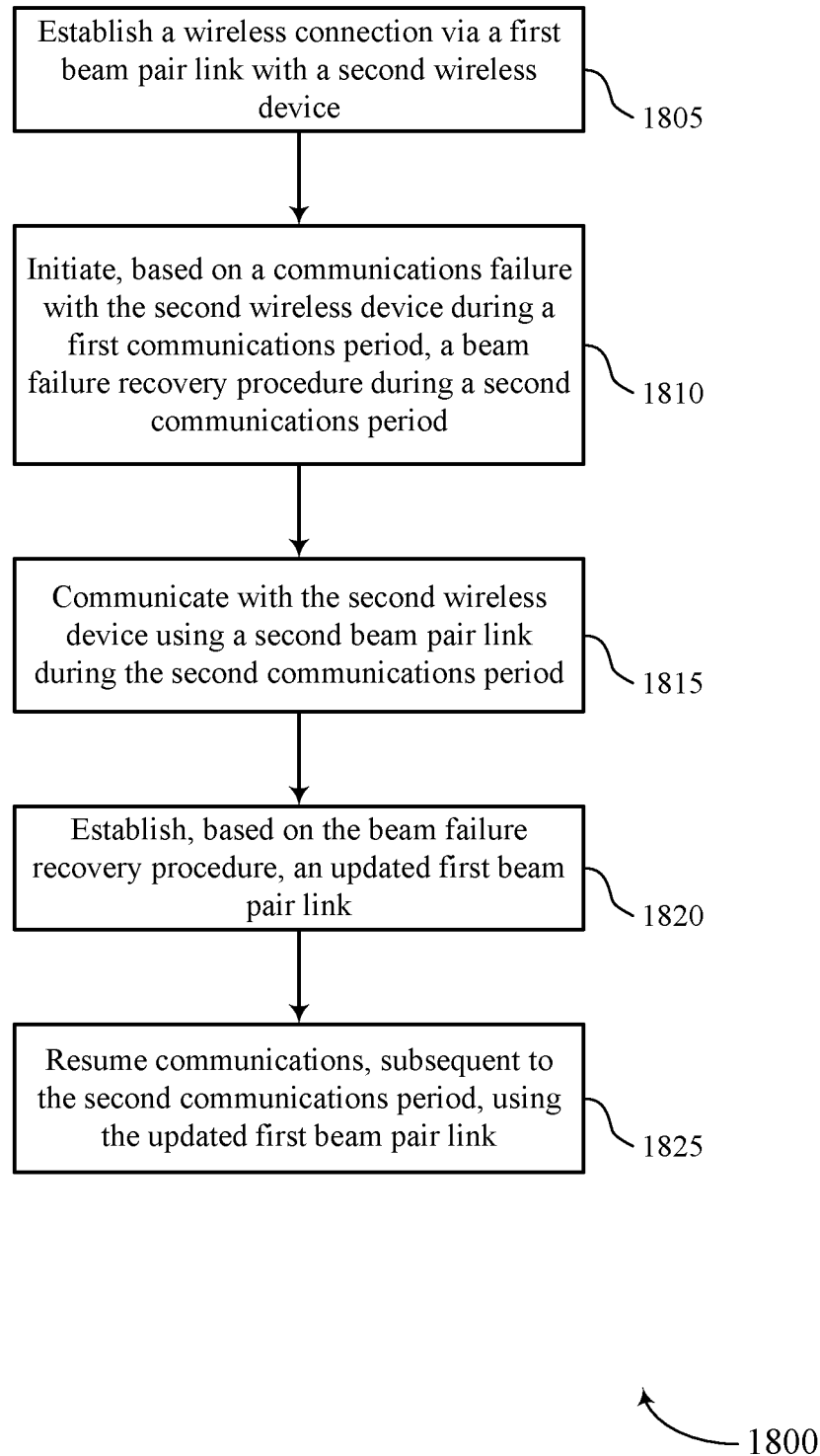

FIG. 18 shows a flowchart illustrating a method 1800 that supports beam failure recovery techniques in accordance with one or more aspects of the present disclosure. The operations of method 1800 may be implemented by a UE 115 or base station 105 or its components as described herein. For example, the operations of method 1800 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1805, the UE or base station may establish a wireless connection via a first beam pair link with a second wireless device. The operations of 1805 may be performed according to the methods described herein. In some examples, aspects of the operations of 1805 may be performed by a resource manager as described with reference to FIGS. 7 through 11.

At 1810, the UE or base station may initiate, based on a communications failure with the second wireless device during a first communications period, a beam failure recovery procedure during a second communications period. The operations of 1810 may be performed according to the methods described herein. In some examples, aspects of the operations of 1810 may be performed by a communication failure recovery manager as described with reference to FIGS. 7 through 11.

At 1815, the UE or base station may communicate with the second wireless device using a second beam pair link during the second communications period. The operations of 1815 may be performed according to the methods described herein. In some examples, aspects of the operations of 1815 may be performed by a resource selection manager as described with reference to FIGS. 7 through 11.

At 1820, the UE or base station may establish, based on the beam failure recovery procedure, an updated first beam pair link. The operations of 1820 may be performed according to the methods described herein. In some examples, aspects of the operations of 1820 may be performed by a communication failure recovery manager as described with reference to FIGS. 7 through 11.

At 1825, the UE or base station may resume communications, subsequent to the second communications period, using the updated first beam pair link. The operations of 1825 may be performed according to the methods described herein. In some examples, aspects of the operations of 1825 may be performed by a communication failure recovery manager as described with reference to FIGS. 7 through 11.

It should be noted that the methods described herein describe possible implementations, and that the operations may be rearranged or otherwise modified and that other implementations are possible. Further, aspects from two or more of the methods may be combined.

The following provides an overview of examples of the present disclosure:

Example 1: A method for wireless communication at a first wireless device, comprising: establishing a wireless connection via a first beam pair link with a second wireless device; initiating, based at least in part on a communications failure with the second wireless device during a first communications period, a beam failure recovery procedure during a second communications period; communicating with the second wireless device using a second beam pair link during the second communications period; establishing, based at least in part on the beam failure recovery procedure, an updated first beam pair link; and resuming communications, subsequent to the second communications period, using the updated first beam pair link.

Example 2: The method of example 1, wherein the second beam pair link uses a different TRP than the first beam pair link, and/or wherein the different TRP and the second beam pair link are preconfigured prior to the first communications period.

Example 3: The method of examples 1 or 2, further comprising: transmitting redundant communications to the second wireless device using the first beam pair link during the second communications period.

Example 4: The method of any one of examples 1 through 3, further comprising: releasing resources associated with the second beam pair link responsive to establishing the updated first beam pair link.

Example 5: A method for wireless communication at a wireless device, comprising: identifying a first wireless resource for an on-demand beam failure recovery procedure and periodic wireless resources that are configured for use in other beam failure recovery procedures; determining that a communication failure has occurred during a first communication period; determining that a second communication period includes the periodic wireless resources; selecting one of the first wireless resource or the periodic wireless resources for performing the on-demand beam failure recovery procedure based at least in part on the communication failure and the second communication period including the periodic wireless resources; and performing the on-demand beam failure recovery procedure using the selected wireless resources.

Example 6: The method of example 5, wherein the selecting comprises: identifying that the periodic wireless resources have priority over the first wireless resource in the second communication period; and selecting the periodic wireless resources for performing the on-demand beam failure recovery procedure.

Example 7: The method of example 5 or 6, wherein the priority of the first wireless resource and the periodic wireless resources is based at least in part on a latency target of communications during the first communication period.

Example 8: The method of examples 5 or 7, wherein the selecting comprises: determining that communications during the first communication period are low latency communications; and selecting the first wireless resource for performing the on-demand beam failure recovery procedure based at least in part on the communications during the first communication period being low latency communications.

Example 9: The method of any one of examples 5 through 7, wherein the selecting comprises: selecting the periodic wireless resources for performing the on-demand beam failure recovery procedure based at least in part on a timing of the periodic wireless resources being within a time threshold of the first wireless resource.

Example 10: A method for wireless communication at a wireless device, comprising: configuring a wireless resource for a beam failure recovery procedure; determining, based at least in part on a failure to receive an acknowledgment feedback for communications in a first communication period, an initial failure state for the first communication period; confirming, based at least in part on a redundant indication of the acknowledgment feedback, a communication failure for the first communication period; and performing the beam failure recovery procedure using the wireless resource.

Example 11: The method of example 10, wherein the method is performed at a UE, and/or wherein the confirming the communication failure comprises: monitoring a downlink portion of the wireless resource for one or more reference signal transmissions via one or more candidate beams to be selected by the UE; determining that the one or more reference signal transmissions are present on the downlink portion of the wireless resource; selecting a first candidate beam based at least in part on measurements of the one or more reference signal transmissions; and transmitting a beam failure request on an uplink portion of the wireless resource that indicates the first candidate beam.

Example 12: The method of examples 10 or 11, wherein the one or more reference signal transmissions are identified based at least in part on a scrambling sequence used to scramble the one or more reference signal transmissions.

Example 13: The method of any one of examples 10 through 12, further comprising: determining, for a subsequent communication period, the initial failure state for the subsequent communication period; monitoring the downlink portion of the wireless resource associated with the subsequent communication period for the one or more reference signal transmissions; determining that the one or more reference signal transmissions are absent on the downlink portion of the wireless resource associated with the subsequent communication period; and discontinuing the beam failure recovery procedure based at least in part on the determining the absence of the one or more reference signal transmissions on the downlink portion of the wireless resource associated with the subsequent communication period.

Example 14: The method of example 10, wherein the method is performed by a base station, and/or wherein the confirming the communication failure comprises: transmitting, in a downlink transmission to a UE, an indication that the beam failure recovery procedure is activated; and receiving, from the UE, a response to the indication that the beam failure recovery procedure is activated.

Example 15: The method of examples 10 or 14, wherein the response from the UE indicates an acceptance of the beam failure recovery procedure being activated, and/or wherein the base station performs the beam failure recovery procedure based at least in part on the acceptance.

Example 16: The method of examples 10, 14 or 15, wherein the response from the UE indicates that the UE declines the activation of the beam failure recovery procedure and indicates successful communications during the first communication period, and/or wherein the base station discontinues the beam failure recovery procedure based at least in part on the response from the UE.

Example 17: The method of any one of examples 10 through 13, wherein the method is performed by a UE, and/or wherein the confirming the communication failure comprises: receiving, in a downlink transmission from a base station, an indication that the beam failure recovery procedure is activated; and transmitting, to the base station, a response to the indication that the beam failure recovery procedure is activated.

Example 18: The method of any one of examples 10 through 13 or 17, wherein the response to the base station indicates an acceptance of the beam failure recovery procedure being activated, and/or wherein the UE performs the beam failure recovery procedure based at least in part on the acceptance.

Example 19: The method of any one of examples 10 through 13, 17 or 18, wherein the method is performed by a UE, and/or wherein the confirming the communication failure comprises: transmitting, to a base station, a request to activate the beam failure recovery procedure, wherein the request indicates that a prior downlink transmission from the base station was unsuccessfully received at the UE.

Example 20: The method of any one of examples 10 or 14 through 16, wherein the method is performed by a base station, and/or wherein the confirming the communication failure comprises: receiving, from a UE, a request to activate the beam failure recovery procedure, wherein the request indicates that a prior downlink transmission from the base station was unsuccessfully received at the UE.

Example 21: The method of any one of examples 10 through 13 or 17 through 19, wherein the method is performed by a UE, and/or wherein the confirming the communication failure comprises: polling a base station that was to receive an uplink communication from the UE during a prior communications period to determine whether the acknowledgment feedback was transmitted by the base station; receiving a response from the base station that indicates whether the acknowledgment feedback was transmitted by the base station; and continuing or discontinuing the beam failure recovery procedure based at least in part on the response from the base station.

Example 22: The method of any one of examples 10 through 13, 17 through 19, and 21, wherein the uplink communication from the UE during the prior communications period is identified based at least in part on a sequence number of the uplink communication, an index of a resource allocation of the uplink communication, or any combinations thereof; wherein the polling is transmitted in uplink communications that carries uplink control information or data traffic; wherein the polling transmitted using a different beam or a different TRP than used for an original transmission of the uplink communication; wherein the response from the base station indicates that the acknowledgment feedback was previously transmitted, and indicates a time of an initial transmission of the acknowledgment feedback; or wherein the uplink communication included an activation indication, and/or wherein an activation time is determined based on the time of the initial transmission of the acknowledgment feedback.

Example 23: The method of any one of examples 10, 14 through 16, or 20, wherein the method is performed by a base station, and/or wherein the confirming the communication failure comprises: polling a UE that was to receive a downlink communication from the base station during a prior communications period to determine whether the acknowledgment feedback was transmitted by the UE; receiving a response from the UE that indicates whether the acknowledgment feedback was transmitted by the UE; and continuing or discontinuing the beam failure recovery procedure based at least in part on the response from the UE.

Example 24: The method of any one of examples 10, 14 through 16, 20, or 23, wherein the downlink communication from the base station during the prior communications period is identified based at least in part on a sequence number of the downlink communication, an index of a resource allocation of the downlink communication, or any combinations thereof; wherein the polling is transmitted in downlink communications that carries downlink control information or data traffic; wherein the polling transmitted using a different beam or a different TRP than used for an original transmission of the downlink communication wherein the response from the UE indicates that the acknowledgment feedback was previously transmitted, and indicates a time of an initial transmission of the acknowledgment feedback; wherein the downlink communication included an activation indication; or wherein an activation time is determined based on the time of the initial transmission of the acknowledgment feedback.

Example 25: The method of any one of examples 10 through 24, wherein the confirming the communication failure comprises: determining that a packet transmitted during the first communication period is a retransmission of a prior transmission of the packet, and that prior acknowledgment feedback was previously transmitted for the packet; and transmitting an indication of the prior acknowledgment feedback.

Example 26: The method of any one of examples 10 through 25, wherein the prior transmission of the packet included an activation indication, and/or wherein an activation time is determined based on a transmission time of the prior acknowledgment feedback.

Example 27: A method for wireless communication at a wireless device, comprising: configuring a wireless resource for a beam failure recovery procedure, wherein the wireless resource is configured to have a first state where the wireless resource is active for data communications and is inactive for the beam failure recovery procedure, and to have a second state where the wireless resource is inactive for data communications and is active for the beam failure recovery procedure; determining that a communication failure has occurred during a first communication period; transitioning, during a second communication period and based at least in part on the communication failure, the wireless resource from the first state to the second state; and performing the beam failure recovery procedure using the wireless resource transitioned to the second state.

Example 28: The method of example 27, wherein the configuring comprises: exchanging RRC messages that indicate the wireless resource that is configured for the beam failure recovery procedure.

Example 29: The method of examples 27 or 28, wherein the wireless resource includes a first downlink resource for transmission of one or more reference signals using one or more beams by a first TRP, and a first uplink resource for transmission of a beam failure request by a UE.

Example 30: The method of any one of examples 27 through 29, wherein the first downlink resource is a common resource for transmission of the one or more reference signals to a plurality of UEs, and the first uplink resource is a UE-specific resource configured separately for each of the plurality of UEs; or wherein the first uplink resource includes one or more of physical uplink control channel resources, physical random access channel resources, UE-specific time resources, frequency resources, spatial resources, code-domain resources, or combinations thereof.

Example 31: A method for wireless communication at a wireless device, comprising: determining that an uplink communication has an uplink payload that is at or below a threshold payload size, wherein uplink communications having a payload size above the threshold payload size are to have a CRC appended to the uplink payload and uplink communications having a payload size at or below the threshold payload size are to be transmitted without a CRC appended to the uplink payload; configuring uplink communications to include acknowledgment feedback to include the CRC appended to the uplink payload irrespective of the uplink payload size; and processing an uplink communication based at least in part on the uplink communication including the acknowledgment feedback and the CRC.

Example 32: The method of example 31: wherein the configuring comprises: formatting the acknowledgment feedback for transmission with uplink shared channel data, and/or wherein the acknowledgment feedback and the uplink shared channel data share a same CRC.

Example 33: The method of examples 31 or 32: wherein the acknowledgment feedback is transmitted in a MAC control element with the uplink shared channel data.

Example 34: The method of any one of examples 31 through 33: wherein the acknowledgment feedback is a one-bit indication of receipt of motion control data, and is transmitted with the uplink shared channel data.

Example 35: The method of any one of examples 31 through 34: wherein the configuring comprises: configuring the acknowledgment feedback to exceed the threshold payload size.

Example 36: The method of any one of examples 31 through 35: wherein the acknowledgment feedback is padded with one or more bits to have a payload size that exceeds the threshold payload size.

Example 37: The method of any one of examples 31 through 36: wherein the acknowledgment feedback is encoded to have a larger payload size than the threshold payload size.

Example 38: The method of any one of examples 31 through 37: wherein the acknowledgment feedback is repeated one or more times to provide a payload size that exceeds the threshold payload size.

Example 39: The method of any one of examples 31 through 38: wherein the configuring comprises: providing a dynamic indication that the acknowledgment feedback is to include the CRC irrespective of the uplink payload size.

Example 40: A method for wireless communication at a wireless device, comprising: identifying a wireless resource for a beam failure recovery procedure, wherein a determination to initiate the beam failure recovery procedure is based at least in part on an acknowledgment feedback for communications in a first communication period; determining that the first communication period has an absence of data to be transmitted; transmitting an indication that the first communication period has an absence of data to be transmitted; and assuming, for purposes of initiating the beam failure recovery procedure, that the acknowledgment feedback associated with the first communication period indicates successful communications.

Example 41: The method of example 40, wherein the indication that the first communication period has the absence of data to be transmitted is a physical or bit sequence.

Example 42: The method of example 40, wherein the indication that the first communication period has the absence of data to be transmitted is a lack of any transmission in the first communication period.

Example 43: The method of examples 40 or 41, wherein the indication that the first communication period has the absence of data to be transmitted is provided before, during, or after the first communication period.

Example 44: The method of any of examples 40 through 43, wherein the acknowledgement feedback is a bit sequence representing positive acknowledgement.

Example 45: The method of any of examples 40 through 43, wherein the acknowledgement feedback is a bit sequence representing negative acknowledgement.

Example 46: The method of any of examples 40 through 43, wherein the acknowledgement feedback is no transmission.

Example 47: A method for wireless communication at a first wireless device, comprising: establishing a wireless connection via a first beam pair link with a second wireless device; receiving an indication from the second wireless device that a first transmission in a first communications period is transmitted according to a first beam sweep pattern that uses one or more beams; receiving the first transmission from the second wireless device in the first communications period according to the first beam sweep pattern; and transmitting a responsive transmission to the second wireless device based at least in part on the first transmission, wherein the responsive transmission is transmitted in the first communications period using a second beam sweep pattern that corresponds to the first beam sweep pattern.

Example 48: The method of example 47: wherein the first transmission is a downlink transmission that includes downlink shared channel information, downlink control channel information, or combinations thereof; and/or wherein the responsive transmission is an uplink transmission that includes uplink shared channel information, uplink control channel information, or combinations thereof.

Example 49: The method of examples 47 or 48: wherein the second beam sweep pattern is not explicitly indicated by the second wireless device.

Example 50: The method of any one of examples 47 through 49: wherein the first beam sweep pattern includes a set of downlink beams, and the second beam sweep pattern includes a set of uplink beams having reciprocal beams to the set of downlink beams.

Example 51: An apparatus for wireless communication comprising a processor, memory coupled with the processor, the processor and memory configured to perform a method of any one of examples 1 through 4.

Example 52: An apparatus for wireless communication comprising a processor, memory coupled with the processor, the processor and memory configured to perform a method of any one of examples 5 through 9.

Example 53: An apparatus for wireless communication comprising a processor, memory coupled with the processor, the processor and memory configured to perform a method of any one of examples 10 through 26.

Example 54: An apparatus for wireless communication comprising a processor, memory coupled with the processor, the processor and memory configured to perform a method of any one of examples 27 through 30.

Example 55: An apparatus for wireless communication comprising a processor, memory coupled with the processor, the processor and memory configured to perform a method of any one of examples 31 through 39.

Example 56: An apparatus for wireless communication comprising a processor, memory coupled with the processor, the processor and memory configured to perform a method of any one of examples 40 through 46.

Example 57: An apparatus for wireless communication comprising a processor, memory coupled with the processor, the processor and memory configured to perform a method of any one of examples 47 through 49.

Example 58: An apparatus for wireless communication comprising at least one means for performing a method of any one of examples 1 through 4.

Example 59: An apparatus for wireless communication comprising at least one means for performing a method of any one of examples 5 through 9.

Example 60: An apparatus for wireless communication comprising at least one means for performing a method of any one of examples 10 through 26.

Example 61: An apparatus for wireless communication comprising at least one means for performing a method of any one of examples 27 through 30.

Example 62: An apparatus for wireless communication comprising at least one means for performing a method of any one of examples 31 through 39.

Example 63: An apparatus for wireless communication comprising at least one means for performing a method of any one of examples 40 through 46.

Example 64: An apparatus for wireless communication comprising at least one means for performing a method of any one of examples 47 through 49.

Example 65: A non-transitory computer-readable medium storing code for wireless communication comprising a processor, memory coupled with the processor, and instructions stored in the memory and executable by the processor to cause the apparatus to perform a method of any one of examples 1 through 4.

Example 66: A non-transitory computer-readable medium storing code for wireless communication comprising a processor, memory coupled with the processor, and instructions stored in the memory and executable by the processor to cause the apparatus to perform a method of any one of examples 5 through 9.

Example 67: A non-transitory computer-readable medium storing code for wireless communication comprising a processor, memory coupled with the processor, and instructions stored in the memory and executable by the processor to cause the apparatus to perform a method of any one of examples 10 through 26.

Example 68: A non-transitory computer-readable medium storing code for wireless communication comprising a processor, memory coupled with the processor, and instructions stored in the memory and executable by the processor to cause the apparatus to perform a method of any one of examples 27 through 30.

Example 69: A non-transitory computer-readable medium storing code for wireless communication comprising a processor, memory coupled with the processor, and instructions stored in the memory and executable by the processor to cause the apparatus to perform a method of any one of examples 31 through 39.

Example 70: A non-transitory computer-readable medium storing code for wireless communication comprising a processor, memory coupled with the processor, and instructions stored in the memory and executable by the processor to cause the apparatus to perform a method of any one of examples 40 through 46.

Example 71: A non-transitory computer-readable medium storing code for wireless communication comprising a processor, memory coupled with the processor, and instructions stored in the memory and executable by the processor to cause the apparatus to perform a method of any one of examples 47 through 49.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell may cover a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a device in a wireless network, comprising:
one or more memories; and
one or more processors coupled with the one or more memories and configured to cause the device to:
configure a wireless resource for a beam failure recovery procedure;
determine, based at least in part on a failure to receive an acknowledgment feedback for communications in a first communication period, an initial failure state for the first communication period;
confirm, based at least in part on a redundant indication of the acknowledgment feedback, a communication failure for the first communication period; and
perform the beam failure recovery procedure over the wireless resource.

2. The device of claim 1, wherein, to confirm the communication failure, the one or more processors are configured to cause the device to:
monitor a downlink portion of the wireless resource for one or more reference signal transmissions via one or more candidate beams to be selected by the device;
determine that the one or more reference signal transmissions are present on the downlink portion of the wireless resource;
select a first candidate beam based at least in part on measurements of the one or more reference signal transmissions; and
transmit a beam failure request on an uplink portion of the wireless resource that indicates the first candidate beam.

3. The device of claim 2, wherein the one or more reference signal transmissions are identified based at least in part on a scrambling sequence used to scramble the one or more reference signal transmissions.

4. The device of claim 2, wherein the one or more processors are configured to cause the device to:
determine, for a subsequent communication period, an initial failure state for the subsequent communication period;
monitor the downlink portion of the wireless resource associated with the subsequent communication period for the one or more reference signal transmissions;
determine that the one or more reference signal transmissions are absent on the downlink portion of the wireless resource associated with the subsequent communication period; and
discontinue the beam failure recovery procedure based at least in part on an absence of the one or more reference signal transmissions on the downlink portion of the wireless resource associated with the subsequent communication period.

5. The device of claim 1, wherein, to confirm the communication failure, the one or more processors are configured to cause the device to:
transmit, in a downlink transmission to a user equipment (UE), an indication that the beam failure recovery procedure is activated; and
receive, from the UE, a response to the indication that the beam failure recovery procedure is activated.

6. The device of claim 5, wherein the response from the UE indicates an acceptance of an activation of the beam failure recovery procedure, and wherein the device performs the beam failure recovery procedure based at least in part on the acceptance.

7. The device of claim 5, wherein the response from the UE indicates that the UE declines an activation of the beam failure recovery procedure and indicates successful communications during the first communication period, and wherein the device discontinues the beam failure recovery procedure based at least in part on the response from the UE.

8. The device of claim 1, wherein, to confirm the communication failure, the one or more processors are configured to cause the device to:
receive, in a downlink transmission from a network entity, an indication that the beam failure recovery procedure is activated; and
transmit, to the network entity, a response to the indication that the beam failure recovery procedure is activated.

9. The device of claim 8, wherein the response to the network entity indicates an acceptance of an activation of the beam failure recovery procedure, and wherein the device performs the beam failure recovery procedure based at least in part on the acceptance.

10. The device of claim 1, wherein, to confirm the communication failure, the one or more processors are configured to cause the device to:
transmit, to a network entity, a request to activate the beam failure recovery procedure, wherein the request indicates that a prior downlink transmission from the network entity was unsuccessfully received at the device.

11. The device of claim 1, wherein, to confirm the communication failure, the one or more processors are configured to cause the device to:
receive, from a user equipment (UE), a request to activate the beam failure recovery procedure, wherein the request indicates that a prior downlink transmission from the device was unsuccessfully received at the UE.

12. The device of claim 1, wherein, to confirm the communication failure, the one or more processors are configured to cause the device to:
poll a network entity that was to receive an uplink communication from the device during a prior communication period to determine whether the acknowledgment feedback was transmitted by the network entity;
receive a response from the network entity that indicates whether the acknowledgment feedback was transmitted by the network entity; and
continue or discontinue the beam failure recovery procedure based at least in part on the response from the network entity.

13. The device of claim 12, wherein the uplink communication from the device during the prior communication period is identified based at least in part on a sequence number of the uplink communication, an index of a resource allocation of the uplink communication, or any combinations thereof.

14. The device of claim 1, wherein, to confirm the communication failure, the one or more processors are configured to cause the device to:
poll a user equipment (UE) that was to receive a downlink communication from the device during a prior communication period to determine whether the acknowledgment feedback was transmitted by the UE;

receive a response from the UE that indicates whether the acknowledgment feedback was transmitted by the UE; and continue or discontinue the beam failure recovery procedure based at least in part on the response from the UE.

15. The device of claim 14, wherein the downlink communication from the device during the prior communication period is identified based at least in part on a sequence number of the downlink communication, an index of a resource allocation of the downlink communication, or any combinations thereof.

16. The device of claim 1, wherein, to confirm the communication failure, the one or more processors are configured to cause the device to:

determine that a packet transmitted during the first communication period is a retransmission of a prior transmission of the packet, and that prior acknowledgment feedback was previously transmitted for the packet; and transmit an indication of the prior acknowledgment feedback.

17. The device of claim 16, wherein the prior transmission of the packet included an activation indication, and wherein an activation time is determined based on a transmission time of the prior acknowledgment feedback.

18. A method for wireless communication at a device in a wireless system, comprising:

configuring a wireless resource for a beam failure recovery procedure;

determining, based at least in part on a failure to receive an acknowledgment feedback for communications in a first communication period, an initial failure state for the first communication period;

confirming, based at least in part on a redundant indication of the acknowledgment feedback, a communication failure for the first communication period; and performing the beam failure recovery procedure using the wireless resource.

19. The method of claim 18, the method performed at a user equipment (UE), and the confirming the communication failure comprising:

monitoring a downlink portion of the wireless resource for one or more reference signal transmissions via one or more candidate beams to be selected by the UE;

determining that the one or more reference signal transmissions are present on the downlink portion of the wireless resource;

selecting a first candidate beam based at least in part on measurements of the one or more reference signal transmissions; and transmitting a beam failure request on an uplink portion of the wireless resource that indicates the first candidate beam.

20. The method of claim 19, further comprising:

determining, for a subsequent communication period, an initial failure state for the subsequent communication period;

monitoring the downlink portion of the wireless resource associated with the subsequent communication period for the one or more reference signal transmissions;

determining that the one or more reference signal transmissions are absent on the downlink portion of the wireless resource associated with the subsequent communication period; and discontinuing the beam failure recovery procedure based at least in part on the determining an absence of the one or more reference signal transmissions on the downlink portion of the wireless resource associated with the subsequent communication period.

21. The method of claim 18, the method performed at a network entity, and the confirming the communication failure comprising:

transmitting, in a downlink transmission to a user equipment (UE), an indication that the beam failure recovery procedure is activated; and receiving, from the UE, a response to the indication that the beam failure recovery procedure is activated.

22. The method of claim 18, the method performed at a user equipment (UE), and the confirming the communication failure comprising:

receiving, in a downlink transmission from a network entity, an indication that the beam failure recovery procedure is activated; and transmitting, to the network entity, a response to the indication that the beam failure recovery procedure is activated.

23. The method of claim 18, the method performed at a user equipment (UE), and the confirming the communication failure comprising:

transmitting, to a network entity, a request to activate the beam failure recovery procedure, wherein the request indicates that a prior downlink transmission from the network entity was unsuccessfully received at the UE.

24. The method of claim 18, the method performed at a network entity, and the confirming the communication failure comprising:

receiving, from a user equipment (UE), a request to activate the beam failure recovery procedure, wherein the request indicates that a prior downlink transmission from the network entity was unsuccessfully received at the UE.

25. The method of claim 18, the method performed at a user equipment (UE), and the confirming the communication failure comprising:

polling a network entity that was to receive an uplink communication from the UE during a prior communication period to determine whether the acknowledgment feedback was transmitted by the network entity;

receiving a response from the network entity that indicates whether the acknowledgment feedback was transmitted by the network entity; and continuing or discontinuing the beam failure recovery procedure based at least in part on the response from the network entity.

26. The method of claim 18, the method performed at a network entity, and the confirming the communication failure comprising:

polling a user equipment (UE) that was to receive a downlink communication from the network entity during a prior communication period to determine whether the acknowledgment feedback was transmitted by the UE;

receiving a response from the UE that indicates whether the acknowledgment feedback was transmitted by the UE; and continuing or discontinuing the beam failure recovery procedure based at least in part on the response from the UE.

27. The method of claim 18, the confirming the communication failure comprising:

determining that a packet transmitted during the first communication period is a retransmission of a prior transmission of the packet, and that prior acknowledgment feedback was previously transmitted for the packet; and transmitting an indication of the prior acknowledgment feedback.

28. A non-transitory computer-readable medium storing code for wireless communication at a device in a wireless system, the code comprising instructions executable by one or more processors to cause the device to:

configure a wireless resource for a beam failure recovery procedure;

determine, based at least in part on a failure to receive an acknowledgment feedback for communications in a first communication period, an initial failure state for the first communication period;

confirm, based at least in part on a redundant indication of the acknowledgment feedback, a communication failure for the first communication period; and perform the beam failure recovery procedure using the wireless resource.

29. The non-transitory computer-readable medium of claim 28, wherein the instructions to confirm the communication failure are executable by the one or more processors to cause the device to:

monitor a downlink portion of the wireless resource for one or more reference signal transmissions via one or more candidate beams to be selected by the device;

determine that the one or more reference signal transmissions are present on the downlink portion of the wireless resource;

select a first candidate beam based at least in part on measurements of the one or more reference signal transmissions; and transmit a beam failure request on an uplink portion of the wireless resource that indicates the first candidate beam.

30. The non-transitory computer-readable medium of claim 29, wherein the instructions are further executable by the one or more processors to cause the device to:

determine, for a subsequent communication period, an initial failure state for the subsequent communication period;

monitor the downlink portion of the wireless resource associated with the subsequent communication period for the one or more reference signal transmissions;

determine that the one or more reference signal transmissions are absent on the downlink portion of the wireless resource associated with the subsequent communication period; and discontinue the beam failure recovery procedure based at least in part on the determining an absence of the one or more reference signal transmissions on the downlink portion of the wireless resource associated with the subsequent communication period.

* * * * *